(12) United States Patent
Sengupta et al.

(10) Patent No.: US 11,929,803 B2
(45) Date of Patent: Mar. 12, 2024

(54) CONNECTED MODE BEAM MANAGEMENT FOR NARROWBAND SYSTEMS

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Le Liu, Fremont, CA (US); Bharat Shrestha, San Diego, CA (US); Peter Gaal, San Diego, CA (US); Liangping Ma, San Diego, CA (US); Umesh Phuyal, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/369,724

(22) Filed: Jul. 7, 2021

(65) Prior Publication Data

US 2022/0038151 A1 Feb. 3, 2022

Related U.S. Application Data

(60) Provisional application No. 63/058,432, filed on Jul. 29, 2020.

(51) Int. Cl.
*H04B 7/06* (2006.01)
*H04L 5/00* (2006.01)
(Continued)

(52) U.S. Cl.
CPC ........ *H04B 7/0617* (2013.01); *H04L 5/0048* (2013.01); *H04W 24/10* (2013.01);
(Continued)

(58) Field of Classification Search
None
See application file for complete search history.

(56) References Cited

U.S. PATENT DOCUMENTS 10,554,293 B1 2/2020 Chin et al.
11,096,218 B2 * 8/2021 Qian .................... H04L 5/0091
(Continued)

OTHER PUBLICATIONS

International Search Report and Written Opinion—PCT/US2021/040928—ISA/EPO—dated Dec. 21, 2021.
(Continued)

*Primary Examiner* — Ajit Patel
*Assistant Examiner* — Liem H. Nguyen
(74) *Attorney, Agent, or Firm* — Holland & Hart LLP

(57) ABSTRACT

Methods, systems, and devices for wireless communications are described. A user equipment (UE) and a network may establish communications over a directional beam. The UE may receive, from the network, a configuration of one or more channel sounding messages for one or more directional beams, where each directional beam of the one or more directional beams is associated with a set of narrowband carriers, and each of the one or more channel sounding messages being configured for transmission on a narrowband carrier of the set of narrowband carriers. The UE may determine a trigger for transmitting the one or more channel sounding messaged based at least in part on the configuration and transmit, to the network, the one or more channel sounding messages on respective narrowband carriers in accordance with the trigger and the configuration.

30 Claims, 24 Drawing Sheets

(51) Int. Cl.
  *H04W 24/10* (2009.01)
  *H04W 36/06* (2009.01)
  *H04W 72/0453* (2023.01)
  *H04W 74/08* (2009.01)
  *H04W 76/19* (2018.01)

(52) U.S. Cl.
  CPC ....... *H04W 36/06* (2013.01); *H04W 72/0453* (2013.01); *H04W 74/0833* (2013.01); *H04W 76/19* (2018.02)

(56) References Cited

U.S. PATENT DOCUMENTS

| | | | | |
|---|---|---|---|---|
| 2017/0127332 | A1* | 5/2017 | Axmon | H04W 36/0061 |
| 2017/0317866 | A1* | 11/2017 | Stirling-Gallacher | H04B 7/0695 |
| 2018/0219606 | A1* | 8/2018 | Ng | H04W 72/0453 |
| 2018/0235013 | A1* | 8/2018 | Jung | H04W 74/006 |
| 2018/0248674 | A1 | 8/2018 | Bhattad et al. | |
| 2019/0053293 | A1* | 2/2019 | Akoum | H04W 72/23 |
| 2019/0190591 | A1* | 6/2019 | Wang | H04W 76/15 |
| 2019/0253127 | A1* | 8/2019 | Kang | H04B 7/0456 |
| 2019/0288809 | A1* | 9/2019 | Iyer | H04L 1/1893 |
| 2019/0297648 | A1* | 9/2019 | Nagaraja | H04B 7/0632 |
| 2019/0349160 | A1* | 11/2019 | Gou | H04W 72/231 |
| 2019/0373646 | A1* | 12/2019 | Shin | H04W 74/0833 |
| 2020/0007227 | A1* | 1/2020 | Becker | H04B 7/19 |
| 2020/0007283 | A1* | 1/2020 | Chen | H04W 72/541 |
| 2020/0053790 | A1* | 2/2020 | Shin | H04W 74/008 |
| 2020/0099437 | A1* | 3/2020 | Harada | H04L 5/0053 |
| 2020/0187256 | A1* | 6/2020 | Lim | H04L 5/0048 |
| 2020/0228185 | A1* | 7/2020 | Tao | H04B 7/0617 |
| 2020/0280465 | A1* | 9/2020 | Kim | H04L 25/0226 |
| 2020/0314760 | A1* | 10/2020 | Ye | H04W 52/10 |
| 2021/0127382 | A1* | 4/2021 | Garcia | H04W 72/542 |
| 2021/0167821 | A1* | 6/2021 | Chen | H04B 7/0408 |
| 2021/0211329 | A1* | 7/2021 | Wu | H04L 25/0226 |
| 2022/0030532 | A1* | 1/2022 | Hajir | H04B 7/18513 |
| 2022/0086715 | A1* | 3/2022 | Hong | H04B 7/088 |
| 2022/0131602 | A1* | 4/2022 | Liberg | H04B 7/18504 |
| 2022/0141887 | A1* | 5/2022 | Ahn | H04W 4/70 370/329 |
| 2022/0150849 | A1* | 5/2022 | Zhao | H04J 11/0076 |
| 2022/0209927 | A1* | 6/2022 | Shreevastav | H04L 5/0069 |
| 2022/0225119 | A1* | 7/2022 | Liberg | H04B 7/18513 |
| 2022/0408420 | A1* | 12/2022 | Li | H04W 72/044 |
| 2023/0028423 | A1* | 1/2023 | Xu | H04B 7/0663 |
| 2023/0155669 | A1* | 5/2023 | Liberg | H04W 56/0045 370/316 |

OTHER PUBLICATIONS

Lenovo: "On NB-IoT Anchor Carrier", 3GPP TSG RAN WG1 adhoc_LTE_NB-IoT_1601, 3GPP Draft; R1-160121, 3GPP TSG RAN WG1 NB-IoT Ad-Hoc Meeting, 3rd Generation Partnership Project (3GPP), Mobile Competence Centre, 650, Route Des Lucioles, F-06921 Sophia-Antipolis Cedex, France, vol. RAN WG1, no. Budapest, HU, Jan. 18, 2016-Jan. 20, 2016, Jan. 12, 2016, XP051064733, 4 pages, Retrieved from the Internet: URL: http://www.3gpp.org/ftp/tsg_ran/WG1_RL1/TSGR1_AH/LTE_NB-IoT_1601/Docs/R1-160121.zip, [retrieved on Jan. 12, 2016], Chapter 3, p. 3, Figures 2,4.

LG Electronics: "Discussion on NPRACH Preamble Formats for NPDCCH Order", 3GPP Draft, R1-1808459, 3GPP TSG RAN WG1 Meeting #94, Discussion on NPRACH Preamble Formats for NPDCCH Order_Final, 3rd Generation Partnership Project (3GPP), Mobile Competence Centre, 650, Route Des Lucioles, F-06921 Sophia-Anti, vol. RAN WG1, no. Gothenburg, Sweden, Aug. 20, 2018-Aug. 24, 2018, Aug. 11, 2018 (Aug. 11, 2018), XP051515838, 4 Pages, Retrieved from the Internet: URL:http://www.3gpp.org/ftp/tsg%5Fran/WG1%5FRL1/TSGR1%5F94/Docs/R1%2D1808459%2Ezip [retrieved on Aug. 11, 2018] Last Paragraph, p. 1.

Partial International Search Report - PCT/US2021/040928—ISA/EPO—dated Oct. 25, 2021.

* cited by examiner

CONNECTED MODE BEAM MANAGEMENT FOR NARROWBAND SYSTEMS

CROSS REFERENCE

The present application for patent claims the benefit of U.S. Provisional Patent Application No. 63/058,432 by Sengupta et al., entitled "CONNECTED MODE BEAM MANAGEMENT FOR NARROWBAND SYSTEMS," filed Jul. 29, 2020, assigned to the assignee hereof, and expressly incorporated by reference herein.

INTRODUCTION

The following relates to wireless communications, and more specifically to beam management for narrowband systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support connected mode beam management for narrowband systems.

A method for wireless communication at a user equipment (UE) is described. The method may include communicating with a network over a directional beam, receiving, from the network, a configuration of one or more channel sounding messages for one or more directional beams, where each directional beam of the one or more directional beams is associated with a set of frequency resources, each of the one or more channel sounding messages being configured for transmission on a frequency resource of the set of frequency resources, determining a trigger for transmitting the one or more channel sounding messages based on the configuration, and transmitting, to the network, the one or more channel sounding messages on respective frequency resources in accordance with the trigger and the configuration.

An apparatus for wireless communication at a UE is described. The apparatus may include a processor, memory coupled with the processor, and instructions stored in the memory. The instructions may be executable by the processor to cause the apparatus to communicate with a network over a directional beam, receive, from the network, a configuration of one or more channel sounding messages for one or more directional beams, where each directional beam of the one or more directional beams is associated with a set of frequency resources, each of the one or more channel sounding messages being configured for transmission on a frequency resource of the set of frequency resources, determine a trigger for transmitting the one or more channel sounding messages based on the configuration, and transmit, to the network, the one or more channel sounding messages on respective frequency resources in accordance with the trigger and the configuration.

Another apparatus for wireless communication at a UE is described. The apparatus may include means for communicating with a network over a directional beam, means for receiving, from the network, a configuration of one or more channel sounding messages for one or more directional beams, where each directional beam of the one or more directional beams is associated with a set of frequency resources, each of the one or more channel sounding messages being configured for transmission on a frequency resource of the set of frequency resources, means for determining a trigger for transmitting the one or more channel sounding messages based on the configuration, and means for transmitting, to the network, the one or more channel sounding messages on respective frequency resources in accordance with the trigger and the configuration.

A non-transitory computer-readable medium storing code for wireless communication at a UE is described. The code may include instructions executable by a processor to communicate with a network over a directional beam, receive, from the network, a configuration of one or more channel sounding messages for one or more directional beams, where each directional beam of the one or more directional beams is associated with a set of frequency resources, each of the one or more channel sounding messages being configured for transmission on a frequency resource of the set of frequency resources, determine a trigger for transmitting the one or more channel sounding messages based on the configuration, and transmit, to the network, the one or more channel sounding messages on respective frequency resources in accordance with the trigger and the configuration.

Some examples of the method, apparatuses, and non-transitory computer-readable medium described herein may further include operations, features, means, or instructions for identifying, based on the configuration, locations of the respective frequency resources for transmitting the one or more channel sounding messages, where the locations include a time resource, a frequency resource, at least one directional beam of the one or more directional beams, or any combination thereof.

Some examples of the method, apparatuses, and non-transitory computer-readable medium described herein may further include operations, features, means, or instructions for receiving, from the network, system information over the one or more directional beams, or the directional beam, or any combination thereof, the system information indicating the configuration.

In some examples of the method, apparatuses, and non-transitory computer-readable medium described herein, each frequency resource may be different from a resource used for random access procedures with the network, and each frequency resource may be different from an anchor resource of the set of frequency resources associated with each directional beam.

Some examples of the method, apparatuses, and non-transitory computer-readable medium described herein may further include operations, features, means, or instructions for determining a first configuration of a first channel sounding message on a first directional beam of the one or more directional beams and determining a second configuration of a second channel sounding message on a second directional beam of the one or more directional beams, the one or more channel sounding messages being transmitted in accordance with the first configuration, or the second configuration, or any combination thereof.

Some examples of the method, apparatuses, and non-transitory computer-readable medium described herein may further include operations, features, means, or instructions for determining the second configuration based on modifying at least a portion of the first configuration, the method further including and applying a frequency translation to the first configuration, the second configuration being determined based on the applied frequency translation.

In some examples of the method, apparatuses, and non-transitory computer-readable medium described herein, the first configuration may be different from the second configuration.

In some examples of the method, apparatuses, and non-transitory computer-readable medium described herein, at least a portion of the first configuration and the second configuration may be common across the first directional beam and the second directional beam.

In some examples of the method, apparatuses, and non-transitory computer-readable medium described herein, each of the one or more channel sounding messages include a random access preamble message and the method, apparatuses, and non-transitory computer-readable medium may include further operations, features, means, or instructions for determining, from the configuration, a set of random access occasions for transmitting the random access preamble message, the random access preamble message transmitted during at least one random access occasion of the set of random access occasions, where the set of random access occasions include random access occasions that may be configured across different frequency resources of the one or more directional beams.

In some examples of the method, apparatuses, and non-transitory computer-readable medium described herein, the random access occasions may be configured across the one or more directional beams in accordance with a pattern across time resources, or frequency resources, or both, the pattern includes a set of random access resources in adjacent carriers, the set of random access resources being adjacent in time, each random access resource of the set of random access resources adjacent in time being separated by a time interval, and each random access preamble message includes a narrowband random access preamble message.

In some examples of the method, apparatuses, and non-transitory computer-readable medium described herein, at least one of the one or more channel sounding messages includes a first random access preamble that may be different from a second random access preamble that may be used for random access procedures with the network.

In some examples of the method, apparatuses, and non-transitory computer-readable medium described herein, a first random access preamble of the one or more channel sounding messages includes a preamble that may be shared across two or more UEs, a UE-specific preamble, a contention-based random access preamble, a contention-free random access preamble, or any combination thereof.

Some examples of the method, apparatuses, and non-transitory computer-readable medium described herein may further include operations, features, means, or instructions for refraining from monitoring for a response from the network based on transmitting the one or more channel sounding messages.

Some examples of the method, apparatuses, and non-transitory computer-readable medium described herein may further include operations, features, means, or instructions for monitoring for a communication over the directional beam after transmitting the one or more channel sounding messages and communicating with the network over the directional beam based on the monitoring.

Some examples of the method, apparatuses, and non-transitory computer-readable medium described herein may further include operations, features, means, or instructions for receiving, from the network, downlink control information (DCI) including the trigger for transmitting the one or more channel sounding messages, the method further including, identifying, within the DCI, a narrowband physical downlink control channel (PDCCH) order, where the narrowband PDCCH order includes the trigger, and determining, based on the narrowband PDCCH order, the one or more directional beams, one or more frequency resources, or any combination thereof, for transmitting one or more random access preamble messages as the one or more channel sounding messages.

Some examples of the method, apparatuses, and non-transitory computer-readable medium described herein may further include operations, features, means, or instructions for transmitting one or more random access preamble messages at each of a set of multiple transmission occasions based on the narrowband PDCCH order.

Some examples of the method, apparatuses, and non-transitory computer-readable medium described herein may further include operations, features, means, or instructions for receiving radio resource control signaling that configures the one or more channel sounding messages, the method further including and receiving one or more messages from the network that modify the configuration of the one or more channel sounding messages, where the one or more messages include a medium access control (MAC) control element, DCI, or any combination thereof, and where the one or more messages activate transmissions of the one or more channel sounding messages, deactivate the transmissions of the one or more channel sounding messages, or any combination thereof.

Some examples of the method, apparatuses, and non-transitory computer-readable medium described herein may further include operations, features, means, or instructions for determining that an event trigger may have been satisfied, where the one or more channel sounding messages may be transmitted based on the event trigger being satisfied and identifying a set of resources for transmitting the one or more channel sounding messages based on the event trigger being satisfied, where the set of resources may be shared by two or more UEs including the UE, or may be a UE-specific resource, or may be a contention-based resource, or may be a contention-free resource, or any combination thereof.

Some examples of the method, apparatuses, and non-transitory computer-readable medium described herein may further include operations, features, means, or instructions for monitoring a first frequency resource of a first set of frequency resources associated with the directional beam, determining a beam failure for the directional beam based on the monitoring, where transmitting the one or more channel sounding messages may be based on the determined beam failure, where the one or more channel sounding messages may be part of a beam failure recovery procedure, and indicating the beam failure to the network based on a signal quality of the first frequency resource of the directional beam satisfying a threshold.

In some examples of the method, apparatuses, and non-transitory computer-readable medium described herein, each directional beam of the one or more directional beams corresponds to a different radio frequency.

Some examples of the method, apparatuses, and non-transitory computer-readable medium described herein may further include operations, features, means, or instructions for receiving a configuration of one or more measurement objects corresponding to different directional beams, where the one or more channel sounding messages may be transmitted based on performing measurements of the one or more measurement objects.

In some examples of the method, apparatuses, and non-transitory computer-readable medium described herein, at least one of the one or more channel sounding messages includes a narrowband sounding reference signal (SRS), and each frequency resource of the set of frequency resources includes a narrowband carrier, or a bandwidth part, or any combination thereof.

Some examples of the method, apparatuses, and non-transitory computer-readable medium described herein may further include operations, features, means, or instructions for selecting, based on a beam management procedure, or a beam failure recovery procedure, or any combination thereof, a second directional beam different from the directional beam, where the selection may be based on transmitting the one or more channel sounding messages on at least the second directional beam and communicating with the network using the second directional beam.

Some examples of the method, apparatuses, and non-transitory computer-readable medium described herein may further include operations, features, means, or instructions for identifying a first cell associated with directional beam, performing a handover procedure to a second cell different from the first cell, the handover procedure corresponding to establishing a connection with a second directional beam associated with the second cell, where the handover procedure may be based on transmitting the one or more channel sounding messages on at least the second directional beam, and communicating with the network using the second directional beam.

In some examples of the method, apparatuses, and non-transitory computer-readable medium described herein, the trigger includes periodic transmission occasions, aperiodic transmission occasions, semi-persistent transmission occasions, dynamic transmission occasions, one or more UE-initiated transmission occasions, one or more event triggers, or any combination thereof, the directional beam, the frequency resource, the set of frequency resources, the one or more channel sounding messages, or any combination thereof, may be used for narrowband internet of things communications, and the network includes a non-terrestrial network.

A method for wireless communication at a UE is described. The method may include communicating with a network over a directional beam, receiving, from the network, an indication to modify a carrier for communications from a first narrowband carrier associated with the directional beam to a second narrowband carrier associated with a second directional beam, the second narrowband carrier being different from the first narrowband carrier, and switching to the second narrowband carrier based on the indication.

An apparatus for wireless communication at a UE is described. The apparatus may include a processor, memory coupled with the processor, and instructions stored in the memory. The instructions may be executable by the processor to cause the apparatus to communicate with a network over a directional beam, receive, from the network, an indication to modify a carrier for communications from a first narrowband carrier associated with the directional beam to a second narrowband carrier associated with a second directional beam, the second narrowband carrier being different from the first narrowband carrier, and switch to the second narrowband carrier based on the indication.

Another apparatus for wireless communication at a UE is described. The apparatus may include means for communicating with a network over a directional beam, means for receiving, from the network, an indication to modify a carrier for communications from a first narrowband carrier associated with the directional beam to a second narrowband carrier associated with a second directional beam, the second narrowband carrier being different from the first narrowband carrier, and means for switching to the second narrowband carrier based on the indication.

A non-transitory computer-readable medium storing code for wireless communication at a UE is described. The code may include instructions executable by a processor to communicate with a network over a directional beam, receive, from the network, an indication to modify a carrier for communications from a first narrowband carrier associated with the directional beam to a second narrowband carrier associated with a second directional beam, the second narrowband carrier being different from the first narrowband carrier, and switch to the second narrowband carrier based on the indication.

In some examples of the method, apparatuses, and non-transitory computer-readable medium described herein, the second narrowband carrier may be from a set of candidate carriers and the method, apparatuses, and non-transitory computer-readable medium may include further operations, features, means, or instructions for receiving a configuration of the set of candidate carriers from the network, where the configuration may be received via radio resource control signaling, a MAC control element, or any combination thereof.

Some examples of the method, apparatuses, and non-transitory computer-readable medium described herein may further include operations, features, means, or instructions for receiving DCI, a MAC control element, or any combination thereof, that includes the indication to modify the carrier for communications, the method further including and transmitting, in response to the received DCI, or the MAC control element, or any combination thereof, an acknowledgment of the indication to modify the carrier for communications.

A method for wireless communication is described. The method may include communicating with a UE over a directional beam, receiving one or more channel sounding messages from the UE, the one or more channel sounding messages received on a frequency resource of a set of frequency resources, and determining a channel quality of the directional beam based on the received one or more channel sounding messages.

An apparatus for wireless communication is described. The apparatus may include a processor, memory coupled with the processor, and instructions stored in the memory. The instructions may be executable by the processor to cause the apparatus to communicate with a UE over a directional beam, receive one or more channel sounding messages from the UE, the one or more channel sounding messages received on a frequency resource of a set of frequency resources, and determine a channel quality of the directional beam based on the received one or more channel sounding messages.

Another apparatus for wireless communication is described. The apparatus may include means for communicating with a UE over a directional beam, means for receiving one or more channel sounding messages from the UE, the one or more channel sounding messages received on a frequency resource of a set of frequency resources, and means for determining a channel quality of the directional beam based on the received one or more channel sounding messages.

A non-transitory computer-readable medium storing code for wireless communication is described. The code may include instructions executable by a processor to communicate with a UE over a directional beam, receive one or more channel sounding messages from the UE, the one or more channel sounding messages received on a frequency resource of a set of frequency resources, and determine a channel quality of the directional beam based on the received one or more channel sounding messages.

A method for wireless communication is described. The method may include communicating with a UE over a directional beam, transmitting, to the UE, an indication to modify a carrier for communications from a first narrowband carrier associated with the directional beam to a second narrowband carrier associated with a second directional beam, the second narrowband carrier being different from the first narrowband carrier, and switching to the second narrowband carrier based on the indication.

An apparatus for wireless communication is described. The apparatus may include a processor, memory coupled with the processor, and instructions stored in the memory. The instructions may be executable by the processor to cause the apparatus to communicate with a UE over a directional beam, transmit, to the UE, an indication to modify a carrier for communications from a first narrowband carrier associated with the directional beam to a second narrowband carrier associated with a second directional beam, the second narrowband carrier being different from the first narrowband carrier, and switch to the second narrowband carrier based on the indication.

Another apparatus for wireless communication is described. The apparatus may include means for communicating with a UE over a directional beam, means for transmitting, to the UE, an indication to modify a carrier for communications from a first narrowband carrier associated with the directional beam to a second narrowband carrier associated with a second directional beam, the second narrowband carrier being different from the first narrowband carrier, and means for switching to the second narrowband carrier based on the indication.

A non-transitory computer-readable medium storing code for wireless communication is described. The code may include instructions executable by a processor to communicate with a UE over a directional beam, transmit, to the UE, an indication to modify a carrier for communications from a first narrowband carrier associated with the directional beam to a second narrowband carrier associated with a second directional beam, the second narrowband carrier being different from the first narrowband carrier, and switch to the second narrowband carrier based on the indication.

A method of wireless communication at a UE is described. The method may include communicating with a network over a directional beam and receiving, from the network, a configuration of one or more channel sounding messages for one or more directional beams. In some examples, each directional beam of the one or more directional beams may be associated with a set of narrowband carriers, and each of the one or more channel sounding messages being configured for transmission on a narrowband carrier of the set of narrowband carriers. In some examples, the method may include determining a trigger for transmitting the one or more channel sounding messages based on the configuration and transmitting, to the network, the one or more channel sounding messages on respective narrowband carriers in accordance with the trigger and the configuration.

An apparatus for wireless communication at a UE is described. The apparatus may include a processor and memory coupled to the processor, the processor and memory configured to communicate with a network over a directional beam and receive, from the network, a configuration of one or more channel sounding messages for one or more directional beams. In some examples, each directional beam of the one or more directional beams is associated with a set of narrowband carriers, and each of the one or more channel sounding messages may be configured for transmission on a narrowband carrier of the set of narrowband carriers. The processor and memory may be further configured to determine a trigger for transmitting the one or more channel sounding messages based on the configuration, and transmit, to the network, the one or more channel sounding messages on respective narrowband carriers in accordance with the trigger and the configuration.

Another apparatus for wireless communication at a UE is described. The apparatus may include means for communicating with a network over a directional beam, receiving, from the network, a configuration of one or more channel sounding messages for one or more directional beams, where each directional beam of the one or more directional beams is associated with a set of narrowband carriers. In some cases, each of the one or more channel sounding messages being configured for transmission on a narrowband carrier of the set of narrowband carriers. The apparatus may further include means for determining a trigger for transmitting the one or more channel sounding messages based on the configuration, and means for transmitting, to the network, the one or more channel sounding messages on respective narrowband carriers in accordance with the trigger and the configuration.

A non-transitory computer-readable medium storing code for wireless communication at a UE is described. The code may include instructions executable by a processor to communicate with a network over a directional beam, receive, from the network, a configuration of one or more channel sounding messages for one or more directional beams. In some examples, each directional beam of the one or more directional beams may be associated with a set of narrowband carriers, and each of the one or more channel sounding messages being configured for transmission on a narrowband carrier of the set of narrowband carriers. The instructions may be executable by the processor to determine a trigger for transmitting the one or more channel sounding messages based on the configuration and transmit, to the network, the one or more channel sounding messages on respective narrowband carriers in accordance with the trigger and the configuration.

Some examples of the method, apparatuses, and non-transitory computer-readable medium described herein may further include operations, features, means, or instructions for identifying, based on the configuration, locations of the respective narrowband carriers for transmitting the one or more channel sounding messages, where the locations include a time resource, a frequency resource, at least one directional beam of the one or more directional beams, or any combination thereof.

Some examples of the method, apparatuses, and non-transitory computer-readable medium described herein may further include operations, features, means, or instructions for receiving, from the network, system information over the one or more directional beams, or the directional beam, or any combination thereof, the system information indicating the configuration.

In some examples of the method, apparatuses, and non-transitory computer-readable medium described herein, each narrowband carrier may be different from a carrier used for random access procedures with the network.

In some examples of the method, apparatuses, and non-transitory computer-readable medium described herein, each narrowband carrier may be different from an anchor carrier of the set of narrowband carriers associated with each directional beam.

Some examples of the method, apparatuses, and non-transitory computer-readable medium described herein may further include operations, features, means, or instructions for determining a first configuration of a first channel sounding message on a first directional beam of the one or more directional beams, and determining a second configuration of a second channel sounding message on a second directional beam of the one or more directional beams, the one or more channel sounding messages being transmitted in accordance with the first configuration, or the second configuration, or any combination thereof.

Some examples of the method, apparatuses, and non-transitory computer-readable medium described herein may further include operations, features, means, or instructions for determining the second configuration based on modifying at least a portion of the first configuration.

Some examples of the method, apparatuses, and non-transitory computer-readable medium described herein may further include operations, features, means, or instructions for applying a frequency translation to the first configuration, the second configuration being determined based on the applied frequency translation.

In some examples of the method, apparatuses, and non-transitory computer-readable medium described herein, the first configuration may be different from the second configuration.

In some examples of the method, apparatuses, and non-transitory computer-readable medium described herein, at least a portion of the first configuration and the second configuration may be common across the first directional beam and the second directional beam.

Some examples of the method, apparatuses, and non-transitory computer-readable medium described herein may further include operations, features, means, or instructions for determining, from the configuration, a set of random access occasions for transmitting the random access preamble message, the random access preamble message transmitted during at least one random access occasion of the set of random access occasions, where the set of random access occasions include random access occasions that may be configured across different narrowband carriers of the one or more directional beams.

In some examples of the method, apparatuses, and non-transitory computer-readable medium described herein, the random access occasions may be configured across the one or more directional beams in accordance with a pattern across time resources, or frequency resources, or both.

In some examples of the method, apparatuses, and non-transitory computer-readable medium described herein, the pattern includes a set of random access resources in adjacent carriers, the set of random access resources being adjacent in time.

In some examples of the method, apparatuses, and non-transitory computer-readable medium described herein, each random access resource of the set of random access resources adjacent in time may be separated by a time interval.

In some examples of the method, apparatuses, and non-transitory computer-readable medium described herein, at least one of the one or more channel sounding messages includes a first random access preamble that may be different from a second random access preamble that may be used for random access procedures with the network.

In some examples of the method, apparatuses, and non-transitory computer-readable medium described herein, a first random access preamble of the one or more channel sounding messages includes a preamble that may be shared across two or more UEs, a UE-specific preamble, a contention-based random access preamble, a contention-free random access preamble, or any combination thereof.

Some examples of the method, apparatuses, and non-transitory computer-readable medium described herein may further include operations, features, means, or instructions for refraining from monitoring for a response from the network based on transmitting the one or more channel sounding messages.

Some examples of the method, apparatuses, and non-transitory computer-readable medium described herein may further include operations, features, means, or instructions for monitoring for a communication over the directional beam after transmitting the one or more channel sounding messages, and communicating with the network over the directional beam based on the monitoring.

In some examples of the method, apparatuses, and non-transitory computer-readable medium described herein, each of the random access preamble message includes a narrowband random access preamble message.

Some examples of the method, apparatuses, and non-transitory computer-readable medium described herein may further include operations, features, means, or instructions for receiving, from the network, DCI including the trigger for transmitting the one or more channel sounding messages.

Some examples of the method, apparatuses, and non-transitory computer-readable medium described herein may further include operations, features, means, or instructions for identifying, within the DCI, a narrowband PDCCH order, where the narrowband PDCCH order includes the trigger.

Some examples of the method, apparatuses, and non-transitory computer-readable medium described herein may further include operations, features, means, or instructions for determining, based on the narrowband PDCCH order, the one or more directional beams, one or more narrowband carriers, or any combination thereof, for transmitting one or more random access preamble messages as the one or more channel sounding messages.

Some examples of the method, apparatuses, and non-transitory computer-readable medium described herein may further include operations, features, means, or instructions for transmitting one or more random access preamble messages at each of a set of transmission occasions based on the narrowband PDCCH order.

Some examples of the method, apparatuses, and non-transitory computer-readable medium described herein may further include operations, features, means, or instructions for receiving radio resource control signaling that configures the one or more channel sounding messages.

Some examples of the method, apparatuses, and non-transitory computer-readable medium described herein may further include operations, features, means, or instructions for receiving one or more messages from the network that modify the configuration of the one or more channel sounding messages, where the one or more messages include a MAC control element, DCI, or any combination thereof.

In some examples of the method, apparatuses, and non-transitory computer-readable medium described herein, the one or more messages activate transmissions of the one or more channel sounding messages, deactivate the transmissions of the one or more channel sounding messages, or any combination thereof.

Some examples of the method, apparatuses, and non-transitory computer-readable medium described herein may further include operations, features, means, or instructions for determining that an event trigger may have been satisfied, where the one or more channel sounding messages may be transmitted based on the event trigger being satisfied.

Some examples of the method, apparatuses, and non-transitory computer-readable medium described herein may further include operations, features, means, or instructions for identifying a set of resources for transmitting the one or more channel sounding messages based on the event trigger being satisfied, where the set of resources may be shared by two or more UEs including the UE, or may be a UE-specific resource, or may be a contention-based resource, or may be a contention-free resource, or any combination thereof.

Some examples of the method, apparatuses, and non-transitory computer-readable medium described herein may further include operations, features, means, or instructions for monitoring a first narrowband carrier of a first set of narrowband carriers associated with the directional beam, and determining a beam failure for the directional beam based on the monitoring, where transmitting the one or more channel sounding messages may be based on the determined beam failure, where the one or more channel sounding messages may be part of a beam failure recovery procedure.

Some examples of the method, apparatuses, and non-transitory computer-readable medium described herein may further include operations, features, means, or instructions for indicating the beam failure to the network based on a signal quality of the first narrowband carrier of the directional beam satisfying a threshold.

In some examples of the method, apparatuses, and non-transitory computer-readable medium described herein, each directional beam of the one or more directional beams corresponds to a different radio frequency.

Some examples of the method, apparatuses, and non-transitory computer-readable medium described herein may further include operations, features, means, or instructions for receiving a configuration of one or more measurement objects corresponding to different directional beams, where the one or more channel sounding messages may be transmitted based on performing measurements of the one or more measurement objects.

In some examples of the method, apparatuses, and non-transitory computer-readable medium described herein, at least one of the one or more channel sounding messages includes a narrowband SRS.

Some examples of the method, apparatuses, and non-transitory computer-readable medium described herein may further include operations, features, means, or instructions for selecting, based on a beam management procedure, or a beam failure recovery procedure, or any combination thereof, a second directional beam different from the directional beam, where the selection may be based on transmitting the one or more channel sounding messages on at least the second directional beam, and communicating with the network using the second directional beam.

Some examples of the method, apparatuses, and non-transitory computer-readable medium described herein may further include operations, features, means, or instructions for identifying a first cell associated with directional beam, performing a handover procedure to a second cell different from the first cell, the handover procedure corresponding to establishing a connection with a second directional beam associated with the second cell, where the handover procedure may be based on transmitting the one or more channel sounding messages on at least the second directional beam, and communicating with the network using the second directional beam.

In some examples of the method, apparatuses, and non-transitory computer-readable medium described herein, the trigger includes periodic transmission occasions, aperiodic transmission occasions, semi-persistent transmission occasions, dynamic transmission occasions, one or more UE-initiated transmission occasions, one or more event triggers, or any combination thereof.

In some examples of the method, apparatuses, and non-transitory computer-readable medium described herein, the directional beam, the narrowband carrier, the set of narrowband carriers, the one or more channel sounding messages, or any combination thereof, may be used for narrowband internet of things communications.

In some examples of the method, apparatuses, and non-transitory computer-readable medium described herein, the network includes a non-terrestrial network.

A method of wireless communication at a UE is described. The method may include communicating with a network over a directional beam and receiving, from the network, an indication to modify a carrier for communications from a first narrowband carrier associated with the directional beam to a second narrowband carrier associated with a second directional beam. In some examples, the second narrowband carrier may be different from the first narrowband carrier. The method may further include switching to the second narrowband carrier based on the indication.

An apparatus for wireless communication at a UE is described. The apparatus may include a processor and memory coupled to the processor, the processor and memory being configured to communicate with a network over a directional beam, receive, from the network, an indication to modify a carrier for communications from a first narrowband carrier associated with the directional beam to a second narrowband carrier associated with a second directional beam, and switch to the second narrowband carrier based on the indication. In some examples, the second narrowband carrier may be different from the first narrowband carrier.

Another apparatus for wireless communication at a UE is described. The apparatus may include means for communicating with a network over a directional beam and means for receiving, from the network, an indication to modify a carrier for communications from a first narrowband carrier associated with the directional beam to a second narrowband carrier associated with a second directional beam. In some examples, the second narrowband carrier may be different from the first narrowband carrier. The apparatus may include means for switching to the second narrowband carrier based on the indication.

A non-transitory computer-readable medium storing code for wireless communication at a UE is described. The code may include instructions executable by a processor to communicate with a network over a directional beam, receive, from the network, an indication to modify a carrier for communications from a first narrowband carrier associated with the directional beam to a second narrowband carrier associated with a second directional beam, and switch to the second narrowband carrier based on the indication. In some examples, the second narrowband carrier being different from the first narrowband carrier.

In some examples of the method, apparatuses, and non-transitory computer-readable medium described herein, the second narrowband carrier may be from a set of candidate carriers.

Some examples of the method, apparatuses, and non-transitory computer-readable medium described herein may further include operations, features, means, or instructions for receiving a configuration of the set of candidate carriers from the network, where the configuration may be received via radio resource control signaling, a MAC control element, or any combination thereof.

Some examples of the method, apparatuses, and non-transitory computer-readable medium described herein may further include operations, features, means, or instructions for receiving DCI, a MAC control element, or any combination thereof, that includes the indication to modify the carrier for communications.

Some examples of the method, apparatuses, and non-transitory computer-readable medium described herein may further include operations, features, means, or instructions for transmitting, in response to the received DCI, or the MAC control element, or any combination thereof, an acknowledgment of the indication to modify the carrier for communications.

A method of wireless communication is described. The method may include communicating with a UE over a directional beam, receiving one or more channel sounding messages from the UE, and determining a channel quality of the directional beam based on the received one or more channel sounding messages. In some examples, the one or more channel sounding messages may be received on a narrowband carrier of a set of narrowband carriers.

An apparatus for wireless communication is described. The apparatus may include a processor and memory coupled to the processor, the processor and memory being configured to communicate with a UE over a directional beam and receive one or more channel sounding messages from the UE, the one or more channel sounding messages received on a narrowband carrier of a set of narrowband carriers. The processor and memory may be configured to determine a channel quality of the directional beam based on the received one or more channel sounding messages.

Another apparatus for wireless communication is described. The apparatus may include means for communicating with a UE over a directional beam, means for receiving one or more channel sounding messages from the UE, and means for determining a channel quality of the directional beam based on the received one or more channel sounding messages. In some examples, the one or more channel sounding messages may be received on a narrowband carrier of a set of narrowband carriers.

A non-transitory computer-readable medium storing code for wireless communication is described. The code may include instructions executable by a processor to communicate with a UE over a directional beam, receive one or more channel sounding messages from the UE, and determine a channel quality of the directional beam based on the received one or more channel sounding messages. In some cases, the one or more channel sounding messages received on a narrowband carrier of a set of narrowband carriers.

Some examples of the method, apparatuses, and non-transitory computer-readable medium described herein may further include operations, features, means, or instructions for determining a configuration of the one or more channel sounding messages for one or more directional beams, where each directional beam of the one or more directional beams may be associated with a respective set of narrowband carriers, each of the one or more channel sounding messages being configured for transmission on a narrowband carrier of at least one respective set of narrowband carriers, and transmitting, to the UE, an indication of the configuration of the one or more channel sounding messages, where the one or more channel sounding messages may be received based on the configuration.

Some examples of the method, apparatuses, and non-transitory computer-readable medium described herein may further include operations, features, means, or instructions for identifying locations of the narrowband carriers for transmitting the one or more channel sounding messages, the locations including a time resource, a frequency resource, at least one directional beam of the one or more directional beams, or any combination thereof.

Some examples of the method, apparatuses, and non-transitory computer-readable medium described herein may further include operations, features, means, or instructions for transmitting, to the UE, system information over the one or more directional beams, or the directional beam, or any combination thereof, the system information indicating the configuration.

In some examples of the method, apparatuses, and non-transitory computer-readable medium described herein, each narrowband carrier may be different from a carrier used for random access procedures.

In some examples of the method, apparatuses, and non-transitory computer-readable medium described herein, each narrowband carrier may be different from an anchor carrier of the set of narrowband carriers associated with each directional beam.

Some examples of the method, apparatuses, and non-transitory computer-readable medium described herein may further include operations, features, means, or instructions for determining a first configuration of a first channel sounding message on a first directional beam of the one or more directional beams, and determining a second configuration of a second channel sounding message on a second directional beam of the one or more directional beams, the one or more channel sounding messages being received in accordance with the first configuration, or the second configuration, or any combination thereof.

In some examples of the method, apparatuses, and non-transitory computer-readable medium described herein, the second configuration may be based on modifying at least a portion of the first configuration.

In some examples of the method, apparatuses, and non-transitory computer-readable medium described herein, the first configuration may be different from the second configuration.

In some examples of the method, apparatuses, and non-transitory computer-readable medium described herein, at least a portion of the first configuration and the second configuration may be common across the first directional beam and the second directional beam.

Some examples of the method, apparatuses, and non-transitory computer-readable medium described herein may further include operations, features, means, or instructions for determining, from the configuration, a set of random access occasions for receiving the random access preamble message, the random access preamble message received during at least one random access occasion of the set of random access occasions, where the set of random access occasions include random access occasions that may be configured across different narrowband carriers of the one or more directional beams, and where the configuration indicates the set of random access occasions.

In some examples of the method, apparatuses, and non-transitory computer-readable medium described herein, the random access occasions may be configured across the one or more directional beams in accordance with a pattern across time resources, or frequency resources, or both.

In some examples of the method, apparatuses, and non-transitory computer-readable medium described herein, the pattern includes a set of random access resources in adjacent carriers, the set of random access resources being adjacent in time.

In some examples of the method, apparatuses, and non-transitory computer-readable medium described herein, each random access resource of the set of random access resources adjacent in time may be separated by a time interval.

In some examples of the method, apparatuses, and non-transitory computer-readable medium described herein, at least one of the one or more channel sounding messages includes a first random access preamble that may be different from a second random access preamble that may be used for random access procedures.

In some examples of the method, apparatuses, and non-transitory computer-readable medium described herein, the first random access preamble includes a preamble shared across two or more UEs including the UE, a UE-specific preamble, a contention-based random access preamble, a contention-free random access preamble, or any combination thereof.

In some examples of the method, apparatuses, and non-transitory computer-readable medium described herein, each of the random access preamble message includes a narrowband random access preamble message.

Some examples of the method, apparatuses, and non-transitory computer-readable medium described herein may further include operations, features, means, or instructions for transmitting radio resource control signaling that configures the one or more channel sounding messages.

Some examples of the method, apparatuses, and non-transitory computer-readable medium described herein may further include operations, features, means, or instructions for transmitting, to the UE, one or more messages that modifies the configuration of the one or more channel sounding messages, where the one or more messages include a MAC control elements, DCI, or any combination thereof.

In some examples of the method, apparatuses, and non-transitory computer-readable medium described herein, the one or more messages activate transmissions of the one or more channel sounding messages, deactivate the transmissions of the one or more channel sounding messages, or any combination thereof.

Some examples of the method, apparatuses, and non-transitory computer-readable medium described herein may further include operations, features, means, or instructions for transmitting, to the UE, DCI including a trigger for transmitting the one or more channel sounding messages.

Some examples of the method, apparatuses, and non-transitory computer-readable medium described herein may further include operations, features, means, or instructions for transmitting, within the DCI, a narrowband PDCCH order, where the narrowband PDCCH order includes the trigger.

Some examples of the method, apparatuses, and non-transitory computer-readable medium described herein may further include operations, features, means, or instructions for transmitting, as part of the narrowband PDCCH order, an indication of one or more directional beams, one or more narrowband carriers, or any combination thereof, for transmitting one or more random access preamble messages as the one or more channel sounding messages.

Some examples of the method, apparatuses, and non-transitory computer-readable medium described herein may further include operations, features, means, or instructions for receiving one or more random access preamble messages at each of a set of transmission occasions based on the narrowband PDCCH order.

Some examples of the method, apparatuses, and non-transitory computer-readable medium described herein may further include operations, features, means, or instructions for receiving the one or more channel sounding messages as part of a beam failure recovery procedure.

Some examples of the method, apparatuses, and non-transitory computer-readable medium described herein may further include operations, features, means, or instructions for receiving an indicating of a beam failure from the UE based on a signal quality of the narrowband carrier of the directional beam satisfying a threshold.

In some examples of the method, apparatuses, and non-transitory computer-readable medium described herein, each directional beam of one or more directional beams including the directional beam corresponds to a different radio frequency.

In some examples of the method, apparatuses, and non-transitory computer-readable medium described herein, the one or more channel sounding messages may be received based on an event trigger being satisfied.

Some examples of the method, apparatuses, and non-transitory computer-readable medium described herein may further include operations, features, means, or instructions for configuring a set of resources for the one or more channel sounding messages, where the set of resources may be shared by two or more UEs including the UE, or may be a UE-specific resource, or may be a contention-based resource, or may be a contention-free resource, or any combination thereof.

Some examples of the method, apparatuses, and non-transitory computer-readable medium described herein may further include operations, features, means, or instructions for transmitting a configuration of one or more measurement objects corresponding to different directional beams, where the one or more channel sounding messages may be received based on measurements of the one or more measurement objects.

In some examples of the method, apparatuses, and non-transitory computer-readable medium described herein, at least one of the one or more channel sounding messages includes a narrowband SRS.

Some examples of the method, apparatuses, and non-transitory computer-readable medium described herein may further include operations, features, means, or instructions for selecting, based on a beam management procedure, or a beam failure recovery procedure, or any combination thereof, a second directional beam different from the directional beam, where the selection may be based on receiving the one or more channel sounding messages on at least the second directional beam, and communicating with the UE using the second directional beam.

Some examples of the method, apparatuses, and non-transitory computer-readable medium described herein may further include operations, features, means, or instructions for performing a handover procedure for handing over the UE to a second cell different from a first cell that may be associated with the directional beam, the second cell associated with a second directional beam, where the handover procedure may be based on the received channel sounding message.

In some examples of the method, apparatuses, and non-transitory computer-readable medium described herein, the one or more channel sounding messages may be received based on periodic transmission occasions, aperiodic transmission occasions, dynamic transmission occasions, one or more UE-initiated transmission occasions, one or more event triggers, or any combination thereof.

In some examples of the method, apparatuses, and non-transitory computer-readable medium described herein, the directional beam, the narrowband carrier, the set of narrowband carriers, or any combination thereof, may be used for narrowband internet of things communications.

A method of wireless communication is described. The method may include communicating with a UE over a directional beam, transmitting, to the UE, an indication to modify a carrier for communications from a first narrowband carrier associated with the directional beam to a second narrowband carrier associated with a second directional beam, the second narrowband carrier being different from the first narrowband carrier, and switching to the second narrowband carrier based on the indication.

An apparatus for wireless communication is described. The apparatus may include a processor and memory coupled to the processor. The processor and memory may be configured to communicate with a UE over a directional beam, transmit, to the UE, an indication to modify a carrier for communications from a first narrowband carrier associated with the directional beam to a second narrowband carrier associated with a second directional beam, and switch to the second narrowband carrier based on the indication. In some cases, the second narrowband carrier may be different from the first narrowband carrier.

Another apparatus for wireless communication is described. The apparatus may include means for communicating with a UE over a directional beam and means for transmitting, to the UE, an indication to modify a carrier for communications from a first narrowband carrier associated with the directional beam to a second narrowband carrier associated with a second directional beam, the second narrowband carrier being different from the first narrowband carrier. The apparatus may include means for switching to the second narrowband carrier based on the indication.

A non-transitory computer-readable medium storing code for wireless communication is described. The code may include instructions executable by a processor to communicate with a UE over a directional beam and transmit, to the UE, an indication to modify a carrier for communications from a first narrowband carrier associated with the directional beam to a second narrowband carrier associated with a second directional beam, where the second narrowband carrier may be different from the first narrowband carrier.

The instructions may be executable to switch to the second narrowband carrier based on the indication.

In some examples of the method, apparatuses, and non-transitory computer-readable medium described herein, the second narrowband carrier may be from a set of candidate carriers.

Some examples of the method, apparatuses, and non-transitory computer-readable medium described herein may further include operations, features, means, or instructions for transmitting a configuration of the set of candidate carriers to the UE, where the configuration may be transmitted via radio resource control signaling, a MAC control element, or any combination thereof.

Some examples of the method, apparatuses, and non-transitory computer-readable medium described herein may further include operations, features, means, or instructions for transmitting DCI, a MAC control element, or any combination thereof, that includes the indication to modify the carrier for communications.

Some examples of the method, apparatuses, and non-transitory computer-readable medium described herein may further include operations, features, means, or instructions for receiving, in response to the received DCI, or the MAC control element, or any combination thereof, an acknowledgment of the indication to modify the carrier for communications.

DETAILED DESCRIPTION

Figure 1:
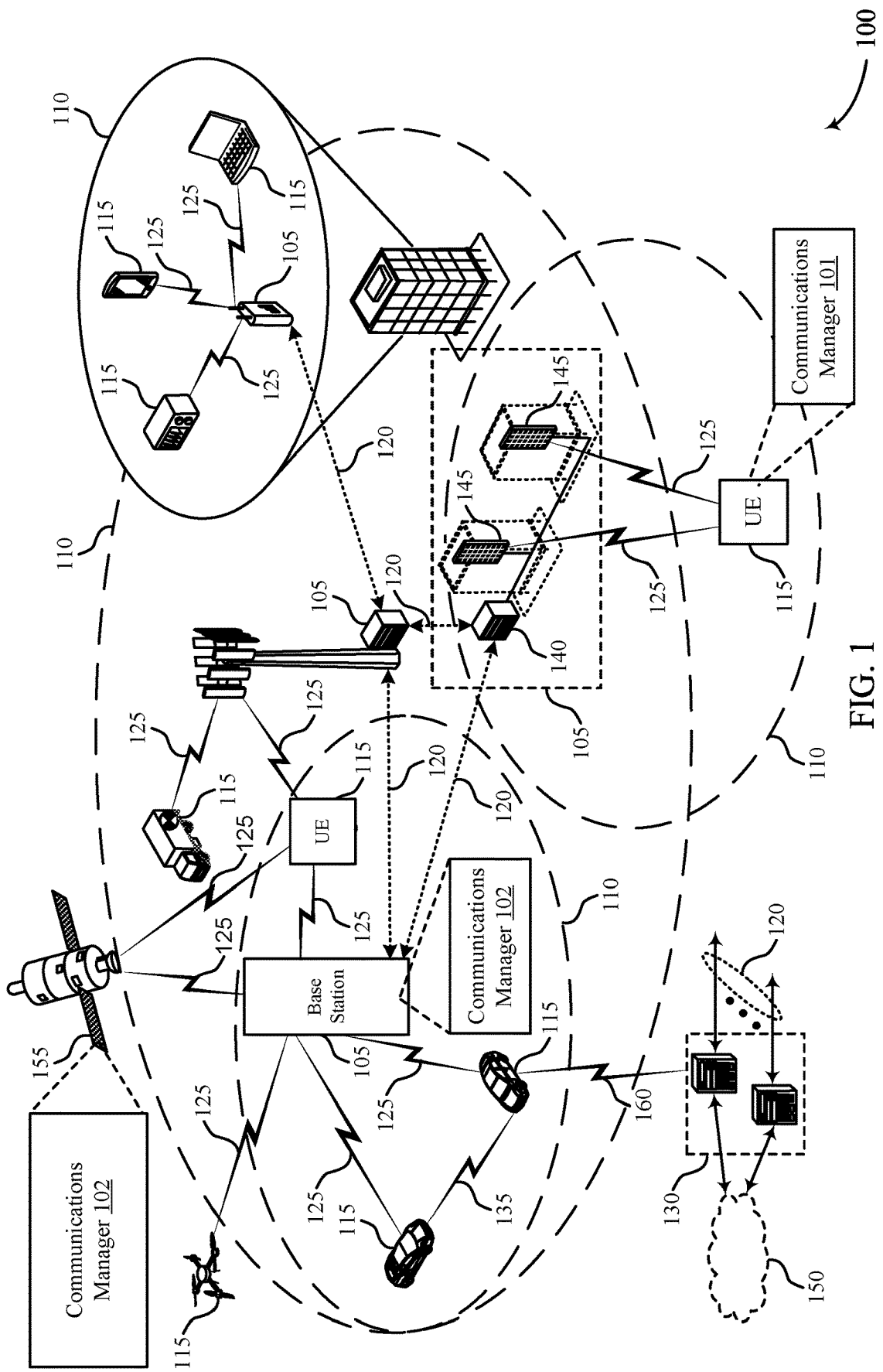
FIG. 1 illustrates an example of a wireless communications system that supports connected mode beam management for narrowband systems in accordance with one or more aspects of the present disclosure.

Non-terrestrial networks (NTNs) may provide coverage to a geographic area by using one or more high-altitude devices (e.g., satellites) in communication with one or more user terminals or one or more base stations (e.g., next-generation NodeBs or giga-NodeBs (either of which may be referred to as a gNB)), which may also be referred to as access stations or access gateways). The one or more high-altitude devices may also communicate with both the one or more user terminals and the one or more base stations. A high-altitude device may be referred to as a satellite herein, and a terrestrial base station may also be referred to as a base station herein.

In some examples, a base station may transmit data to a satellite, which may then be transmitted to a user terminal, or the base station may transmit data to a user terminal and the data may then be transmitted to a satellite. Alternatively, a user terminal may communicate with a satellite indirectly through a base station. In some examples, a satellite itself may be or include functionality of a base station. In such examples, the satellite and the user terminal may communicate directly. Examples of a user terminal may include a UE, a relay equipment configured to relay a signal between a satellite and a user terminal, or other devices. In some cases, a non-terrestrial network (NTN) may support narrowband internet of things (NB-IoT) communications. As such, a user terminal may be an IoT device, which may be a low cost or low complexity device that may provide for automated communications between machines. An IoT device may support NB-IoT communications to support relatively improved battery life, system capacity, and spectrum efficiency.

A satellite may provide multiple directional beams. In some examples, different satellite beams belonging to the same satellite may use different frequencies. The satellite may move, for example, in low earth orbit, which may affect channel conditions for the UE on the different directional beams. For example, a UE or a base station may be configured to communicate with the satellite on a first beam at a first point in time, but the satellite may move such that, at a second point in time, the first beam may not be preferable for communications between the UE or base station and the satellite.

In some cases, the UE or the base station may perform beam reselection to improve communication conditions as the satellite moves and changes the channel conditions for the beams. But if the UE is communicating using NB-IoT communications, the UE may be limited in its ability to perform connected mode measurements. For example, the UE may have limited capability (e.g., a low-power, reduced capacity, or low complexity device) and performing measurements may affect the operation of the UE. In other examples, the UE may not be configured to perform measurements of signals received on the beams (e.g., while in a connected mode), resulting in limited or no mechanisms by which a UE may perform beam management procedures.

By implementing techniques described herein, a UE may transmit an uplink signal (which may be referred to herein as a channel sounding message, but may additionally or alternatively include a message with a random access preamble, a sounding reference signal (SRS), or some other signal that may facilitate sounding of a directional beam) in a narrowband carrier to assist the network in determining the quality of a directional satellite beam for communication between the network and the device (e.g., between the UE and a satellite). For example, the network may use the channel sounding message from the UE to estimate the channel quality of a particular satellite beam used for communications with the UE. In such cases, the random access preamble, the SRS, or the like, may be transmitted on a narrowband carrier from a set of narrowband carriers that are associated with a directional beam. In addition, the uplink signaling may be configured to be transmitted in one beam or across multiple beams (e.g., via a narrowband carrier associated with each beam). In some aspects, a narrowband carrier may be referred to as a set of frequency resources, a frequency resource, or some similar terminology.

A UE may be configured with a configuration, a triggering mechanism, or both, for transmission of the channel sounding message. The configuration may include, but is not limited to: locations of carriers (e.g., a narrowband carrier); a location across time, frequency, and/or beam; a resource arrangement across time, frequency, and/or beams; values for numbers of repetitions of a preamble repetition unit of a random access preamble, or the like. Additionally, the triggering mechanism may define one or more parameters associated with a timing for transmitting the channel sounding message. For example, the triggering mechanism may define whether the channel sounding message may be triggered for transmission periodically, aperiodically, semi-persistently, or when initiated by the UE (e.g., based on some event or event trigger). In some cases, when a random access preamble is used as the channel sounding message, the configuration, the triggering mechanism, or both, of the random access preambles may be distinct from other configurations and triggering mechanisms used for random access preamble transmission, for example, in terrestrial communications. As such, when transmitting a random access preamble as the channel sounding message on the narrowband carrier, the random access preamble may be different from or may be transmitted differently (e.g., on a different carrier) than other preambles used for random access procedures. This may enable the network to know that the uplink signal may be used for determining a beam or channel quality.

The network may configure the UE to communicate on a different carrier, beam, or both, within the same cell or within a different cell based on one or more channel sounding messages transmitted by the UE per the configurations provided by the network. In some examples, the channel sounding messages transmitted by the UE may inform one or more parameters of a beam-switch procedure. In some cases, the beam-switch procedure may be a separate procedure from the procedure to provide configurations and triggering mechanisms to the UE for one or more channel sounding messages.

As further described herein, a UE may perform beam and/or carrier switching based on signaling received from the network. For instance, the network may transmit an indication to the UE to switch carriers, beams, or both, where one or more carriers that the UE may switch to may be selected from a set of candidate carriers. In such cases, the candidate carriers may be configured via radio resource control (RRC) signaling, and the UE may acknowledge receipt of the indication to switch carriers/beams.

Aspects of the disclosure are initially described in the context of wireless communications systems. Aspects of the disclosure are illustrated by and described with reference to satellite beam configurations, cell configurations, resource configuration and example process flow diagrams. Aspects of the disclosure are further illustrated by and described with reference to apparatus diagrams, system diagrams, and flowcharts that relate to connected mode beam management for narrowband systems.

FIG. 1 illustrates an example of a wireless communications system 100 that supports connected mode beam management for narrowband systems in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 160.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). In NB-IoT communications, a "carrier" may refer to a narrowband channel. For example, carrier may be a one physical resource block wide narrowband channel. Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, NB-IoT, enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

NB-IoT may refer to low-power wide area communications used for a number of different devices (e.g., UEs 115). Communications in accordance with NB-IoT may utilize a bandwidth within some narrowband (e.g., a 200 kHz radio frequency band). As such, NB-IoT may provide for efficient power consumption by the various devices while also enabling enhanced system capacity and spectrum efficiency. Accordingly, systems that support NB-IoT may provide for increased battery life and increased connection density for a relatively high number of UEs 115. In some implementations, NB-IoT may be used to support various deployments, such as smart metering, facility management, connections to various appliances and devices, and industrial applications, to name a few.

A UE 115 may operate in accordance with various states or modes for communicating with a network. As an example, a UE may operate in accordance with an RRC idle state (e.g., RRC_IDLE), an RRC inactive state (e.g., RRC_INACTIVE), and an RRC connected state (e.g., RRC_CONNECTED). The UE 115 may transition between the various states or modes, for example, based on communications traffic for the UE 115. In the RRC idle state (which may be referred to as an idle mode), a UE 115 may not be registered to a particular cell, and may accordingly lack an access stratum (AS) context, and the UE 115 may thus not have an active RRC connection established with the network (e.g., via a base station 105). In the idle mode, the UE 115 may wake up periodically to monitor channels for paging or other signaling, and the mobility of the UE 115 may be managed by the UE 115 when performing measurements of one or more cells. In the RRC connected state (which may be referred to as a connected mode), the UE 115 may have an established RRC connection (e.g., with a 5GC) where the UE 115 may store an AS context. Here, the UE 115 may belong to a known cell and may be identified using a cell radio network temporary identifier (C-RNTI) assigned to the UE 115. While in the connected mode, the UE 115 may monitor for messages transmitted by the network, which may include monitoring various channels (e.g., paging channels, control channels, or the like).

The RRC inactive state may be used to reduce signaling overhead, provide an intermediate mode (e.g., between idle and connected), and may also be used to reduced latency when transitioning to another mode (e.g., to the connected mode). The UE 115 may periodically wake up while in the inactive mode to monitor for paging messages from the network, where the UE 115 may in some cases perform a random access procedure to move to the connected mode and communicate with the network. In some examples, a UE 115 (e.g., an NB-IoT UE) may not perform measurements of signals received from the network, for example, while in the connected mode, as the measurements may result in increased processing and power consumption at the NB-IoT UE. Accordingly, such a device may lack a mechanism by which to efficiently modify or change beams used to communicate with the network. However, as described herein, the UE 115 may transmit uplink messages (e.g., a narrowband physical random access channel (NPRACH) preamble, an SRS, or other messaging) on a narrowband carrier associated with a beam, which may signal a beam or channel quality to the network. The network may use such messaging to modify or adjust a beam and/or carrier used by the UE 115, enabling increased communications quality and throughput. Such beam management techniques (which may also extend or be used for beam failure detection, beam failure recovery, or radio link failure procedures) may enable efficient mobility management for a UE 115. Additionally or alternatively, in the case of a NTN where a high-altitude node may be moving relative to the UE 115 (and the UE 115 may be relatively stationary, such as in a smart building deployment or other deployment), may provide a mechanism for enhanced beam selection as the node is moving.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as the range of 300 megahertz (MHz) to 300 gigahertz (GHz). In some example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6

GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 also includes at least one satellite 155. The satellite 155 may communicate with one or more of the base stations 105 and the UEs 115. The satellite 155 may be any suitable type of communication satellite configured to facilitate communications between different nodes in a wireless communication system, such as an NTN. The satellite 155 may be an example of a space satellite, a balloon, a dirigible, an airplane, a drone, or an unmanned aerial vehicle, among other examples. In some examples, the satellite 155 may be or include a geosynchronous or geostationary earth orbit (GEO) satellite, a low earth orbit (LEO) satellite or a medium earth orbit (MEO) satellite, or a high-altitude platform (HAP), among other examples. In some examples, the satellite 155 may be a multi-beam satellite configured to provide service for multiple service beam coverage areas in a defined geographical service area.

In some examples, a cell may be provided or established by a satellite 155 as part of an NTN. A satellite 155 may, in some examples, perform the functions of a base station 105. For example, the satellite 155 may directly communicate with the core network 130 without utilizing a terrestrial base station (for example, the base station 105), may directly communicate with one or more devices, such as one or more UEs 115, or both. In some other examples, the satellite 155 may be an example of a relay transponder for a base station 105.

In various examples, a communications manager may be a component of or included in a device to support various beam management techniques, such as the transmission and reception of channel sounding messages. For example, a UE 115 may include a communications manager 101 or a satellite 155 may include a communications manager 102. Additionally or alternatively, a base station 105 may include the communications manager 102.

In some examples, a communications manager 101 may communicate with a network over a directional beam and receive, from the network, a configuration of one or more channel sounding messages for one or more directional beams. In such cases, each directional beam of the one or more directional beams may be associated with a set of narrowband carriers, and each of the one or more channel sounding messages being configured for transmission on a narrowband carrier of the set of narrowband carriers. In some examples, the communications manager 101 may determine a trigger for transmitting the one or more channel sounding messages based on the configuration and transmit, to the network, the one or more channel sounding messages on respective narrowband carriers in accordance with the trigger and the configuration. In some examples, the communications manager 101 may also communicate with a network over a directional beam and receive, from the network, an indication to modify a carrier for communications from a first narrowband carrier associated with the directional beam to a second narrowband carrier associated with a second directional beam, the second narrowband carrier being different from the first narrowband carrier. The communications manager 101 may switch to the second narrowband carrier based on the indication.

In some examples, a communications manager 102 may communicate with a UE over a directional beam and receive one or more channel sounding messages from the UE, the one or more channel sounding messages received on a narrowband carrier of a set of narrowband carriers. In some examples, the communications manager 102 may determine a beam or channel quality of the directional beam based on the received one or more channel sounding messages. The communications manager 102 may also communicate with a UE 115 over a directional beam. In some examples, the communications manager 102 may transmit, to the UE, an indication to modify a carrier for communications from a first narrowband carrier associated with the directional beam to a second narrowband carrier associated with a second directional beam, the second narrowband carrier being different from the first narrowband carrier. In some examples, the communications manager 102 may switch to the second narrowband carrier based on the indication.

The wireless communications system 100 may support efficient beam reselection for a UE 115 communicating with a satellite 155. In some cases, each beam of the satellite 155 may include one or more carriers. In some examples, carriers may be narrowband carriers including one resource block of 180 kHz for narrowband IoT communications. For example, each beam of a satellite 155 may include at least one carrier (e.g., an anchor carrier) which carries synchronization signals, system information, or both. The satellite 155 may provide one or more cells, where each cell may include one or more sets of carriers. Each set of carriers may correspond to a different beam of the satellite 155. In such cases, wireless communications system 100 may support a UE 115 (e.g., an NB-IoT device) transmitting a message to a network (e.g., an NTN) such that the network may determine a beam or channel quality for beam management purposes. In particular, a UE may transmit an uplink channel sounding message on a carrier associated with a satellite beam. The channel sounding message may be a random access preamble message or a message that includes a preamble (e.g., an NPRACH preamble) or may include an SRS, or some other signal. In any case, the channel sounding message may be configured by the network, and the UE may transmit the channel sounding message based on the configuration and a trigger mechanism. The configuration may include an indication of locations for transmitting the channel sounding messages (e.g., on a non-anchor carrier, on some time/frequency resources, on one or more beams) and the transmission of the channel sounding message may be periodic, aperiodic, event-based, or any combination thereof. The channel sounding messages may be transmitted across different directional beams between a UE 115 and the network (e.g., via a satellite 155, a base station 105), where each directional beam may be associated with a set of carriers, and a channel sounding message may be transmitted in a carrier of the set of carriers for respective beams.

It is noted that, while aspects of the present disclosure are described in the context of NTN and NB-IoT systems, it is understood that the described techniques may be supported by other communications technologies and system, and the features described herein should not be considered limiting or applicable only to NTN or NB-IoT systems.

Figure 2:
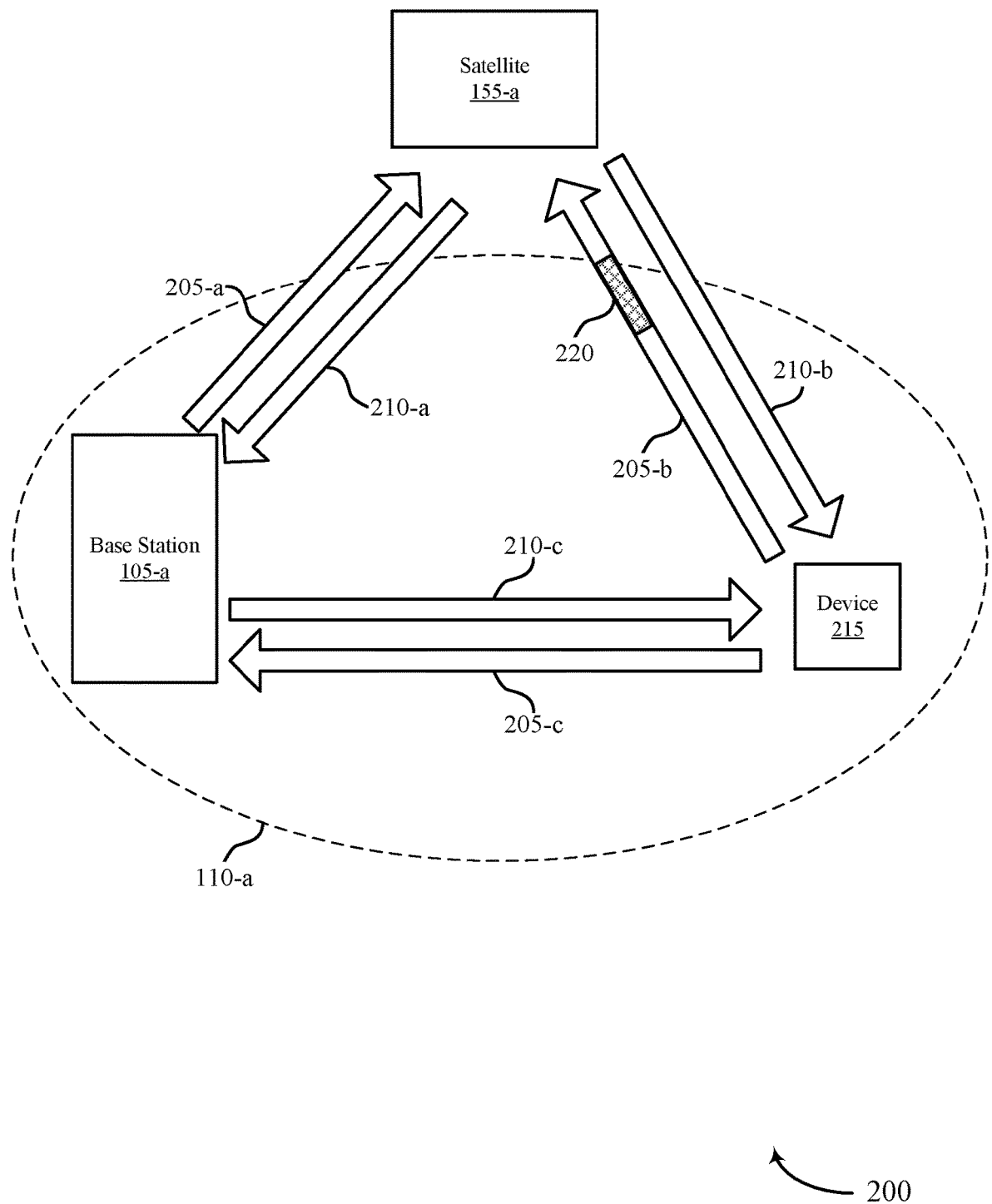
FIG. 2 illustrates an example of a wireless communications system that supports connected mode beam management for narrowband systems in accordance with one or more aspects of the present disclosure.

FIG. 2 illustrates an example of a wireless communications system 200 that supports connected mode beam management for narrowband systems in accordance with one or more aspects of the present disclosure. In some examples, wireless communications system 200 may implement aspects of wireless communications system 100. For example, the wireless communications system 200 may include a base station 105-*a*, a device 215 (e.g., a UE), and a satellite 155-*a*, which may be examples of a base station 105, a UE 115, and a satellite 155, as described with reference to FIG. 1.

The wireless communications system 200 may provide a geographic coverage area 110-*a* by using a satellite 155-*a* in a communication with one or more of a base station 105-*a* and a device 215. The base station 105-*a* may therefore serve a geographic coverage are 110-*a* with assistance of or through, the satellite 155-*a*. In some examples, the base station 105-*a* may not have its own ground geographic coverage area. For example, the base station 105-*a* may communicate directly with the satellite 155-*a* without directly communicating to any ground user terminals, such as the device 215. In some examples, the satellite 155-*a* may relay communications between the base station 105-*a* to the device 215. For example, the device 215 may communicate with the satellite 155-*a* via the base station 105-*a* or vice-versa. In some examples, a ground or terrestrial base station (for example, the base station 105-*a*) may be an example of a gateway. In some examples, the satellite 155-*a* itself may function as a base station (in other words, the satellite 155-*a* may perform scheduling and radio link control, among other operations). An NTN may not, in some examples, include base station 105-*a* that directly communicates with the device 215 without relaying communications through a satellite 155-*a*. In some other examples, an NTN may be formed of satellites 155-*a* and may exclude base stations 105.

In some examples, the device 215 and the satellite 155-*a* may communicate directly via the uplink 205-*b* and the downlink 210-*b*. Additionally or alternatively, the device 215 and the satellite 155-*a* may communicate indirectly through the base station 105-*a* via the uplink 205-*a* and the downlink 210-*a* between the base station 105-*a* and the satellite 155-*a* as well as via the uplink 201-*c* and the downlink 210-*c* between the base station 105-*a* and the device 215. In some examples, for communications originating at the device 215 and destined for the base station 105-*a*, the device 215 may transmit an uplink transmission on the uplink 205-*b* to the satellite 155-*a*. The satellite 155-*a* may relay the uplink transmission on the uplink 205-*b* as a downlink transmission on the downlink 210-*a* to the base station 105-*b*.

The satellite 155-*a* may provide multiple beams. In some example, different satellite beams belonging to the satellite 155-*a* may use different frequencies. The satellite 155-*a* may move, for example in low earth orbit, which may affect channel conditions for the device 215 on the different beams. For example, the device 215 may perform cell reselection as the satellite 155-*a* moves to improve communication condition.

In some examples, the device 215 may operate in modes or with communication schemes that may not perform connected mode measurements after a communication link is established. For example, the device 215 may operate in a low-power mode, or the device 215 may be an example of an NB-IoT UE. The device 215 may perform measurements in an idle mode to establish connection with a cell, but once the connection is established, the device 215 may suspend further measurements to conserve power. The device 215 may not monitor other cells or other beams while in the connected mode. In some cases, if the device 215 experiences communication failure, device 215 may issue a radio link failure and the device 215 may initiate the process to re-establish a communication link. For example, the device 215 may be an NB-IoT UE that may only monitor a single carrier (the carrier configure via RRC signaling). If the link quality between the device 215 and the satellite 155-*a* deteriorates, the device 215 may declare a radio link failure and the device 215 may initiate a cell-reselection process.

By implementing techniques described herein, the device 215 may transmit one or more uplink messages, such as one or more channel sounding messages 220, which may include a random access preamble message, or a SRS, or the like, to assist the network in determining the quality of one or more directional satellite beams for communication between the satellite 155-*a* and the device 215. For example, the satellite 155-*a* may use one or more channel sounding messages 220 from the device 215 to estimate the beam or channel quality of a particular satellite beam at the device 215. In some examples, the channel sounding message 220 may be an NPRACH preamble message (e.g., a message that includes an NPRACH preamble), or a SRS, or another signal that may be used by the network for determining a beam or channel quality. In some cases, the random access preamble message may be a narrowband random access preamble message, which may include a NPRACH preamble with a different signal structure compared to a physical random access channel (PRACH) preamble (e.g., used for eMBB).

Satellite 155-*a* may receive the one or more channel sounding messages 220 from the device 215 transmitted on one or more beams and measure the beam quality for the one or more beams for communication between the device 215 and the satellite 155-*a* based on the received one or more channel sounding messages 220. The satellite 155-*a* may determine configuration for communication with device 215 based on the measured beam quality of the one or more beams. In some examples, satellite 155-*a* may configure device 215 to use a different beam based on the measured beam quality.

The device 215 may be configured with one or more set of resources to transmit one or more channel sounding messages 220 across different beams. The configuration may include the location or locations of carriers, the location or locations across at least one of time, frequency, and satellite beams, the arrangement across at least one of time, frequency, and beams, and possible values for number of repetitions of a preamble repetition unit of a random access preamble. In such cases, the device 215 may identify which narrowband carriers (e.g., from a set of narrowband carriers that is associated with a respective beam of one or more beams) may be used for transmitting a channel sounding message 220.

The device may be configured with a trigger mechanism for transmitting the one or more channel sounding messages 220. In some examples, the device 215 may be configured to transmit a channel sounding message 220 at set time intervals. For example, these set time intervals could be periodically or at a defined schedule. Additionally or alternatively, the device 215 may be configured to transmit a channel sounding message aperiodically. For example, the device 215 may be prompted by signaling to transmit a channel sounding message (e.g., on demand). In other examples, the device 215 may determine to initiate transmission of a channel sounding message. For example, the device 215 may determine to imitate transmission of a channel sounding message in response to an event, such as determination of poor beam quality.

In some examples, a channel sounding message occasion may be triggered by downlink control information (DCI). For example, a channel sounding message occasion may be triggered by a narrowband physical downlink control channel (NPDCCH) order DCI (e.g., a DCI including an NPDCCH order). The NPDCCH order in DCI may be configured to indicate which beam or beams for transmitting an NPRACH preamble message as the channel sounding message. Additionally or alternatively, a single NPDCCH order DCI may trigger transmission of an NPRACH preamble message (e.g., a channel sounding message 220) at or during a random access occasion (e.g., using random access resources in time and frequency) on multiple beams. In some cases, a single NPDCCH order DCI may trigger transmission of random access preamble messages consecutively in time on different frequencies resources, such as to utilize TDM and FDM for multiple random access preambles. For example, the device 215 may be configured with coordinated channel sounding message occasions across multiple carriers. Additionally or alternatively, a single NPDCCH order may trigger random access message occasions across multiple time instances, where the carrier or beam location may be located in different time instances. This way, the satellite 155-a may determine to receive beam quality indication from the device 215 while reducing NPDCCH monitoring at the UE.

In some examples, a channel sounding message occasion may be triggered by unicast RRC on a periodic basis, or be triggered by a semi-persistent scheduling, and some trigger parameters may be updated by MAC-control element (CE)/DCI. In some examples, the movement pattern of satellite 155-a may be known or predictable, and the triggering mechanism for the channel sounding messages may be configured based on the known movement pattern of the satellite 155-a. MAC-CE, DCI, or both may indicate or adjust which carriers or beams to use for transmission of the channel sounding message. Additionally or alternatively, MAC-CE, DCI, or both, may activate or deactivate channel sounding messages (e.g., in some time windows, such as when the device 215 may be performing a beam change). Here, the network may estimate one or more time periods during which the device 215 may be modifying a directional beam, and the transmissions of a channel sounding message may be activated or deactivated based on the one or more time periods.

In some examples, the device 215 may initiate transmission of a channel sounding message. The device 215 may determine to transmit a channel sounding message in response to an event such as, but not limited to, the device 215 experiencing poor channel conditions, traffic load and network congestion, meeting beam-switching or beam-failure thresholds based on downlink reference signal measurements, or the like. Resources for such UE-initiated channel sounding messages may be shared among multiple UEs, or access may be contention based. In some examples, the device 215 may be able to identify an adequate beam based on global navigation satellite system (GNSS) signaling, and the device 215 may transmit on the identified beams. Alternatively, the device 215 may also be configured with measurement objects to measure the signal strength on different beams, and transmit such the channel sounding message 220 if some measurement event is triggered. For example, the device 215 may determine that an adjacent beam may have better characteristic, and the device 215 may transmit a channel sounding message 220 in response to the determination. In such examples, the transmission of the channel sounding message may also be a part of a beam-failure detection reporting, or a beam failure recovery procedure, that may ensue if the current beam is determined to have an inferior signal quality. In some cases, a device 215 may perform NTN-specific connected mode measurement to support transmitting one or more channel sounding messages 220.

In some cases, device 215 may determine that the carrier configured for communication with satellite 155-a is below the threshold of reception in one or more parameters. The device 215 may declare a beam failure and initiate a beam failure recovery (BFR) procedure instead of declaring a radio link failure procedure. In some cases, device 215 may initiate the BFR process by declaring a beam failure, without declaring a radio link failure, to the network via communication to base station 105-a, satellite 155-a, or both. The device 215 may also initiate transmitting one or more channel sounding messages on one or more beams. The device 215 may connect to a different carrier based on the one or more channel sounding messages 220. In such cases, performing the BFR process may be an example of a UE-initiated, event-triggered, or event-driven example of transmitting the channel sounding messages 220 (e.g., transmitting the NPRACH preamble message) on different carriers in different beams.

In some examples, the channel sounding message may use the NPRACH framework, but the channel sounding message may be performed using any reference signal. For example, the channel sounding message may be a narrowband SRS. Additionally or alternatively, the channel sounding message may be an NTN specific uplink signal. In some cases, the channel sounding message framework (e.g., configuration options, triggering mechanisms, etc.) may be applicable to applications using other reference signals. These other application may include different physical signal properties such as, but not limited to sequence, and time-frequency mapping, or the like. For example, these other applications may use a different cyclic-prefix configuration than in the beginning of each preamble resource unit (PRU) in a NPRACH preamble. Additionally, the DCI-triggering mechanism may be different from an NPDCCH-order, which is specific to NPRACH.

After transmitting one or more channel sounding messages, device 215 may return to monitoring the carrier that the device 215 was originally connected to, without waiting for a response to the one or more channel sounding messages. In the example, where the one or more channel sounding messages are transmitted using a NPRACH preamble transmission, device 215 may return to monitoring the carrier that the device 215 was originally connected to without waiting for a response to the NPRACH preamble transmission, to continue communications. In this example, the UE may not monitor for a response (e.g., a random access response (RAR)) after the transmission of the one or more NPRACH preambles in one or more carriers in different beams. The UE behavior of not monitoring for a RAR following transmission of an NPRACH preamble used for a channel sounding message may be different from UE behavior following NPRACH preamble transmission for other applications such as, but not limited to, an initial access procedure or a timing synchronization procedure, where the UE monitors for a RAR to indicate an action that the UE is to perform.

In some examples, a mechanism may be used by which a beam-switch procedure may be carried out by the network. Such beam switching may be based implicitly on the uplink sounding signals sent by the device 215 or per configurations provided by the network. In such cases, the network may determine to configure device 215 to communicate on a different carrier, or beam, or both, based on the one or more channel sounding messages 220. Satellite 155-a or base station 105-*a* may transmit a carrier or beam switch configuration to device 215 via downlink 210-*b* or downlink 210-*a*, respectively.

UE 115-*a* may be configured with a set of candidate carriers, candidate beams, or both. That is wireless communications system 200 may support carrier switching (e.g., carriers in different beams) via an indication, where a carrier to be switched to may be from among a set of candidate carriers. The device 215 may be configured with the set of candidate carriers, candidate beams, or both during initial access. In some cases, the device 215 may be configured with the candidate carriers via RRC signaling. Satellite 155-*a* or base station 105-*a* may configure device 215 to switch to a different carrier or beam from the set of candidate carrier or candidate beams via DCI or MAC-CE signaling. Device 215 may perform a carrier or beam switch procedure based on the DCI or MAC-CE signaling for carriers or beams within the set of candidate carriers or candidate beams without performing RRC reconfiguration. In some examples, the device 215 may provide a feedback message to the network that acknowledges the receipt of the DCI and/or MAC-CE. That is, the device 215 may provide an acknowledgment of the indication to switch beams/carriers, which may be transmitted via a HARQ ACK transmission (e.g., on NPUSCH format 2).

Figure 3:
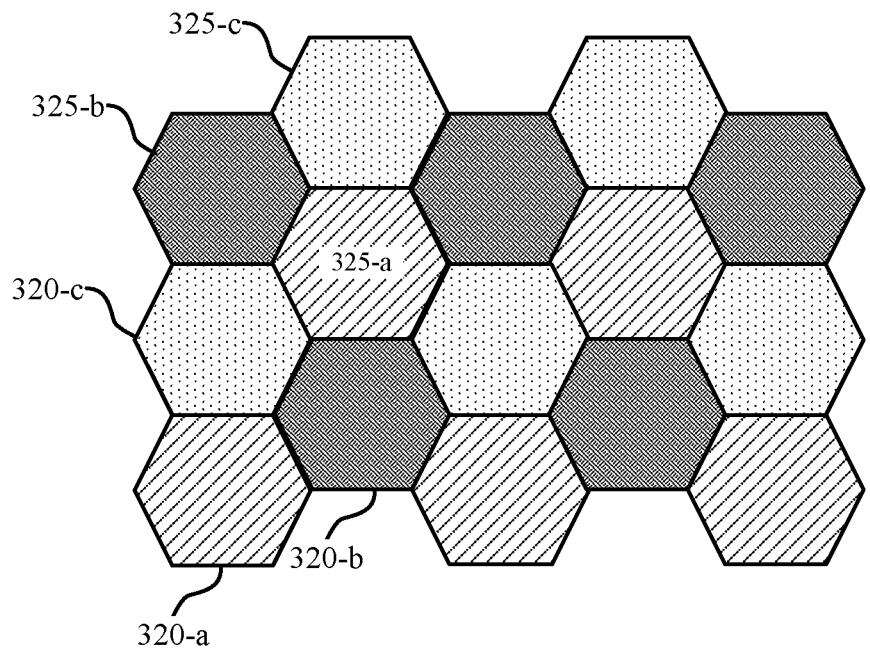
FIG. 3 illustrates an example of a satellite beam configuration that supports connected mode beam management for narrowband systems in accordance with one or more aspects of the present disclosure.
Figure 3:
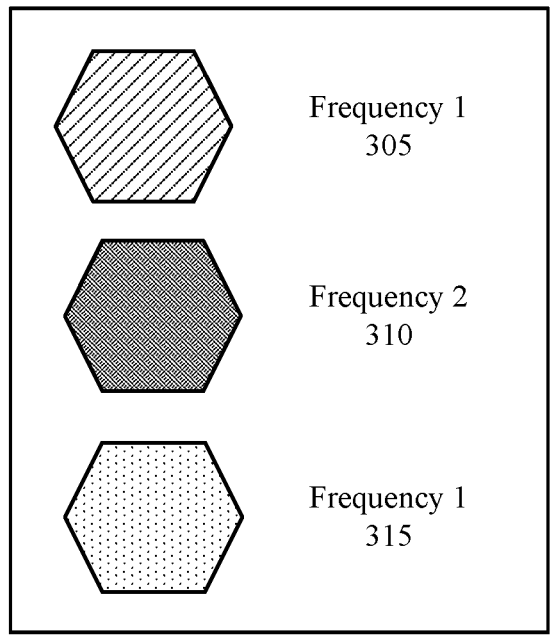

FIG. 3 illustrates an example of a satellite beam configuration 300 that supports connected mode beam management for narrowband systems in accordance with one or more aspects of the present disclosure. In some examples, satellite beam configuration 300 may implement aspects of wireless communications system 100 and wireless communications system 200.

A satellite may provide multiple beams for communications with a UE 115 (e.g., a device such as the device 215 described with reference to FIG. 2). In some cases, different satellite beams of a satellite may have different frequencies. For example, the satellite may transmit on beams at multiple frequencies, such as a first frequency 305, a second frequency 310, and a third frequency 315. A coverage area 320 may be associated with a beam of the satellite. For example, coverage area 320-*a* may be associated with a beam that uses the first frequency 305, coverage area 320-*b* may be associated with a beam that uses the second frequency 310, and coverage area 320-*c* may be associated with a beam that uses the third frequency 315. In some other examples, additional frequencies may be used by beams of the satellite.

In some cases, a coverage area 320 may be associated with a geographical area, similar to a coverage area 110, as described with reference to FIG. 1. As a UE 115 moves, or as the satellite moves (e.g., in low earth orbit), the UE 115 may move between coverage areas or have better communications conditions with different beams. UEs 115 may implement techniques described herein to improve connected mode beam management for narrowband communications.

In an example, the satellite may be configured with one or more sets of carriers. In some cases, the carriers may be examples of narrowband carriers, for example, used for NB-IoT communications. Each set of carriers may be associated with a different beam. For example, a first beam for coverage area 320-*a* may provide a first set of carriers, a second beam for coverage area 320-*b* may provide a second set of carriers, and a third beam for coverage area 320-*c* may provide a third set of carriers. In some examples, each set of carriers may include at least one carrier which is used to send synchronization signals and system information. In some cases, a carrier which is used to send synchronization signals and system information may be referred to as an anchor carrier.

In some cases, the satellite may provide one or more cells. For example, a first cell may include the first set of carriers associated with coverage area 320-*a* and the first beam, the second set of carriers associated with coverage area 320-*b* and the second beam, and the third set of carriers associated with coverage area 320-*c* and the second beam. In some cases, a cell may include additional, or fewer, beams or sets of carriers. Additionally, the satellite may provide a second cell that may be associated with coverage area 325-*a*, coverage area 325-*b* and coverage area 325-*c*. In some cases, coverage area 325-*a* may be associated with the same first set of carriers as coverage area 320-*a*, coverage area 325-*b* may be associated with the same second set of carriers as coverage area 320-*b*, and coverage area 325-*c* may be associated with the same third set of carriers as coverage area 320-*c*.

In some cases, each beam of the satellite may correspond to a cell. For example, each coverage area 320 may correspond to a cell and a beam. The UE 115 may connect to a cell and similarly obtain system information for other cells in order to make efficient cell reselection.

A UE 115 may be located at a first location at a first point in time in coverage area 320-*b* and establish a communication link with a satellite 155 on a first carrier on a first beam. At a second point in time, the satellite 155 may move with respect to the UE 115, and the communication link establish may degrade. The UE 115 may transmit one or more channel sounding messages to assist the network in improving channel conditions. The UE 115 may transmit channel sounding messages on one or more beams, where the one or more beams may be associated with the beams serving surrounding coverage areas. For example, the UE 115 may transmit an uplink message (e.g., a random access preamble, an NPRACH preamble, a SRS, or the like) across one or more directional beams to assist the network in determining a quality of a directional satellite beam for communications between the network and the device. In such cases, each directional beam may be associated with a set of narrowband carriers, and the uplink signaling (e.g., the random access preamble, the SRS) may be transmitted in a narrowband carrier of the set of narrowband carriers. If the quality of the beam serving the device degrades below a threshold, the uplink signal may be used to switch the device to a different beam or to support a beam failure recovery processes.

The satellite 155 may reconfigure communication resources for communication with the UE 115 based on the channel sounding messages transmitted by the UE 115. For example, the satellite 155 may determine to configure the UE 115 to communicate with the beam serving coverage area 320-*c* based on the channel sounding messages transmitted by the UE 115. In this example, coverage area 320-*b* and coverage area 320-*c* may be in the same cell, therefore the UE 115 may perform handover procedures associated with changing carriers or beams within the same cell. In another example, the satellite 155 may determine to configure the UE 115 to communicate with the beam serving coverage are 325-*a* based on the channel sounding messages transmitted by the UE 115. In this example, coverage area 320-*b* and coverage area 325-*a* may be in different cells, therefore, the UE 115 may perform handover procedures associated with changing cells. In this example, the UE 115 may perform procedures to establish a new RRC connection with the new cell.

Figure 4:
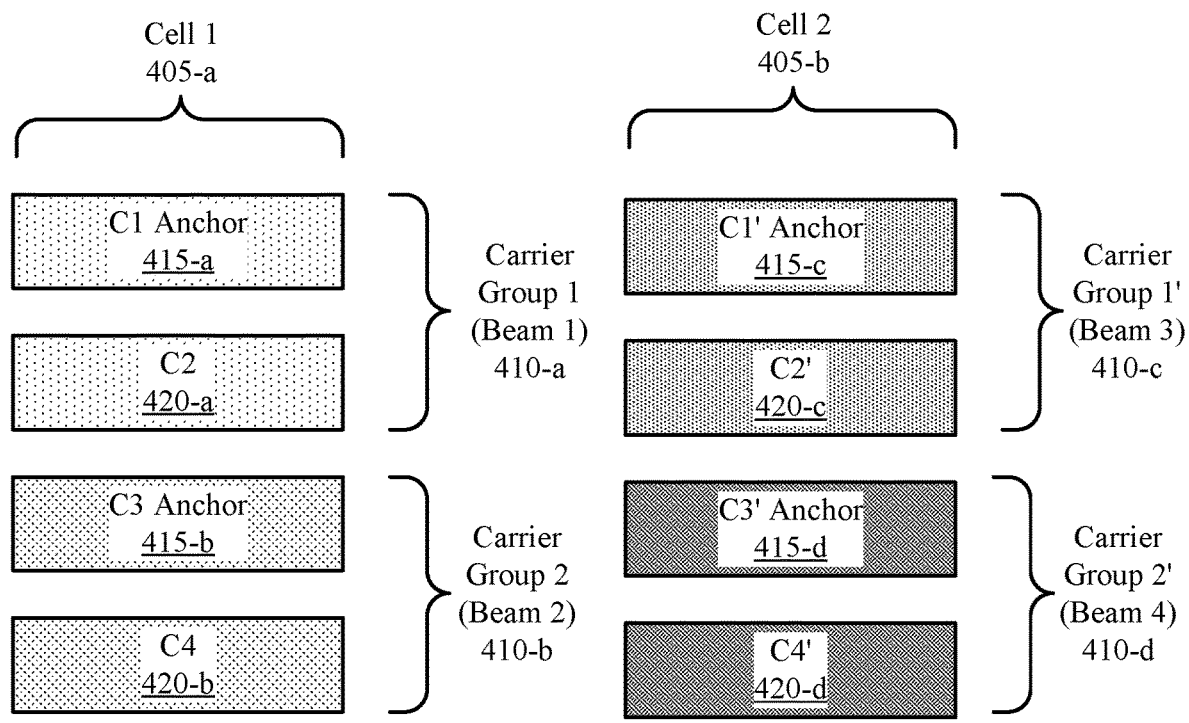
FIG. 4 illustrates an example of a cell configuration that supports connected mode beam management for narrowband systems in accordance with one or more aspects of the present disclosure.

FIG. 4 illustrates an example of a cell configuration 400 that supports connected mode beam management for narrowband systems in accordance with one or more aspects of the present disclosure. In some examples, cell configuration 400 may implement aspects of wireless communications system 100 and wireless communications system 200.

A satellite may provide one or more beams for a UE 115. In some cases, each satellite beam may correspond to one or more carriers. A narrowband IoT carrier may be an example of one of the carriers provided by the satellite.

For example, the satellite may provide one or more cells 405, where each cell may include one or more sets of carriers 410. Cell 405-a may include set of carriers 410-a and set of carriers 410-b, and cell 405-b may include set of carriers 410-c and set of carriers 410-d. Set of carriers 410-a may include carriers including at least anchor carrier 415-a and carrier 420-a. Set of carriers 410-b may include anchor carrier 415-b and carrier 420-b. Set of carriers 410-c of cell 405-b may include anchor carrier 415-c and carrier 420-c, and set of carriers 410-d may include anchor carrier 415-d and carrier 420-d. In other examples, a set of carriers may include a different number of carriers, or a cell 405 may include a different number of sets of carrier 410. In some cases, a set of carriers 410 may be referred to as a carrier group.

In some cases, at least one carrier in each beam may be used to send synchronization signals, system information, or both. For example, an anchor carrier 415 of a set of carriers 410 may be used to send synchronization signals and system information. In some cases, other carriers (e.g., a carrier 420) of the set of carriers 410 may be used for communications and may not be used to send synchronization signals and system information. A set of carriers 410 may, in some cases, include at least on anchor carrier 415 and zero or more carriers 420. In some cases, a set of carriers 410 may not include an anchor carrier 415 but include one or more carriers 420.

In some cases, the UE 115 may be indicated frequency information for other beams. For example, the UE 115 may be indicated a carrier frequency for carriers in the set of carriers 410-b, such as anchor carrier 415-b. In some cases, the UE 115 may be explicitly indicated the carrier frequency for set of carriers 410-b, or the UE 115 may receive an indication of a frequency shift from set of carriers 410-a. In some cases, the UE 115 may be indicated scheduling information for system information block associated with the other sets of carriers 410.

In some cases, the UE 115 may be indicated a set of anchor carriers 415, among which the UE 115 may perform a beam reselection. In some cases, the beam reselection may be initiated based on downlink control information or a MAC-CE. In some cases, the set of anchor carriers 415 may be in a same cell 405 or across different cells 405. For example, if the UE 115 is on anchor carrier 415-a, the UE 115 may be configured with anchor carrier 415-b and anchor carrier 415-c, and the UE 115 may perform a beam reselection to either of the anchor carriers. In some cases, the UE 115 may be configured with at least partial system information for the beams or sets of carriers 410.

One or more messages, such as random access preamble messages, SRSs, or channel sounding messages, may be configured for transmission on resources distinct from the resources used for initial access procedures. In some examples, to support connected mode beam management, UE 115 may be allocated with resources in a non-anchor carrier (i.e., a carrier that is not an anchor carrier), for transmission of one or more channel sounding messages. For example, if the channel sounding message is an NPRACH message, the carrier location for the one or more channel sounding messages may be distinct from the resources used for NPRACH transmissions to support initial access procedures, which may be transmitted on one or more anchor carriers. In some cases, there may be at least one carrier within each satellite beam designated for channel sounding message transmission. In some cases, transmitting a channel sounding message in a non-anchor carrier may help the network to determine the purpose of the transmission. For examples, transmitting a NPRACH preamble in a non-anchor carrier may assist the network in determining that the NPRACH preamble transmission is a channel sounding message for a beam-switching procedure instead of an initial access procedure or synchronization procedure.

In some examples, the system information in any beam may provide the carrier location or locations and corresponding channel sounding message configurations for other beams, where the other beams may be in proximity to the UE 115 or in proximity to the beam. In some examples, the system information in a first beam in a cell, may contain the carrier locations and corresponding channel sounding message configurations for the other beams in the cell. A UE 115 may use the carrier locations and corresponding channel sounding message configuration to estimate the other beams, if the UE is configured to estimate the other beams. For example, if UE 115 is configured to communicate via set of carriers 410-a, UE 115 may determine, from system information transmitted on anchor carrier 415-a, carrier location and channel sounding message configurations to transmit a channel sounding message for set of carriers 410-b.

The channel sounding message configurations may have a set of similar parameters across beams, while the channel sounding message configurations may have a set of different parameters across beams. For example, the channel sounding message configuration for a first beam may have the same periodicity as the channel sounding message configuration for a second beam. In another example, the channel sounding message configuration for a first beam may have a different timing offset than the channel sounding message configuration for the second beam. In some examples, the channel sounding message configuration in a third beam may be the same channel sounding message configuration in a fourth beam, but shifted in frequency. In this example, the configuration may be indicated in system information.

In some examples, channel sounding message occasions may be coordinated across beams in different carriers. Channel sounding message occasions may be configured with a timing offset and a periodicity. If the channel sounding message occasions are configured on a per-carrier basis without coordination with other carriers or beams, the order and timing of the channel sounding message occasions across beams may not allow efficient channel sounding of multiple beams. Alternatively, if the channel sounding message occasions are coordinated across beams in different carriers, a UE 115 may efficiently transmit channel sounding messages across multiple beams.

Figure 5:
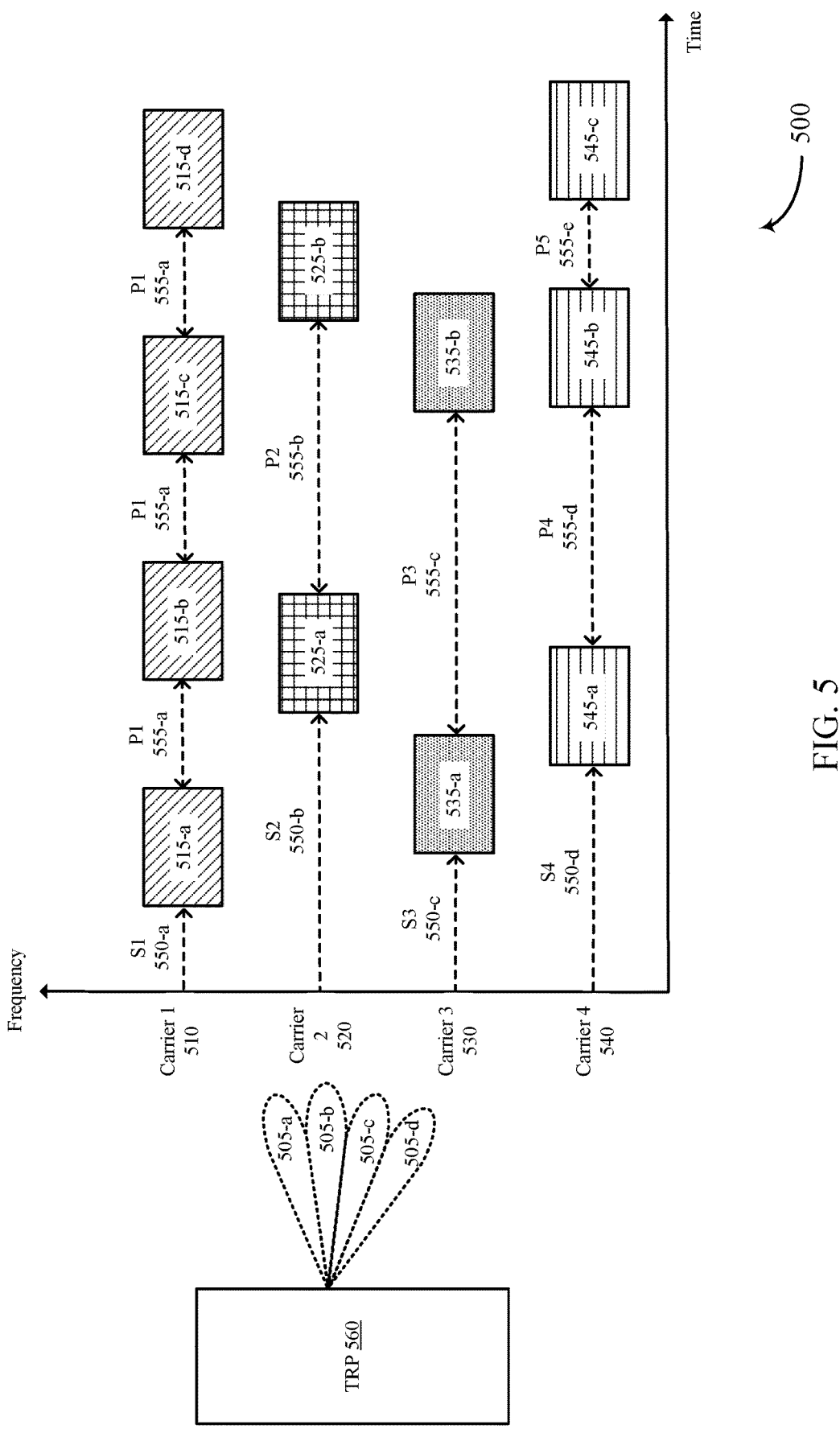
FIG. 5 illustrates an example of a resource configuration that supports connected mode beam management for narrowband systems in accordance with one or more aspects of the present disclosure.

FIG. 5 illustrates an example of a resource configuration 500 that supports connected mode beam management for narrowband systems in accordance with one or more aspects of the present disclosure. In some examples, resource configuration 500 may implement aspects of wireless communications system 100 and wireless communications system 200. The resource configuration 500 may be implemented by transmission and reception point (TRP) 560, which may be an example of a base station 105 or a satellite 155 described herein. In resource configuration 500, TRP 560 may configure resources for channel sounding messages across multiple carriers.

TRP 560 may configure channel sounding message occasions 515 on a first carrier 510. The channel sounding message occasions may also be referred to as random access occasions, and may likewise correspond to random access resources configured by a network, for example, for random access procedures by a UE. The first channel sounding message occasions 515-a may be configured with a timing offset 550-a and subsequent channel sounding message occasions, such as channel sounding message occasion 515-b, may be configured with a periodicity 555-a. Additionally, TRP 560 may configure channel sounding message occasions 525 on a second carrier 520. The first channel sounding message occasion 525-a on second carrier 520 may be configured with a timing offset 550-b and subsequent channel sounding message occasions, such as channel sounding message occasion 525-b, may be configured with a periodicity 555-b. Additionally, TRP 560 may configure channel sounding message occasions 535 on a third carrier 530. The first channel sounding message occasion 535-a on third carrier 530 may be configured with a timing offset 550-c and subsequent channel sounding message occasions, such as channel sounding message occasion 535-b, may be configured with a periodicity 555-c. Additionally, TRP 560 may configure channel sounding message occasions 545 on a fourth carrier 540. The first channel sounding message occasion 545-a on fourth carrier 540 may be configured with a timing offset 550-d and subsequent channel sounding message occasions, such as channel sounding message occasion 545-b may be configured with a periodicity 555-d.

In some examples, each beam 505 from TRP 560 may correspond to one to one carrier. For example, first beam 505-a may correspond to first carrier 510, second beam 505-b may correspond to second carrier 520, third beam 505-c may correspond to third carrier 530, and fourth beam 505-d may correspond to fourth carrier 540. Alternatively, multiple carriers may correspond to a single beam. For example, first carrier 510 and second carrier 520 may correspond to first beam 505-a, while third carrier 530 and fourth carrier 540 may correspond to second beam 505-b.

In some examples, multiple beams may correspond to a single cell. For example, first beam 505-a, second beam 505-b, and third beam 505-c may correspond to a first cell, while fourth beam 505-d may correspond to a second cell. If TRP 550 configures a UE 115 to change beams in response to a channel sounding message from the first beam 505-a in the first cell to the second beam 505-b in the first cell, then UE 115 may perform procedures to change beams within a cell.

Alternatively, each beam may correspond to a separate cell or a UE 115 may be configure to change beams to a beam in a different cell. For example, first beam 505-a may correspond to a first cell, second beam 505-b may correspond to a second cell, third beam 505-c may correspond to a third cell, and fourth beam 505-d may correspond to a fourth cell. UE 115 may be configured to change beams from the first beam 505-a in the first cell to a second beam 505-b in the second cell. In this example, UE 115 may perform handover like procedure to facilitate the switch, since a new RRC connection with the new cell has to be established. For example, UE 115 may establish a new RRC connection with the new cell. However, any handover like procedure may begin with an NPRACH-based channel sounding message transmission, similar to the procedure for switching a beam within a cell. In this case, there may be one or more cell groups, among which some system information may be common, and which may be indicated in the system information of the serving cell. In some examples, NPRACH configurations corresponding to different cells in such cell-groups may be provided in the system information. In some cases, coordinated NPRACH resources across different cells may not be possible. Further downlink measurement objects, if configured, may be extended across cells, which may be analogous to radio resource management framework for broadband UEs.

A UE 115 may be configured to transmit channel sounding messages for first carrier 510, second carrier 520, third carrier 530, and fourth carrier 540 using resource configuration 500. UE 115 may first transmit a channel sounding message on first carrier 510 at channel sounding message occasion 515-a. Then, UE 115 may transmit a channel sounding message on second carrier at channel sounding message occasion 525-a. Next, UE 115 may transmit the channel sounding message on the third carrier 530, but UE 115 may have missed the first channel sounding message occasion 535-a on the third carrier 530 and may wait until the second channel sounding message occasion 535-b on the third carrier 530, possibly resulting in additional system latency. Finally, UE 115 may transmit the channel sounding message on the fourth carrier 540, but UE 115 may have missed the first channel sounding message occasion 545-a and the second channel sounding message occasion 545-b on the fourth carrier 540. UE 115 may wait until the third channel sounding message occasion 545-e on the fourth carrier 540 to transmit a channel sounding message.

Figure 6:
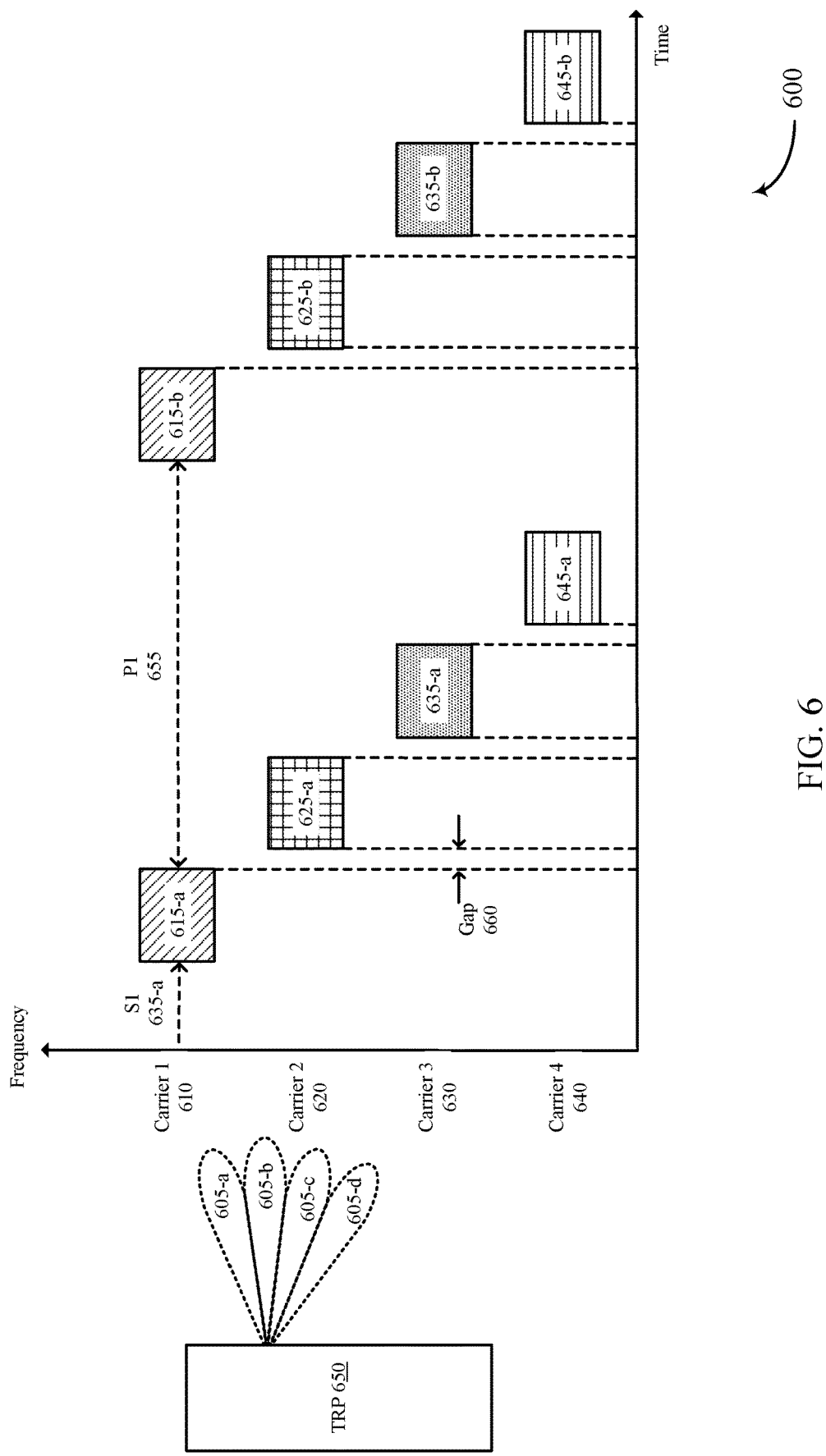
FIG. 6 illustrates an example of a resource configuration that supports connected mode beam management for narrowband systems in accordance with one or more aspects of the present disclosure.

FIG. 6 illustrates an example of a resource configuration 600 that supports connected mode beam management for narrowband systems in accordance with one or more aspects of the present disclosure. In some examples, resource configuration 600 may implement aspects of wireless communications system 100 and wireless communications system 200. The resource configuration 600 may be implemented by TRP 650, which may be an example of a base station 105 or a satellite 155 described herein. In resource configuration 600, TRP 650 may configure resources for channel sounding messages across multiple carriers.

TRP 650 may configure channel sounding message occasions 615 on a first carrier 610. The first channel sounding message occasions 615-a may be configured with a timing offset 635-a and subsequent channel sounding message occasions, such as channel sounding message occasion 615-b, may be configured with a periodicity 655. TRP 650 may coordinate the resources for channel sounding messages to facilitate transmitting channel sounding messages across multiple carriers with a reduced overall latency of transmission across the multiple carriers. TRP 650 may configure channel sounding message occasions for other carriers at the same periodicity used for the channel sounding message occasions for the first carrier (e.g., periodicity 655). TRP 650 may also configure the channel sounding message occasions for other carriers with a time offset to prevent overlap of channel sounding message occasions in time and to provide a gap period 660 (e.g., a fixed gap), for example, to provide time for radio resource components to reconfigure to a different carrier (e.g., a first carrier 610). In some examples, the TRP may provide a single configuration of the channel sounding message transmission occasions that span across different carriers, based on a pattern in time or frequency, or both. For example, resource configuration 600 may be an example of a single configuration of a channel sounding message transmission provided by a TRP. Further, the correspondences between a beam and a carrier in resource configuration 500 described with reference to FIG. 5 may be similarly applicable to correspondences between a beam and a carrier in resource configuration 600.

A UE 115 may be configured to transmit channel sounding messages on a first carrier 610, a second carrier 620, a third carrier 630, and a fourth carrier 640 using resource configuration 600. UE 115 may transmit a channel sounding message on the first carrier 610 using channel sounding message occasion 615-a, then UE 115 may transmit a channel sounding message on the second carrier 620 channel sounding message occasion 625-a after the expiration of the gap period 660. UE 115 may proceed with transmitting a channel sounding message on the third carrier 630 after the expiration of a gap period 660 and with transmitting a channel sounding message on the fourth carrier 640 after the expiration of a gap period 660. UE 115 may also be configure to repeat the channel sounding measurement transmission at some periodicity 655.

Figure 7:
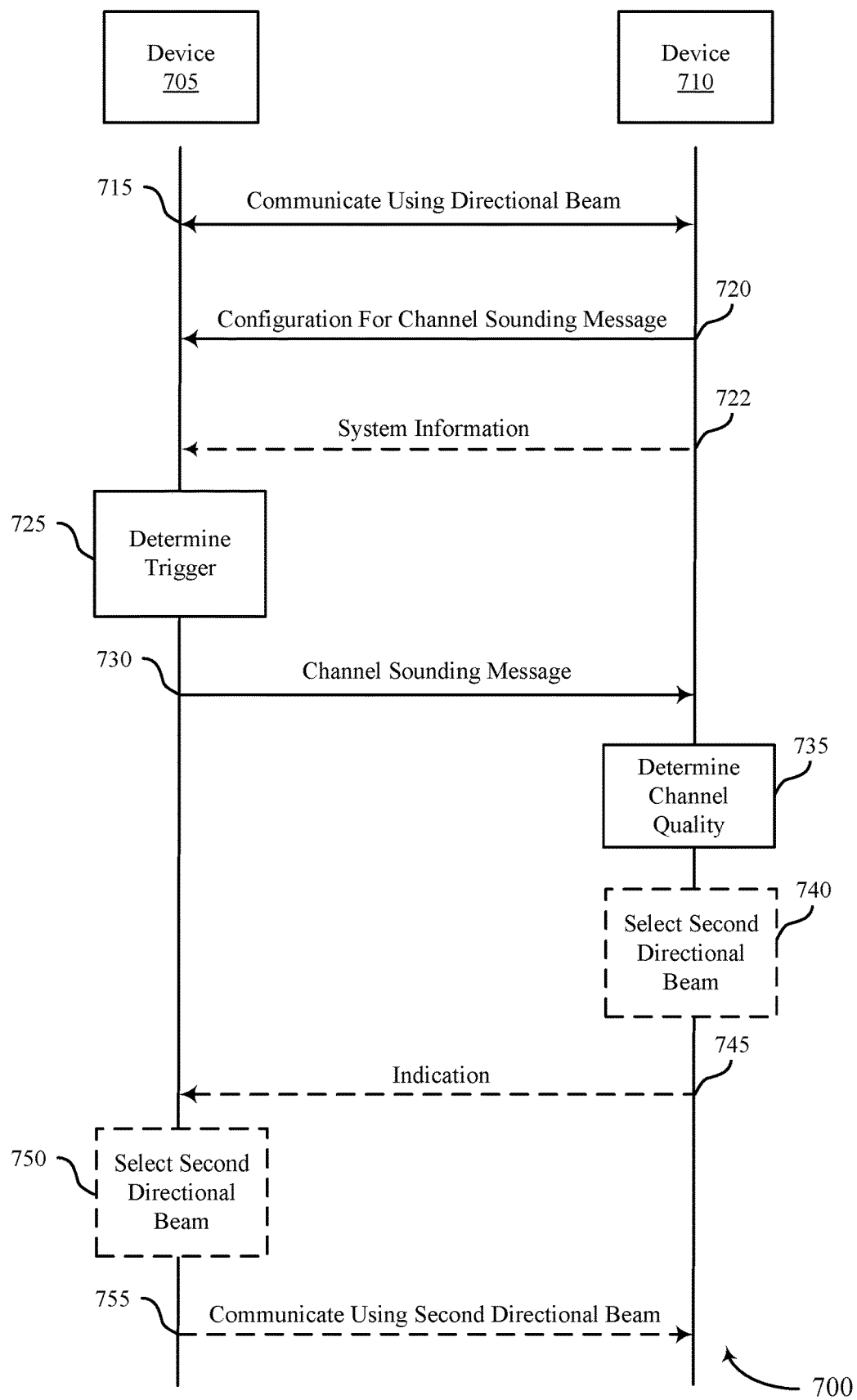
FIG. 7 illustrates an example of a process flow in a system that supports connected mode beam management for narrowband systems in accordance with one or more aspects of the present disclosure.

FIG. 7 illustrates an example of a process flow 700 in a system that supports connected mode beam management for narrowband systems in accordance with one or more aspects of the present disclosure. In some examples, process flow 700 may implement aspects of wireless communications system 100 and wireless communications system 200. The process flow 700 may be implemented by a device 705 or a device 710, or both, which may be respective examples of a UE 115 or a base station 105 (or a satellite 155) described herein. In some cases, the device 710 may be an example of a transmitting terminal, a TRP, or another device that provides access to a network as described herein. In the following description of the process flow 700, the information communicated between device 705 and device 710 may be performed in different orders or at different times. Some operations may also be omitted from the process flow 700, and other operations may be added to the process flow 700. In the example of FIG. 7, device 705 and device 710 may be in communication with each other via an NTN.

At 715, device 705 may communicate with a device 710 over a directional beam. Device 705 may communicate using narrowband communications. For example, device 705 may communicate using NB-IoT communications.

At 720, device 705 may receive, from the device 710, a configuration of one or more channel sounding messages for one or more directional beams, where each directional beam of the one or more directional beams is associated with a set of narrowband carriers. In some cases, each of the one or more channel sounding messages may be configured for transmission on a narrowband carrier of at least one set of narrowband carriers. In some cases, device 705 may identify base at least in part on the configuration, a location of the narrowband carrier for transmitting the one or more channel sounding messages, where the locations include a time resource, a frequency resource, at least one directional beam of the one or more direction beams, or any combination thereof. Device 705 may also receive, from the device 710, system information that indicates the locations of the narrowband carrier for transmitting the one or more channel sounding messages. In some examples, the narrowband carrier may be different from an anchor carrier of the set of narrowband carriers associated with each directional beam.

At 722, device 705 may receive system information over the one or more directional beams, where the system information may include an indication of the configuration of the one or more channel sounding messages. The system information may indicate locations of the respective narrowband carriers for transmitting the one or more channel sounding messages. For example, device 705 may identify, based on the configuration, locations of the respective narrowband carriers for transmitting the one or more channel sounding messages, where the locations include a time resource, a frequency resource, at least one directional beam of the one or more directional beams, or any combination thereof. In such cases, the locations of the respective narrowband carriers may be identified based on the system information.

At 725, device 705 may determine a trigger for transmitting the one or more channel sounding messages based on the configuration received from the device 710 at 720. In some examples, device 705 may receive from the network, downlink control information including the trigger for transmitting the one or more channel sounding message. Device 705 may identify a NPDCCH order, where the NPDCCH order includes the trigger.

At 730, device 705 may transmit, to the device 710, the one or more channel sounding messages on respective narrowband carrier in accordance with the trigger and the configuration. In some cases, device 705 may determine that an event trigger has been satisfied, where the one or more channel sounding message are transmitted based on the event trigger being satisfied. In some cases, device 705 may identify a set of resources for transmitting the one or more channel sounding message based on the event trigger being satisfied, where the set of resources is shared by two or more devices, including device 705.

At 735, device 710 may determine a beam or channel quality of the first directional beam based on the received channel sounding message received from device 705 at 730. In some cases, device 710 may perform a handover procedure for handing over device 705 from a first cell to a second cell, where the handover procedure is based on the received one or more channel sounding messages.

At 740, device 710 may select a second directional beam, different from the first directional beam, for communication between device 705 and device 710 based on a beam management procedure, or a beam failure recovery procedure, or any combination thereof. In some cases, the selection of the second beam may be based on receiving the one or more channel sounding messages on at least the second directional beam.

At 745, device 710 may, in some cases, signal an indication to device 705 to use the second directional beam for communications between device 705 and device 710. As such, at 750, device 705 may select the second directional beam different from the directional beam. In some cases, the selection may be based on transmitting the one or more channel sounding messages on at least the second directional beam. Additionally or alternatively, the second beam may be selected based on the beam management procedure, or the beam failure recovery procedure, or any combination thereof.

At 755, device 705 and device 710 may communicate with device 710 using the second directional beam.

Figure 8:
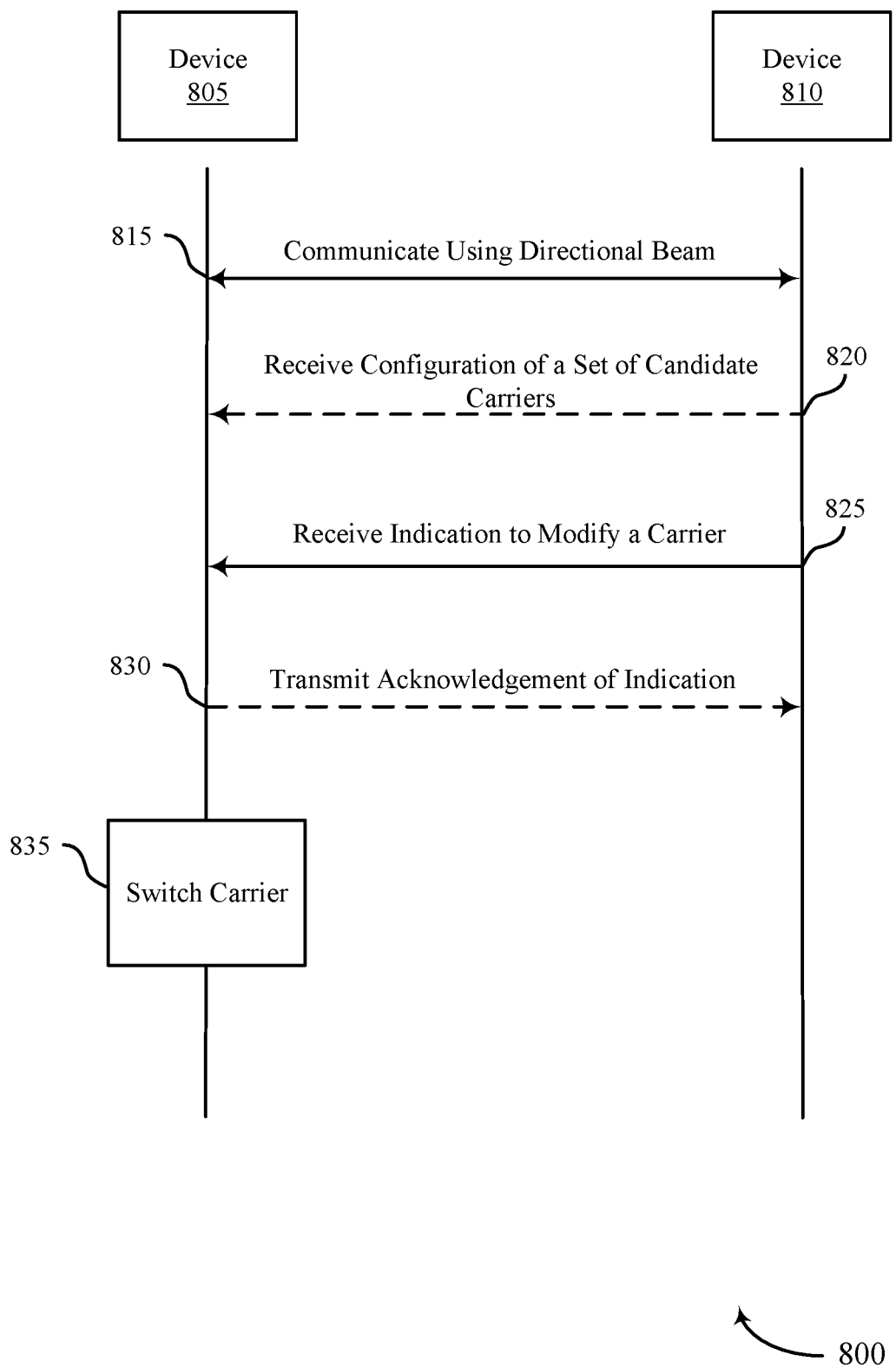
FIG. 8 illustrates an example of a process flow in a system that supports connected mode beam management for narrowband systems in accordance with one or more aspects of the present disclosure.

FIG. 8 illustrates an example of a process flow 800 in a system that supports connected mode beam management for narrowband systems in accordance with one or more aspects of the present disclosure. In some examples, process flow 800 may implement aspects of wireless communications system 100 and wireless communications system 200. The process flow 800 may be implemented by device 805 or device 810 or both, which may be respective examples of a UE 115 or a base station 105 (or a satellite 155) described herein. In some cases, the device 810 may be an example of a transmitting terminal, a TRP, or another device that provides access to a network as described herein. In the following description of the process flow 800, the information communicated between device 805 and device 810 may be performed in different orders or at different times. Some operations may also be omitted from the process flow 800, and other operations may be added to the process flow 800. In the example of FIG. 8, device 805 and device 810 may be in communication with each other via an NTN.

At 815, device 805 may communicate with a device 810 over a directional beam. Device 805 may communicate using narrowband communications. For example, device 805 may communicate using NB-IoT communications.

At 820, device 805 may receive a configuration of a set of candidate carriers from device 810. The set of candidate carriers may include one or more carrier different from the first narrowband carrier. The set of candidate carrier may include the second narrowband carrier. Device 805 may receive the configuration of the set of candidate carriers from device 810 via RRC signaling, a MAC-CE or any combination thereof.

At 825, device 805 may receive, from device 810, an indication to modify a carrier for communications from a first narrowband carrier associated with the directional beam to a second narrowband carrier associated with a second directional beam, the second narrowband carrier being different from the first narrowband carrier. In some examples, the second narrowband carrier may be from a set of candidate carriers. In some cases, device 805 receive a configuration of the set of candidate carriers from the network, where the configuration is received via RRC signaling, MAC-CE, or any combination thereof. In some examples, device 805 may receive DCI, a MAC-CE, or any combination thereof, that includes the indication to modify the carrier for communications.

At 830, device 805 may transmit an acknowledgment of the indication to modify the carrier for communications. In some cases, device 805 may transmit an acknowledgment in response to receiving DCI or MAC-CE.

At 835, device 805 may switch to the second narrowband carrier based on the indication received at 825. Device 805 may communicate with device 810 via the second narrowband carrier.

Figure 9:
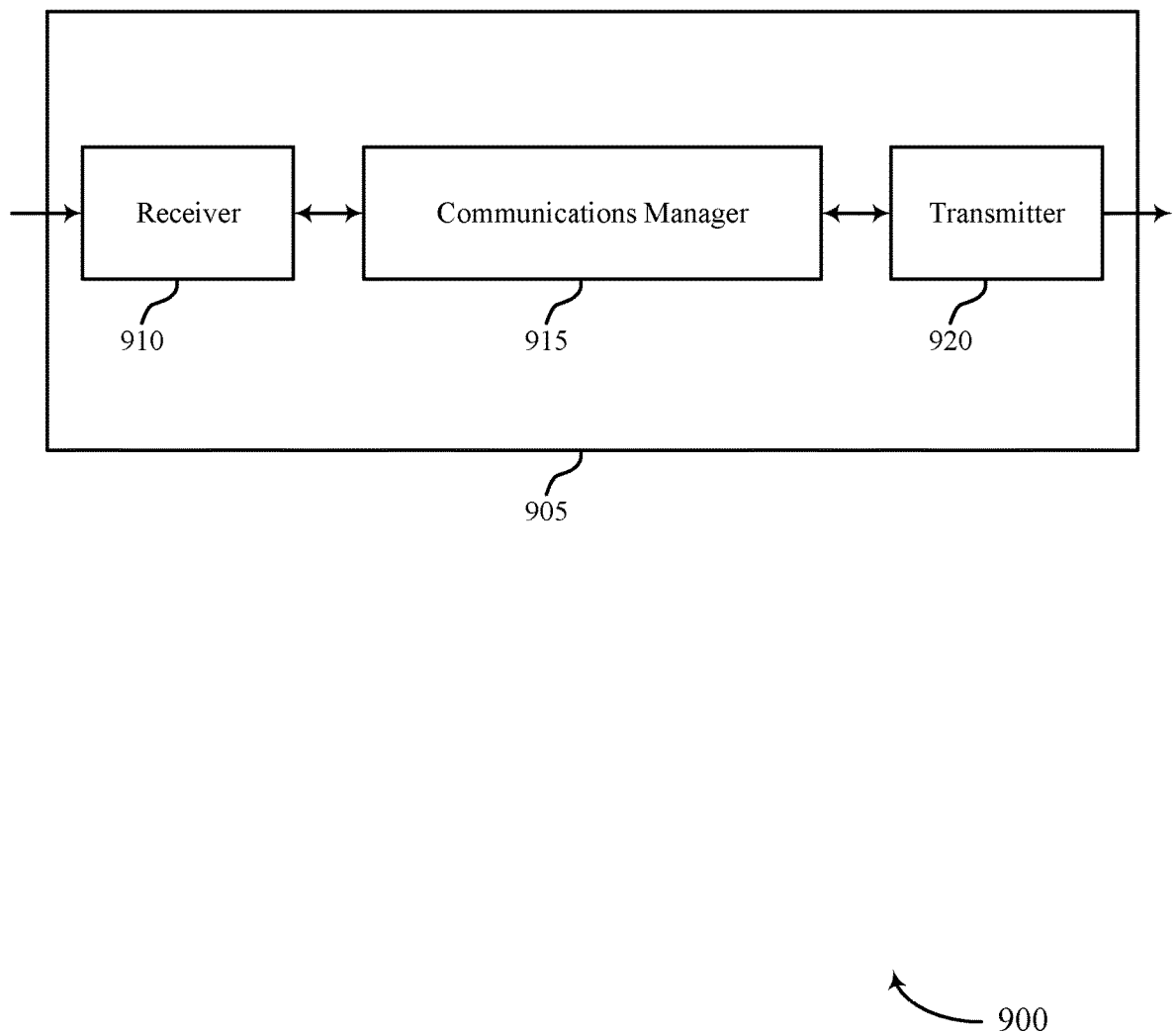
FIGS. 9 and 10 show block diagrams of devices that support connected mode beam management for narrowband systems in accordance with one or more aspects of the present disclosure.

FIG. 9 shows a block diagram 900 of a device 905 that supports connected mode beam management for narrowband systems in accordance with one or more aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to connected mode beam management for narrowband systems, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be an example of means for performing various aspects of beam management as described herein. The communications manager 915, or its sub-components, may be implemented in hardware (e.g., in communications management circuitry). The circuitry may include a processor, digital signal processor (DSP), an application-specific integrated circuit (ASIC), a field programmable gate array (FPGA), or other programmable logic device, discrete gate or transistor logic, discrete hardware components, or any combination thereof designed to perform the functions described in the present disclosure.

In another implementation, the communications manager 915, or its sub-components, may be implemented in code (e.g., as communications management software or firmware) executed by a processor, or any combination thereof. If implemented in code executed by a processor, the functions of the communications manager 915, or its sub-components may be executed by a general-purpose processor, a DSP, and ASIC, a FPGA, or other programmable logic device.

In some examples, the communications manager 915 may be configured to perform various operations (e.g., communicating, receiving, determining, transmitting) using or otherwise in cooperation with receiver 910, the transmitter 920, or both.

The communications manager 915 may communicate with a network over a directional beam, receive, from the network, a configuration of one or more channel sounding messages for one or more directional beams, where each directional beam of the one or more directional beams is associated with a set of narrowband carriers (e.g., frequency resources), each of the one or more channel sounding messages being configured for transmission on a narrowband carrier of the set of narrowband carriers, determine a trigger for transmitting the one or more channel sounding messages based on the configuration, and transmit, to the network, the one or more channel sounding messages on respective narrowband carriers in accordance with the trigger and the configuration. The communications manager 915 may also communicate with a network over a directional beam, receive, from the network, an indication to modify a carrier for communications from a first narrowband carrier associated with the directional beam to a second narrowband carrier associated with a second directional beam, the second narrowband carrier being different from the first narrowband carrier, and switch to the second narrowband carrier based on the indication. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA, or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (e.g., amplifiers, filters, antennas) coupled with the mobile device modem to enable wireless transmission and reception over one or more bands.

The communications manager 915 as described herein may be implemented to realize one or more potential advantages. One implementation may allow the device 905 to provide assistance for maintaining communication beam or channel quality between the device 905 and a network. Based on the techniques for maintaining communication beam or channel quality between the device 905 and the network, the device 905 may support transmitting uplink signaling to assist the network in beam management.

As such, the device 905 may increase the likelihood of accurately switching beams and, accordingly, may communicate over the channel with a greater likelihood of successful communications. In some examples, based on a greater likelihood of successful communications, the device 905 may more efficiently power a processor or one or more processing units associated with narrowband systems and transmitting and receiving communications, which may enable the device to save power and increase batter life.

Figure 10:
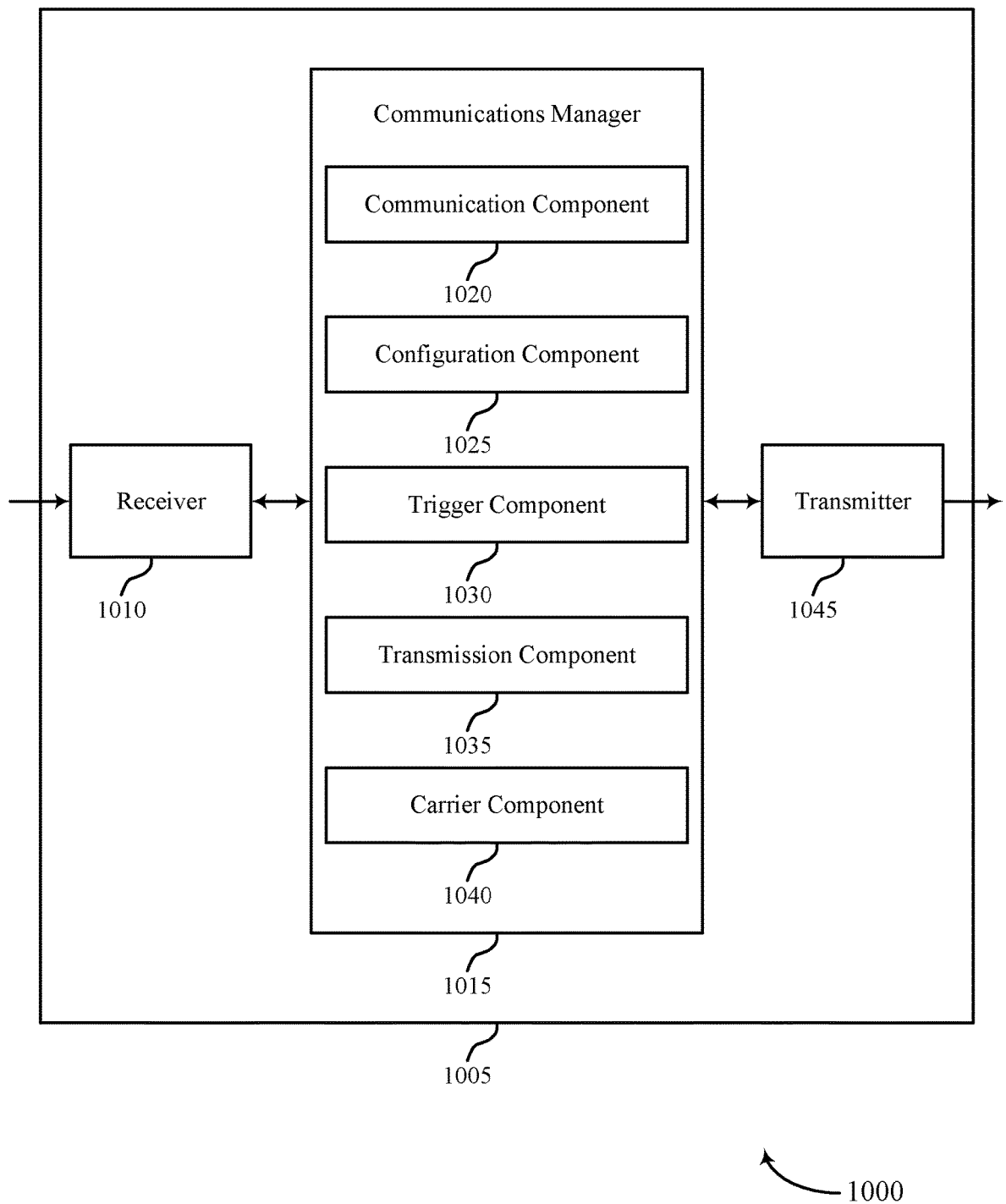

FIG. 10 shows a block diagram 1000 of a device 1005 that supports connected mode beam management for narrowband systems in accordance with one or more aspects of the present disclosure. The device 1005 may be an example of aspects of a device 905, or a UE 115 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to connected mode beam management for narrowband systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communication component 1020, a configuration component 1025, a trigger component 1030, a transmission component 1035, and a carrier component 1040. The communications manager 1015 may be an example of aspects of the communications manager 1210 described herein.

The communication component 1020 may communicate with a network over a directional beam.

The configuration component 1025 may receive, from the network, a configuration of one or more channel sounding messages for one or more directional beams, where each directional beam of the one or more directional beams is associated with a set of narrowband carriers (e.g., frequency resources), each of the one or more channel sounding messages being configured for transmission on a narrowband carrier of the set of narrowband carriers.

The trigger component 1030 may determine a trigger for transmitting the one or more channel sounding messages based on the configuration.

The transmission component 1035 may transmit, to the network, the one or more channel sounding messages on respective narrowband carriers in accordance with the trigger and the configuration.

The communication component 1020 may communicate with a network over a directional beam.

The carrier component 1040 may receive, from the network, an indication to modify a carrier for communications from a first narrowband carrier associated with the directional beam to a second narrowband carrier associated with a second directional beam, the second narrowband carrier being different from the first narrowband carrier.

The configuration component 1025 may switch to the second narrowband carrier based on the indication.

The transmitter 1045 may transmit signals generated by other components of the device 1005. In some examples, the transmitter 1045 may be collocated with a receiver 1010 in a transceiver component. For example, the transmitter 1045 may be an example of aspects of the transceiver 1220 described with reference to FIG. 12. The transmitter 1045 may utilize a single antenna or a set of antennas.

Figure 11:
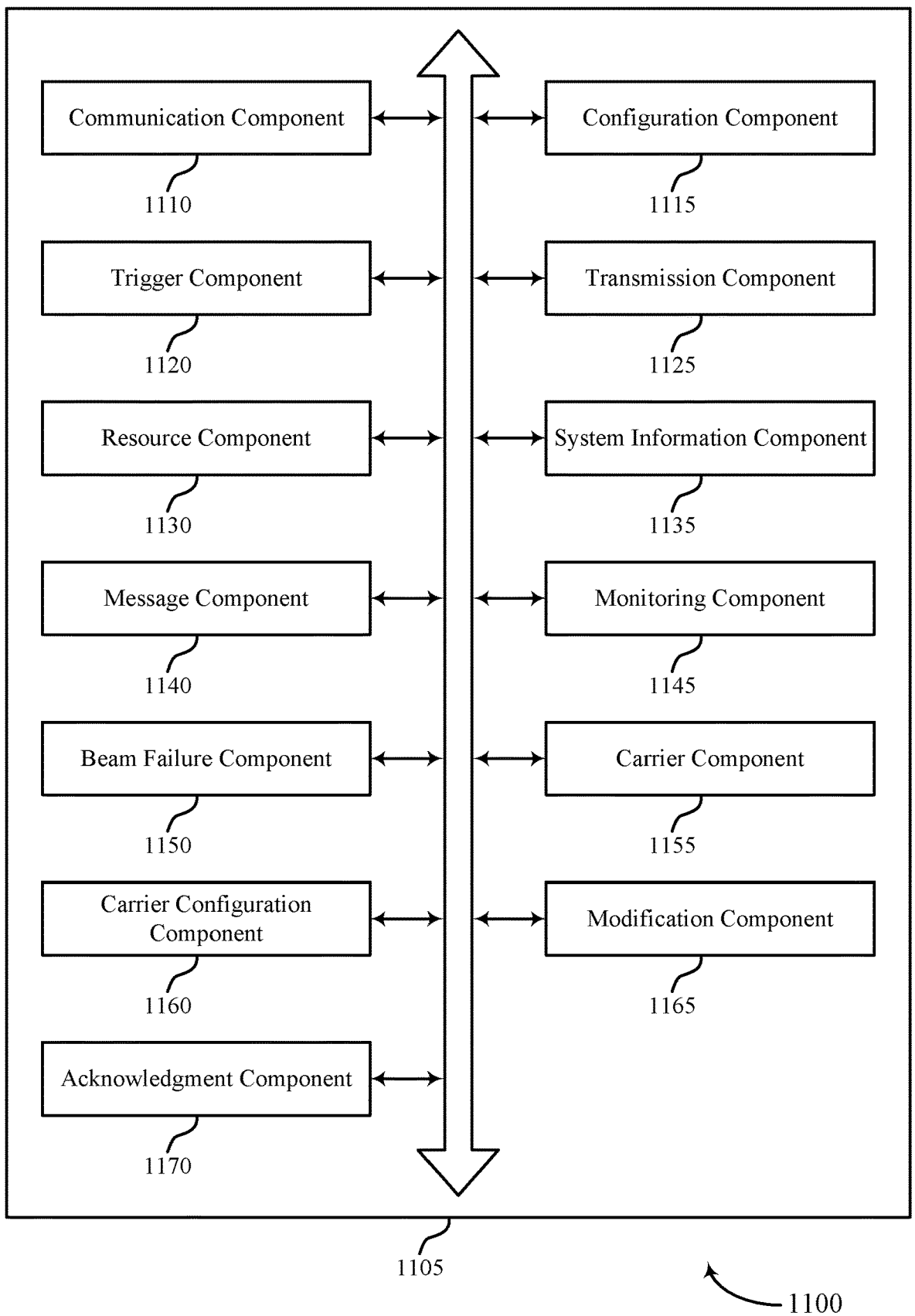
FIG. 11 shows a block diagram of a communications manager that supports connected mode beam management for narrowband systems in accordance with one or more aspects of the present disclosure.

FIG. 11 shows a block diagram 1100 of a communications manager 1105 that supports connected mode beam management for narrowband systems in accordance with one or more aspects of the present disclosure. The communications manager 1105 may be an example of aspects of a communications manager 915, a communications manager 1015, or a communications manager 1210 described herein. The communications manager 1105 may include a communication component 1110, a configuration component 1115, a trigger component 1120, a transmission component 1125, a resource component 1130, a system information component 1135, a message component 1140, a monitoring component 1145, a beam failure component 1150, a carrier component 1155, a carrier configuration component 1160, a modification component 1165, and an acknowledgment component 1170. Each of these components may communicate, directly or indirectly, with one another (e.g., via one or more buses).

The communication component 1110 may communicate with a network over a directional beam. In some examples, the communication component 1110 may communicate with a network over a directional beam. In some examples, the communication component 1110 may communicate with the network over the directional beam based on the monitoring. In some examples, the communication component 1110 may communicate with the network using the second directional beam. In some cases, each directional beam of the one or more directional beams corresponds to a different radio frequency.

The configuration component 1115 may receive, from the network, a configuration of one or more channel sounding messages for one or more directional beams, where each directional beam of the one or more directional beams is associated with a set of narrowband carriers (e.g., frequency resources), each of the one or more channel sounding messages being configured for transmission on a narrowband carrier of the set of narrowband carriers.

In some examples, the configuration component 1115 may switch to the second narrowband carrier based on the indication. In some examples, the configuration component 1115 may determine a first configuration of a first channel sounding message on a first directional beam of the one or more directional beams. In some examples, the configuration component 1115 may determine a second configuration of a second channel sounding message on a second directional beam of the one or more directional beams, the one or more channel sounding messages being transmitted in accordance with the first configuration, or the second configuration, or any combination thereof.

In some examples, the configuration component 1115 may determine the second configuration based on modifying at least a portion of the first configuration. In some examples, the configuration component 1115 may apply a frequency translation to the first configuration, the second configuration being determined based on the applied frequency translation. In some examples, the configuration component 1115 may receive RRC signaling that configures the one or more channel sounding messages.

In some examples, the configuration component 1115 may receive one or more messages from the network that modify the configuration of the one or more channel sounding messages, where the one or more messages include a MAC-CE, DCI, or any combination thereof. In some examples, the configuration component 1115 may receive a configuration of one or more measurement objects corresponding to different directional beams, where the one or more channel sounding messages are transmitted based on performing measurements of the one or more measurement objects.

In some examples, the configuration component 1115 may perform a handover procedure to a second cell different from the first cell, the handover procedure corresponding to establishing a connection with a second directional beam associated with the second cell, where the handover procedure is based on transmitting the one or more channel sounding messages on at least the second directional beam.

In some cases, the first configuration is different from the second configuration. In some cases, at least a portion of the first configuration and the second configuration is common across the first directional beam and the second directional beam. In some cases, the one or more messages activate transmissions of the one or more channel sounding messages, deactivate the transmissions of the one or more channel sounding messages, or any combination thereof.

The trigger component 1120 may determine a trigger for transmitting the one or more channel sounding messages based on the configuration. In some examples, the trigger component 1120 may receive, from the network, DCI including the trigger for transmitting the one or more channel sounding messages. In some examples, identifying, within the DCI, a NPDCCH order, where the NPDCCH order includes the trigger.

In some examples, the trigger component 1120 may determine that an event trigger has been satisfied, where the one or more channel sounding messages are transmitted based on the event trigger being satisfied. In some examples, the trigger component 1120 may identify a set of resources for transmitting the one or more channel sounding messages based on the event trigger being satisfied, where the set of resources is shared by two or more UEs including the UE, or is a UE-specific resource, or is a contention-based resource, or is a contention-free resource, or any combination thereof. In some cases, the trigger includes periodic transmission occasions, aperiodic transmission occasions, semi-persistent transmission occasions, dynamic transmission occasions, one or more UE-initiated transmission occasions, one or more event triggers, or any combination thereof.

The transmission component 1125 may transmit, to the network, the one or more channel sounding messages on respective narrowband carriers in accordance with the trigger and the configuration. In some examples, the transmission component 1125 may transmit one or more random access preamble messages at each of a set of transmission occasions based on the NPDCCH order. In some examples, the transmission component 1125 may transmit, in response to the received DCI, or the MAC control element, or any combination thereof, an acknowledgment of the indication to modify the carrier for communications.

The carrier component 1155 may receive, from the network, an indication to modify a carrier for communications from a first narrowband carrier associated with the directional beam to a second narrowband carrier associated with a second directional beam, the second narrowband carrier being different from the first narrowband carrier. In some cases, the second narrowband carrier is from a set of candidate carriers.

The resource component 1130 may identify, based on the configuration, locations of the respective narrowband carriers for transmitting the one or more channel sounding messages, where the locations include a time resource, a frequency resource, at least one directional beam of the one or more directional beams, or any combination thereof. In some examples, the resource component 1130 may identify a first cell associated with directional beam.

In some cases, each narrowband carrier is different from a carrier used for random access procedures with the network. In some cases, each narrowband carrier is different from an anchor carrier of the set of narrowband carriers associated with each directional beam.

The system information component 1135 may receive, from the network, system information over the one or more directional beams, or the directional beam, or any combination thereof. In some examples, the system information may indicate the configuration of the one or more channel sounding messages. In some cases, the locations of the respective narrowband carriers may be identified based on the system information. In some cases, the directional beam, the narrowband carrier, the set of narrowband carriers, the one or more channel sounding messages, the one or more beams, or any combination thereof, are used for NB-IoT communications. In some cases, the network includes a non-terrestrial network.

The message component 1140 may determine, from the configuration, a set of random access occasions for transmitting the random access preamble message, the random access preamble message transmitted during at least one random access occasion of the set of random access occasions, where the set of random access occasions include random access occasions that are configured across different narrowband carriers of the one or more directional beams. In some examples, each of the one or more channel sounding messages include a random access preamble message. Further, each of the random access preamble messages may be an example of a narrowband random access preamble message.

In some examples, the message component 1140 may determine, based on the NPDCCH order, the one or more directional beams, one or more narrowband carriers, or any combination thereof, for transmitting one or more random access preamble messages as the one or more channel sounding messages. In some cases, the random access occasions are configured across the one or more directional beams in accordance with a pattern across time resources or frequency resources or both.

In some cases, the pattern includes a set of random access resources in adjacent carriers, the set of random access resources being adjacent in time. In some cases, each random access resource of the set of random access resources adjacent in time are separated by a time interval. In some cases, at least one of the one or more channel sounding messages includes a first random access preamble that is different from a second random access preamble that is used for random access procedures with the network.

In some cases, a first random access preamble of the one or more channel sounding messages includes a preamble that is shared across two or more UEs, a UE-specific preamble, a contention-based random access preamble, a contention-free random access preamble, or any combination thereof. In some cases, at least one of the one or more channel sounding messages includes a narrowband SRS.

The monitoring component 1145 may refrain from monitoring for a response from the network based on transmitting the one or more channel sounding messages. In some examples, the monitoring component 1145 may monitor for a communication over the directional beam after transmitting the one or more channel sounding messages.

In some examples, the monitoring component 1145 may monitor a first narrowband carrier of a first set of narrowband carriers associated with the directional beam. The beam failure component 1150 may determine a beam failure for the directional beam based on the monitoring, where transmitting the one or more channel sounding messages is based on the determined beam failure, where the one or more channel sounding messages are part of a beam failure recovery procedure.

In some examples, the beam failure component 1150 may indicate the beam failure to the network based on a signal quality of the first narrowband carrier of the directional beam satisfying a threshold. In some examples, the beam failure component 1150 may select, based on a beam management procedure, or a beam failure recovery procedure, or any combination thereof, a second directional beam different from the directional beam, where the selection is based on transmitting the one or more channel sounding messages on at least the second directional beam.

The carrier configuration component 1160 may receive a configuration of the set of candidate carriers from the network, where the configuration is received via RRC signaling, a MAC-CE, or any combination thereof. The modification component 1165 may receive DCI, a MAC-CE, or any combination thereof, that includes the indication to modify the carrier for communications.

The acknowledgment component 1170 may receive, in response to the received DCI, or the MAC-CE, or any combination thereof, an acknowledgment of the indication to modify the carrier for communications.

Figure 12:
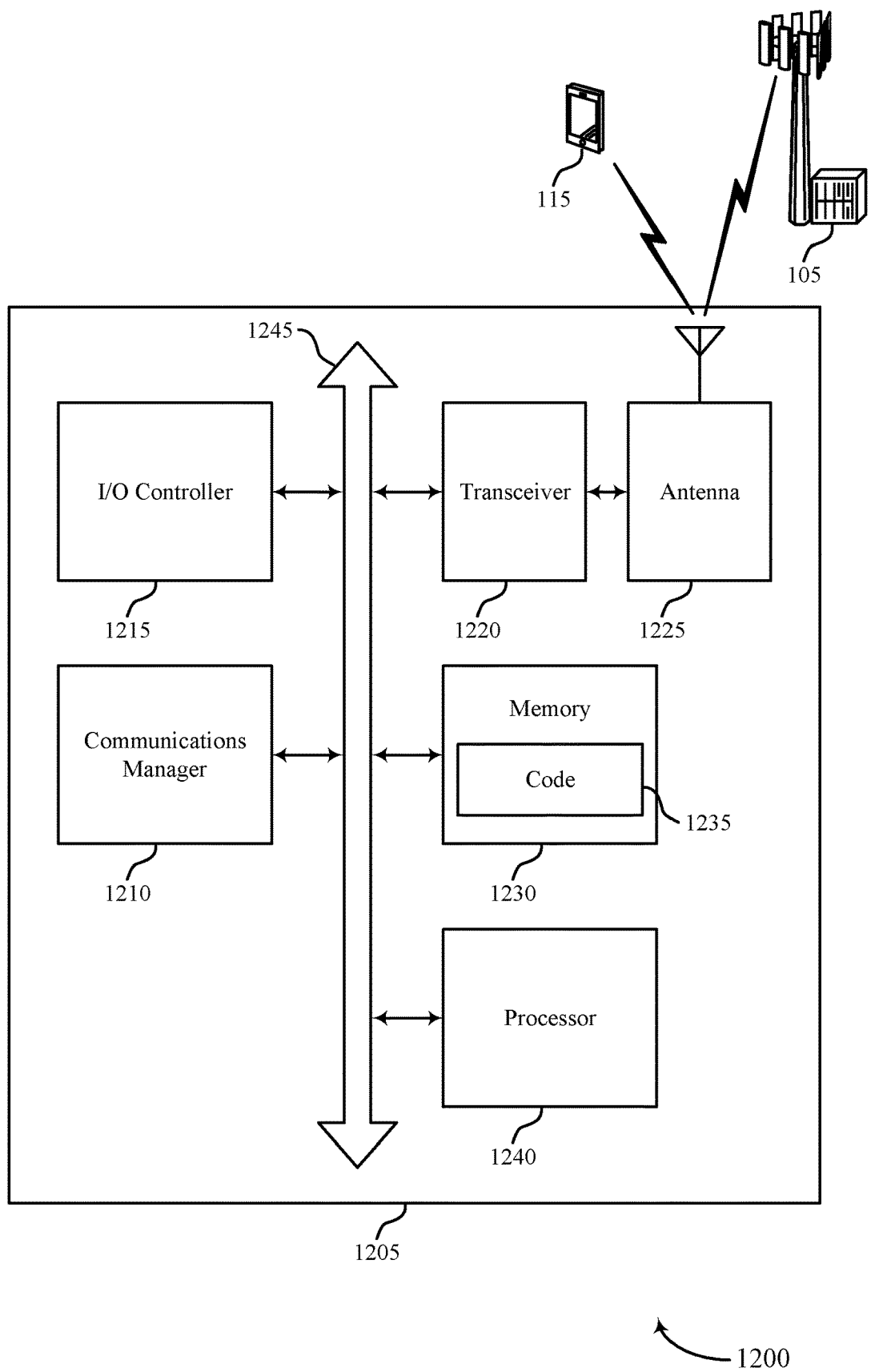
FIG. 12 shows a diagram of a system including a device that supports connected mode beam management for narrowband systems in accordance with one or more aspects of the present disclosure.

FIG. 12 shows a diagram of a system 1200 including a device 1205 that supports connected mode beam management for narrowband systems in accordance with one or more aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may communicate with a network over a directional beam, receive, from the network, a configuration of one or more channel sounding messages for one or more directional beams, where each directional beam of the one or more directional beams is associated with a set of narrowband carriers (e.g., frequency resources), each of the one or more channel sounding messages being configured for transmission on a narrowband carrier of the set of narrowband carriers, determine a trigger for transmitting the one or more channel sounding messages based on the configuration, and transmit, to the network, the one or more channel sounding messages on respective narrowband carriers in accordance with the trigger and the configuration. The communications manager 1210 may also communicate with a network over a directional beam, receive, from the network, an indication to modify a carrier for communications from a first narrowband carrier associated with the directional beam to a second narrowband carrier associated with a second directional beam, the second narrowband carrier being different from the first narrowband carrier, and switch to the second narrowband carrier based on the indication.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting connected mode beam management for narrowband systems).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
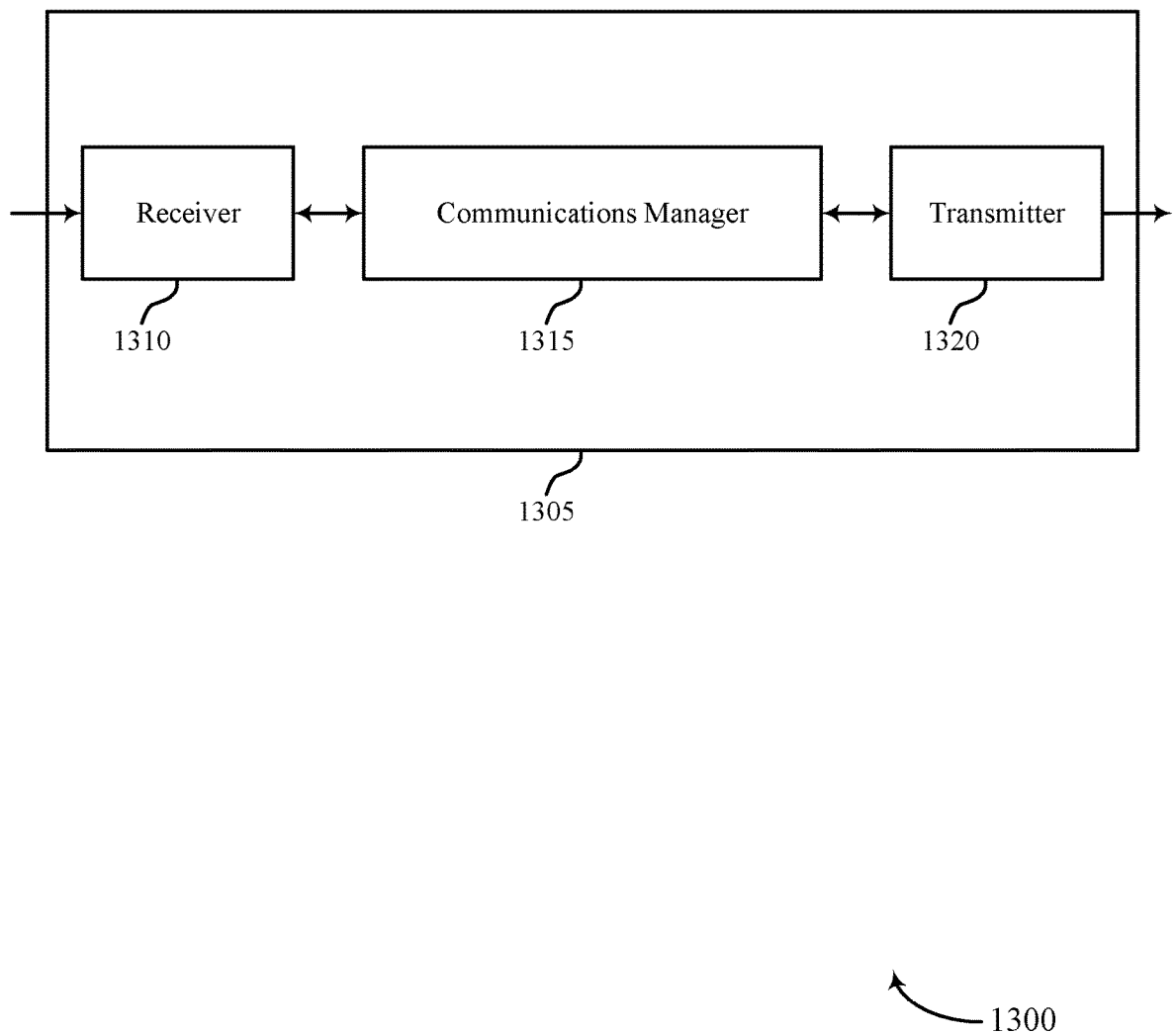
FIGS. 13 and 14 show block diagrams of devices that support connected mode beam management for narrowband systems in accordance with one or more aspects of the present disclosure.

FIG. 13 shows a block diagram 1300 of a device 1305 that supports connected mode beam management for narrowband systems in accordance with one or more aspects of the present disclosure. The device 1305 may be an example of aspects of a base station 105 as described herein. Additionally or alternatively, the device 1305 may be an example of aspects a satellite. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to connected mode beam management for narrowband systems, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may be an example of means for performing various aspects of beam management as described herein. The communications manager 1315, or its sub-components, may be implemented in hardware (e.g., in communications management circuitry). The circuitry may include a processor, DSP, an ASIC, a FPGA, or other programmable logic device, discrete gate or transistor logic, discrete hardware components, or any combination thereof designed to perform the functions described in the present disclosure.

In another implementation, the communications manager 1315, or its sub-components, may be implemented in code (e.g., as communications management software or firmware) executed by a processor, or any combination thereof. If implemented in code executed by a processor, the functions of the communications manager 1315, or its sub-components may be executed by a general-purpose processor, a DSP, and ASIC, a FPGA, or other programmable logic device.

In some examples, the communications manager 1315 may be configured to perform various operations (e.g., receiving, determining, transmitting) using or otherwise in cooperation with receiver 1310, the transmitter 1320, or both.

The communications manager 1315 may communicate with a UE over a directional beam, receive one or more channel sounding messages from the UE, the one or more channel sounding messages received on a narrowband carrier (e.g., a frequency resource) of a set of narrowband carriers, and determine a beam or channel quality of the directional beam based on the received one or more channel sounding messages. The communications manager 1315 may also communicate with a UE over a directional beam, transmit, to the UE, an indication to modify a carrier for communications from a first narrowband carrier associated with the directional beam to a second narrowband carrier associated with a second directional beam, the second narrowband carrier being different from the first narrowband carrier, and switch to the second narrowband carrier based on the indication. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
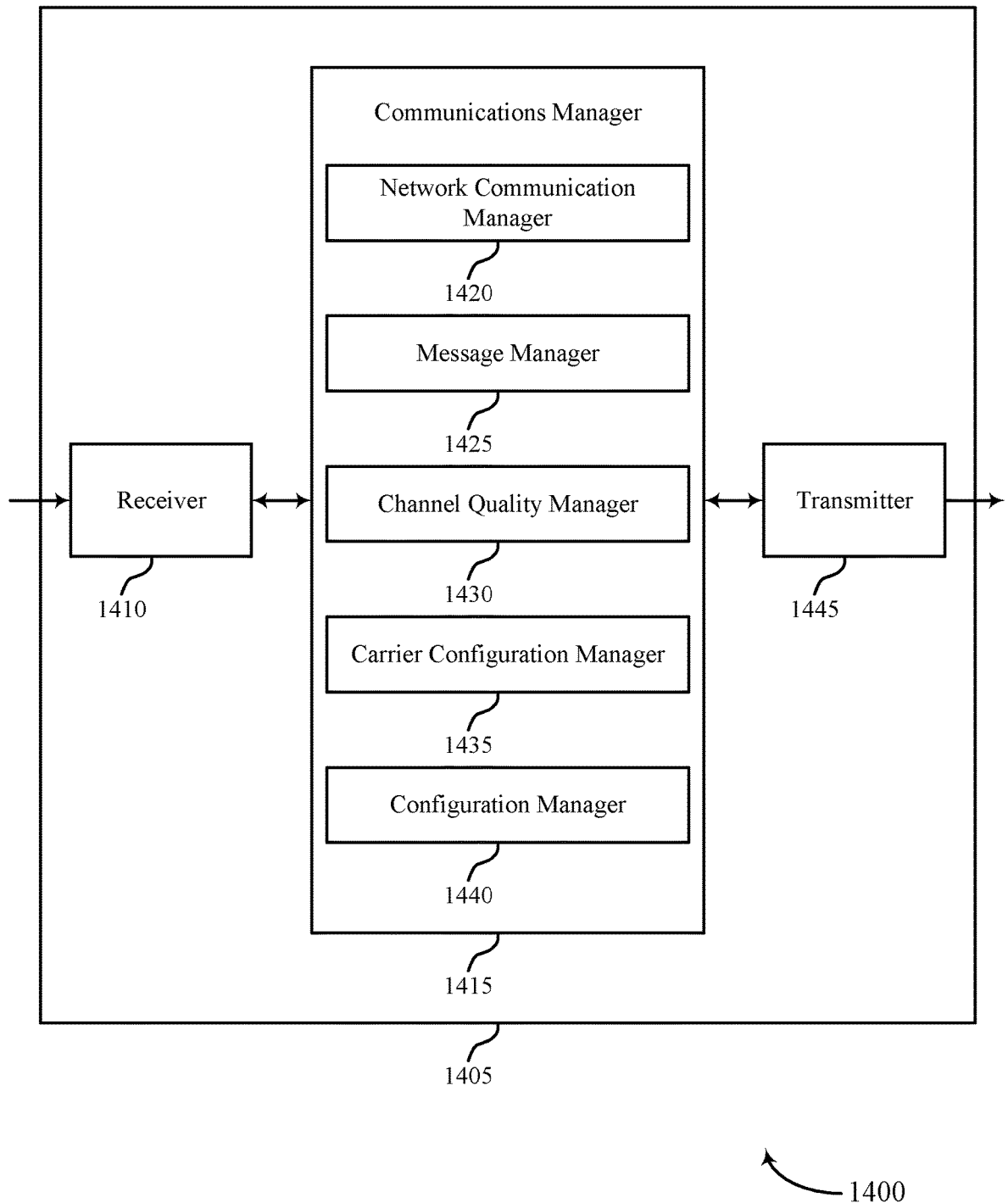

FIG. 14 shows a block diagram 1400 of a device 1405 that supports connected mode beam management for narrowband systems in accordance with one or more aspects of the present disclosure. The device 1405 may be an example of aspects of a device 1305, or a base station 105 as described herein. In some examples, the device 1405 may be an example of a satellite. The device 1405 may include a receiver 1410, a communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to connected mode beam management for narrowband systems, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a network communication manager 1420, a message manager 1425, a channel quality manager 1430, a carrier configuration manager 1435, and a configuration manager 1440. The communications manager 1415 may be an example of aspects of the communications manager 1610 described herein.

The communication manager 1420 may communicate with a UE over a directional beam.

The message manager 1425 may receive one or more channel sounding messages from the UE, the one or more channel sounding messages received on a narrowband carrier (e.g., a frequency resource) of a set of narrowband carriers.

The channel quality manager 1430 may determine a channel quality of the directional beam based on the received one or more channel sounding messages.

The network communication manager 1420 may communicate with a UE over a directional beam.

The carrier configuration manager 1435 may transmit, to the UE, an indication to modify a carrier for communications from a first narrowband carrier associated with the directional beam to a second narrowband carrier associated with a second directional beam, the second narrowband carrier being different from the first narrowband carrier.

The configuration manager 1440 may switch to the second narrowband carrier based on the indication.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
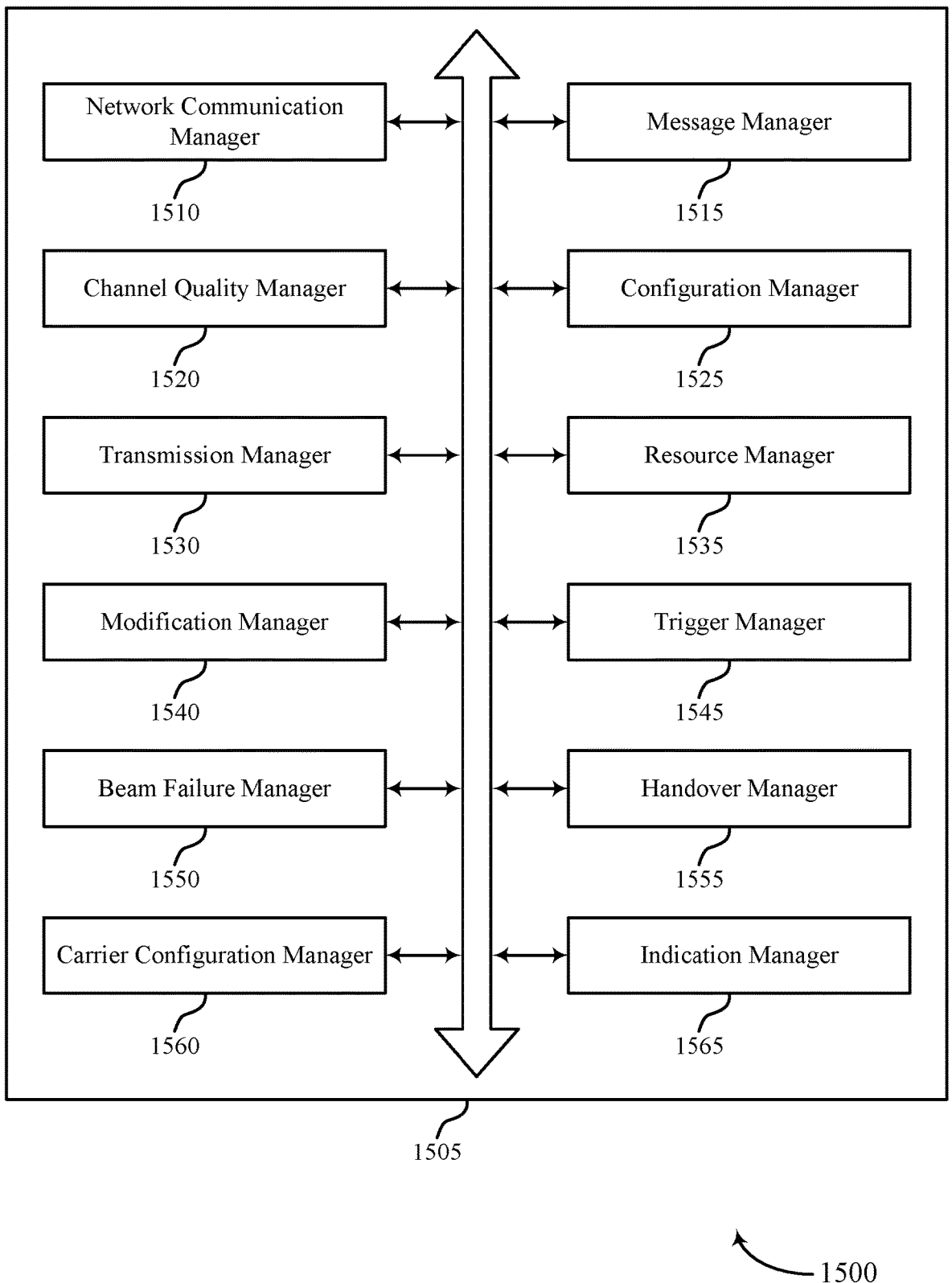
FIG. 15 shows a block diagram of a communications manager that supports connected mode beam management for narrowband systems in accordance with one or more aspects of the present disclosure.

FIG. 15 shows a block diagram 1500 of a communications manager 1505 that supports connected mode beam management for narrowband systems in accordance with one or more aspects of the present disclosure. The communications manager 1505 may be an example of aspects of a communications manager 1315, a communications manager 1415, or a communications manager 1610 described herein. The communications manager 1505 may include a network communication manager 1510, a message manager 1515, a channel quality manager 1520, a configuration manager 1525, a transmission manager 1530, a resource manager 1535, a modification manager 1540, a trigger manager 1545, a beam failure manager 1550, a handover manager 1555, a carrier configuration manager 1560, and an indication manager 1565. Each of these modules may communicate, directly or indirectly, with one another (e.g., via one or more buses).

The network communication manager 1510 may communicate with a UE over a directional beam. In some examples, the network communication manager 1510 may communicate with a UE over a directional beam. In some examples, the network communication manager 1510 may communicate with the UE using the second directional beam. In some cases, the directional beam, the narrowband carrier, the set of narrowband carriers, or any combination thereof, are used for narrowband internet of things communications.

The message manager 1515 may receive one or more channel sounding messages from the UE, the one or more channel sounding messages received on a narrowband carrier (e.g., a frequency resource) of a set of narrowband carriers.

In some examples, the message manager 1515 may receive one or more random access preamble messages at each of a set of transmission occasions based on the NPDCCH order. In some cases, at least one of the one or more channel sounding messages includes a first random access preamble that is different from a second random access preamble that is used for random access procedures.

In some cases, the first random access preamble includes a preamble shared across two or more UEs including the UE, a UE-specific preamble, a contention-based random access preamble, a contention-free random access preamble, or any combination thereof. In some cases, at least one of the one or more channel sounding messages includes a narrowband SRS.

The channel quality manager 1520 may determine a channel quality of the directional beam based on the received one or more channel sounding messages.

The configuration manager 1525 may switch to the second narrowband carrier based on the indication. In some examples, the configuration manager 1525 may determine a configuration of the one or more channel sounding messages for one or more directional beams, where each directional beam of the one or more directional beams is associated with a respective set of narrowband carriers, each of the one or more channel sounding messages being configured for transmission on a narrowband carrier of at least one respective set of narrowband carriers. In some examples, each of the one or more channel sounding messages include a random access preamble message. Further, each of the random access preamble messages may be an example of a narrowband random access preamble message (e.g., having a format that is different from a random access preamble configured on a non-narrowband carrier).

In some examples, the configuration manager 1525 may determine a first configuration of a first channel sounding message on a first directional beam of the one or more directional beams. In some examples, the configuration manager 1525 may determine a second configuration of a second channel sounding message on a second directional beam of the one or more directional beams, the one or more channel sounding messages being received in accordance with the first configuration, or the second configuration, or any combination thereof.

In some examples, the configuration manager 1525 may transmit RRC signaling that configures the one or more channel sounding messages. In some examples, the configuration manager 1525 may transmit, as part of the NPDCCH order, an indication of one or more directional beams, one or more narrowband carriers, or any combination thereof, for transmitting one or more random access preamble messages as the one or more channel sounding messages.

In some examples, the configuration manager 1525 may configure a set of resources for the one or more channel sounding messages, where the set of resources is shared by two or more UEs including the UE, or is a UE-specific resource, or is a contention-based resource, or is a contention-free resource, or any combination thereof.

In some cases, each narrowband carrier is different from a carrier used for random access procedures. In some cases, each narrowband carrier is different from an anchor carrier of the set of narrowband carriers associated with each directional beam. In some cases, the second configuration is based on modifying at least a portion of the first configuration. In some cases, the first configuration is different from the second configuration. In some cases, at least a portion of the first configuration and the second configuration is common across the first directional beam and the second directional beam.

The carrier configuration manager 1560 may transmit, to the UE, an indication to modify a carrier for communications from a first narrowband carrier associated with the directional beam to a second narrowband carrier associated with a second directional beam, the second narrowband carrier being different from the first narrowband carrier. In some cases, the second narrowband carrier is from a set of candidate carriers.

The transmission manager 1530 may transmit, to the UE, an indication of the configuration of the one or more channel sounding messages, where the one or more channel sounding messages are received based on the configuration.

In some examples, the transmission manager 1530 may transmit, to the UE, system information over the one or more directional beams, or the directional beam, or any combination thereof, the system information indicating the configuration. In such examples, the locations of the narrowband carriers for transmitting the one or more channel sounding messages may be identified based on the configuration indicated by the system information.

In some examples, the transmission manager 1530 may transmit a configuration of one or more measurement objects corresponding to different directional beams, where the one or more channel sounding messages are received based on measurements of the one or more measurement objects.

In some examples, the transmission manager 1530 may transmit a configuration of the set of candidate carriers to the UE, where the configuration is transmitted via RRC signaling, a MAC-CE, or any combination thereof.

The resource manager 1535 may identify locations of the narrowband carriers for transmitting the one or more channel sounding messages, the locations including a time resource, a frequency resource, at least one directional beam of the one or more directional beams, or any combination thereof.

In some examples, the resource manager 1535 may determine, from the configuration, a set of random access occasions for receiving the random access preamble message, the random access preamble message received during at least one random access occasion of the set of random access occasions, where the set of random access occasions include random access occasions that are configured across different narrowband carriers of the one or more directional beams, and where the configuration indicates the set of random access occasions.

In some cases, the random access occasions are configured across the one or more directional beams in accordance with a pattern across time resources, or frequency resources, or both. In some cases, the pattern includes a set of random access resources in adjacent carriers, the set of random access resources being adjacent in time. In some cases, each random access resource of the set of random access resources adjacent in time are separated by a time interval.

In some cases, each directional beam of one or more directional beams including the directional beam corresponds to a different radio frequency. In some cases, the one or more channel sounding messages are received based on periodic transmission occasions, aperiodic transmission occasions, dynamic transmission occasions, one or more UE-initiated transmission occasions, one or more event triggers, or any combination thereof.

The modification manager 1540 may transmit, to the UE, one or more messages that modifies the configuration of the one or more channel sounding messages, where the one or more messages include a MAC-CE, DCI, or any combination thereof. In some cases, the one or more messages activate transmissions of the one or more channel sounding messages, deactivate the transmissions of the one or more channel sounding messages, or any combination thereof.

The trigger manager 1545 may transmit, to the UE, DCI including a trigger for transmitting the one or more channel sounding messages. In some examples, transmitting, within the DCI, a NPDCCH order, where the NPDCCH order includes the trigger. In some cases, the one or more channel sounding messages are received based on an event trigger being satisfied.

The beam failure manager 1550 may receive the one or more channel sounding messages as part of a beam failure recovery procedure. In some examples, the beam failure manager 1550 may receive an indicating of a beam failure from the UE based on a signal quality of the narrowband carrier of the directional beam satisfying a threshold.

In some examples, the beam failure manager 1550 may select, based on a beam management procedure, or a beam failure recovery procedure, or any combination thereof, a second directional beam different from the directional beam, where the selection is based on receiving the one or more channel sounding messages on at least the second directional beam.

The handover manager 1555 may perform a handover procedure for handing over the UE to a second cell different from a first cell that is associated with the directional beam, the second cell associated with a second directional beam, where the handover procedure is based on the received channel sounding message.

The indication manager 1565 may transmit DCI, a MAC-CE, or any combination thereof, that includes the indication to modify the carrier for communications.

Figure 16:
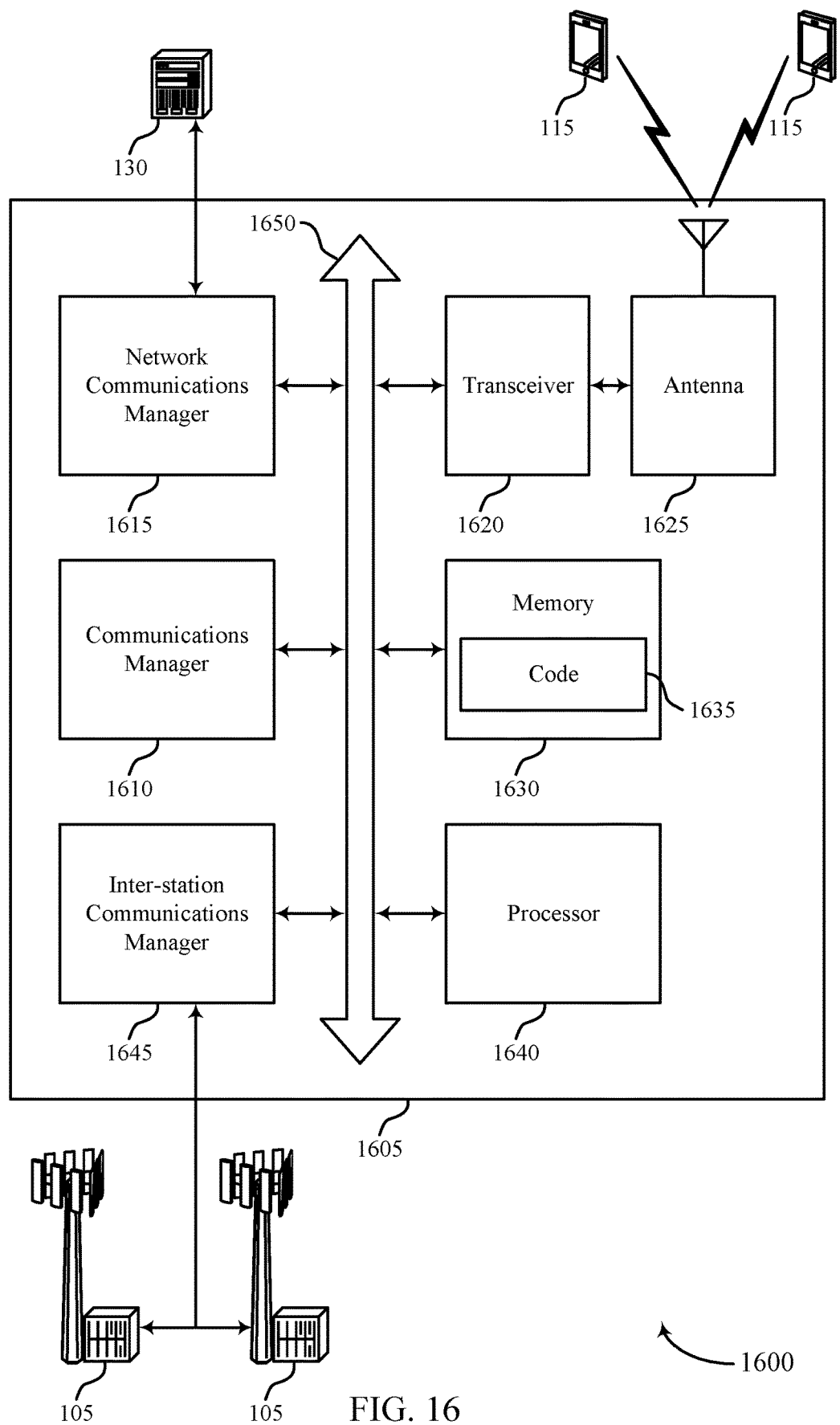
FIG. 16 shows a diagram of a system including a device that supports connected mode beam management for narrowband systems in accordance with one or more aspects of the present disclosure.

FIG. 16 shows a diagram of a system 1600 including a device 1605 that supports connected mode beam management for narrowband systems in accordance with one or more aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may communicate with a UE over a directional beam, receive one or more channel sounding messages from the UE, the one or more channel sounding messages received on a narrowband carrier (e.g., frequency resource) of a set of narrowband carriers, and determine a beam or channel quality of the directional beam based on the received one or more channel sounding messages. The communications manager 1610 may also communicate with a UE over a directional beam, transmit, to the UE, an indication to modify a carrier for communications from a first narrowband carrier associated with the directional beam to a second narrowband carrier associated with a second directional beam, the second narrowband carrier being different from the first narrowband carrier, and switch to the second narrowband carrier based on the indication.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas. In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting connected mode beam management for narrowband systems).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
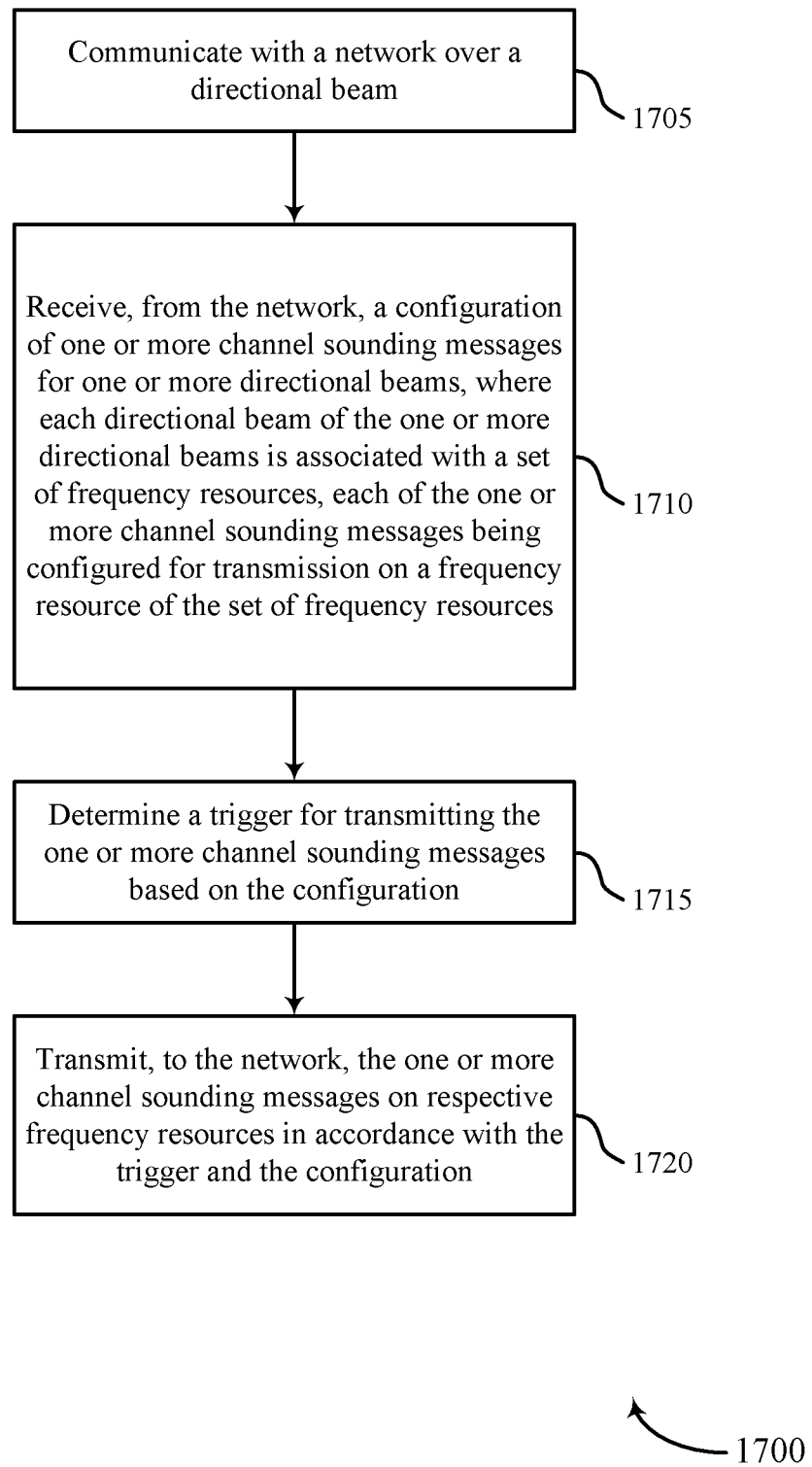
FIGS. 17 through 24 show flowcharts illustrating methods that support connected mode beam management for narrowband systems in accordance with one or more aspects of the present disclosure.

FIG. 17 shows a flowchart illustrating a method 1700 that supports connected mode beam management for narrowband systems in accordance with one or more aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1705, the UE may communicate with a network over a directional beam. The operations of 1705 may be performed according to the methods described herein. In some examples, aspects of the operations of 1705 may be performed by a communication module as described with reference to FIGS. 9 through 12.

At 1710, the UE may receive, from the network, a configuration of one or more channel sounding messages for one or more directional beams, where each directional beam of the one or more directional beams is associated with a set of frequency resources, each of the one or more channel sounding messages being configured for transmission on a frequency resource of the set of frequency resources. The operations of 1710 may be performed according to the methods described herein. In some examples, aspects of the operations of 1710 may be performed by a configuration module as described with reference to FIGS. 9 through 12.

At 1715, the UE may determine a trigger for transmitting the one or more channel sounding messages based on the configuration. The operations of 1715 may be performed according to the methods described herein. In some examples, aspects of the operations of 1715 may be performed by a trigger module as described with reference to FIGS. 9 through 12.

At 1720, the UE may transmit, to the network, the one or more channel sounding messages on respective frequency resources in accordance with the trigger and the configuration. The operations of 1720 may be performed according to the methods described herein. In some examples, aspects of the operations of 1720 may be performed by a transmission module as described with reference to FIGS. 9 through 12.

Figure 18:
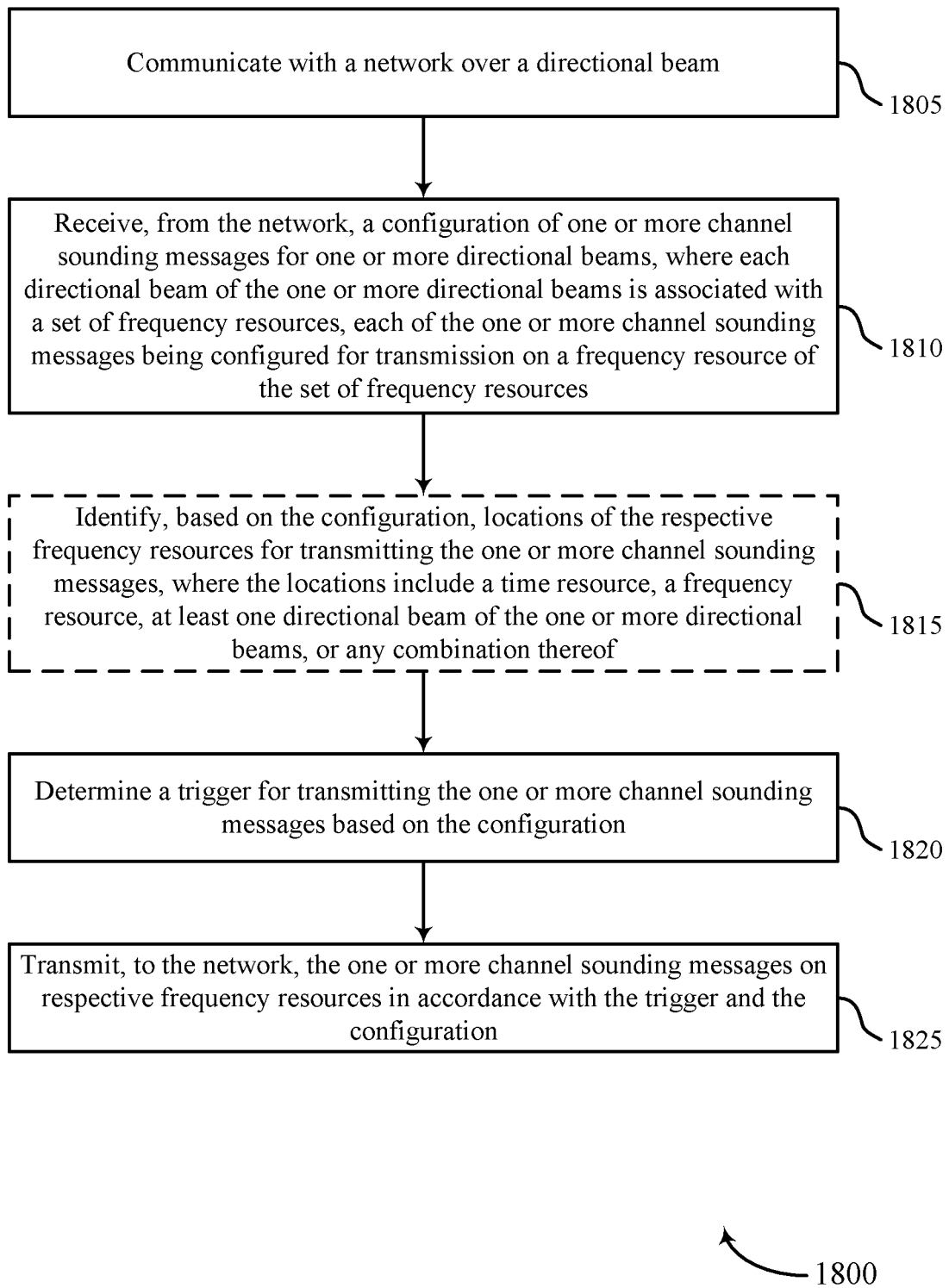

FIG. 18 shows a flowchart illustrating a method 1800 that supports connected mode beam management for narrowband systems in accordance with one or more aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1805, the UE may communicate with a network over a directional beam. The operations of 1805 may be performed according to the methods described herein. In some examples, aspects of the operations of 1805 may be performed by a network communication manager as described with reference to FIGS. 9 through 12.

At 1810, the UE may receive, from the network, a configuration of one or more channel sounding messages for one or more directional beams, where each directional beam of the one or more directional beams is associated with a set of frequency resources, each of the one or more channel sounding messages being configured for transmission on a frequency resource of the set of frequency resources. The operations of 1810 may be performed according to the methods described herein. In some examples, aspects of the operations of 1810 may be performed by a configuration module as described with reference to FIGS. 9 through 12.

At 1815, the UE may identify, based on the configuration, locations of the respective frequency resources for transmitting the one or more channel sounding messages, where the locations include a time resource, a frequency resource, at least one directional beam of the one or more directional beams, or any combination thereof. The operations of 1815 may be performed according to the methods described herein. In some examples, aspects of the operations of 1815 may be performed by a resource module as described with reference to FIGS. 9 through 12.

At 1820, the UE may determine a trigger for transmitting the one or more channel sounding messages based on the configuration. The operations of 1820 may be performed according to the methods described herein. In some examples, aspects of the operations of 1820 may be performed by a trigger module as described with reference to FIGS. 9 through 12.

At 1825, the UE may transmit, to the network, the one or more channel sounding messages on respective frequency resources in accordance with the trigger and the configuration. The operations of 1825 may be performed according to the methods described herein. In some examples, aspects of the operations of 1825 may be performed by a transmission module as described with reference to FIGS. 9 through 12.

Figure 19:
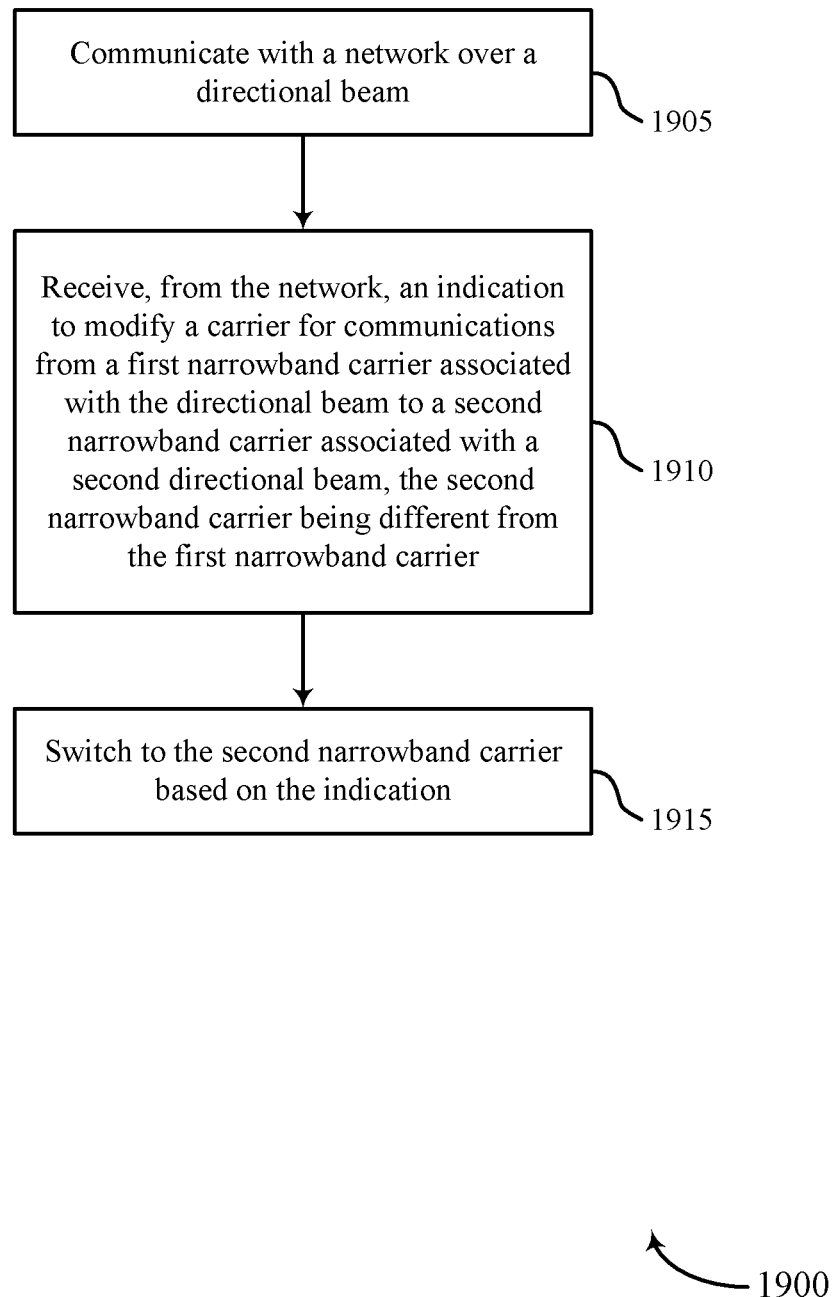

FIG. 19 shows a flowchart illustrating a method 1900 that supports connected mode beam management for narrowband systems in accordance with one or more aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1905, the UE may communicate with a network over a directional beam. The operations of 1905 may be performed according to the methods described herein. In some examples, aspects of the operations of 1905 may be performed by a network communication manager as described with reference to FIGS. 9 through 12.

At 1910, the UE may receive, from the network, an indication to modify a carrier for communications from a first narrowband carrier associated with the directional beam to a second narrowband carrier associated with a second directional beam, the second narrowband carrier being different from the first narrowband carrier. The operations of 1910 may be performed according to the methods described herein. In some examples, aspects of the operations of 1910 may be performed by a carrier module as described with reference to FIGS. 9 through 12.

At 1915, the UE may switch to the second narrowband carrier based on the indication. The operations of 1915 may be performed according to the methods described herein. In some examples, aspects of the operations of 1915 may be performed by a configuration module as described with reference to FIGS. 9 through 12.

Figure 20:
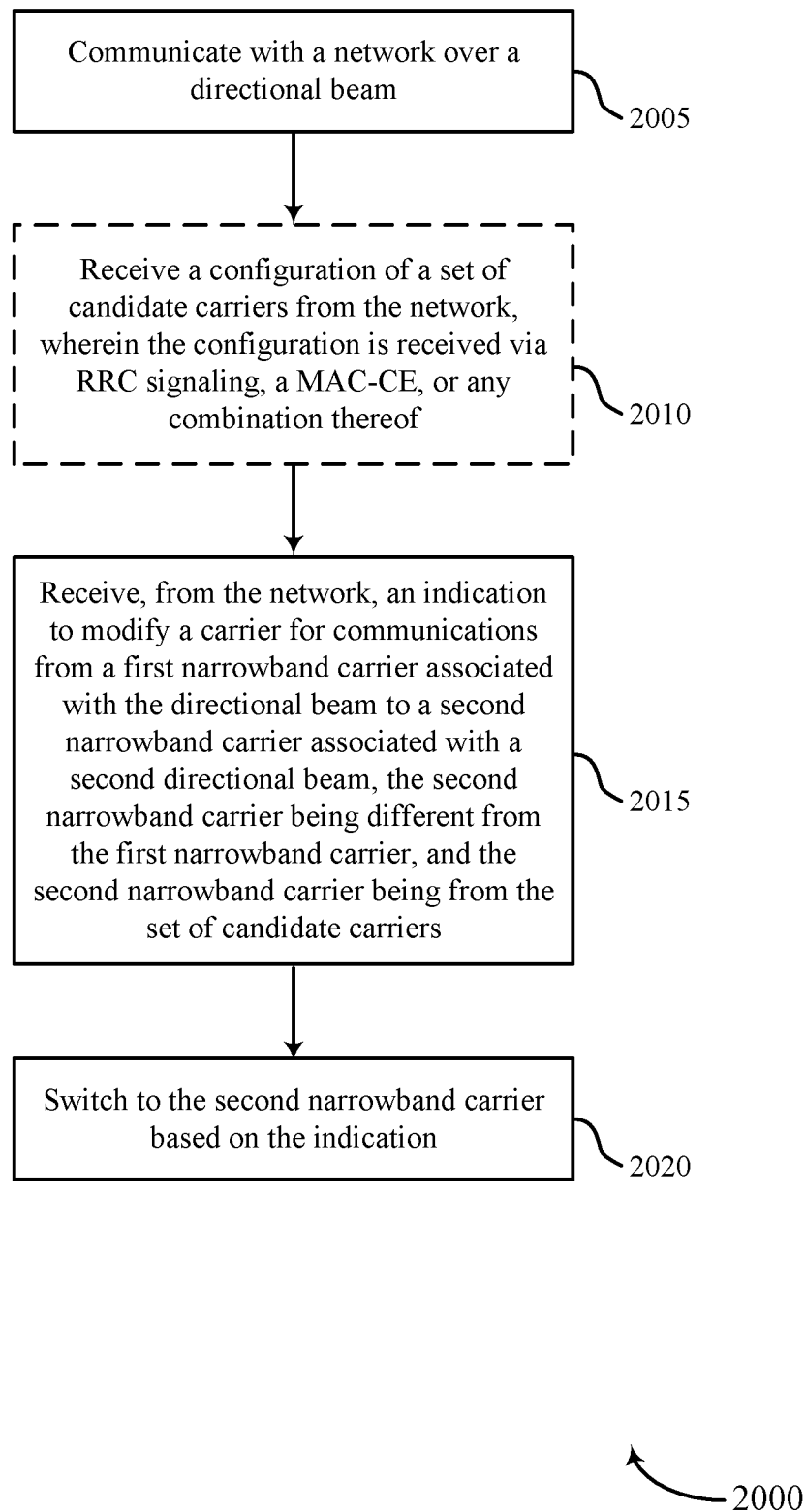

FIG. 20 shows a flowchart illustrating a method 2000 that supports connected mode beam management for narrowband systems in accordance with one or more aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2005, the UE may communicate with a network over a directional beam. The operations of 2005 may be performed according to the methods described herein. In some examples, aspects of the operations of 2005 may be performed by a network communication manager as described with reference to FIGS. 9 through 12.

At 2010, the UE may receive a configuration of a set of candidate carriers from the network, where the configuration is received via RRC signaling, a MAC-CE, or any combination thereof. The operations of 2010 may be performed according to the methods described herein. In some examples, aspects of the operations of 2010 may be performed by a carrier module as described with reference to FIGS. 9 through 12.

At 2015, the UE may receive, from the network, an indication to modify a carrier for communications from a first narrowband carrier associated with the directional beam to a second narrowband carrier associated with a second directional beam, the second narrowband carrier being different from the first narrowband carrier, and the second narrowband carrier being from the set of candidate carriers. The operations of 2015 may be performed according to the methods described herein. In some examples, aspects of the operations of 2015 may be performed by a carrier module as described with reference to FIGS. 9 through 12.

At 2020, the UE may switch to the second narrowband carrier based on the indication. The operations of 2020 may be performed according to the methods described herein. In some examples, aspects of the operations of 2020 may be performed by a configuration module as described with reference to FIGS. 9 through 12.

Figure 21:
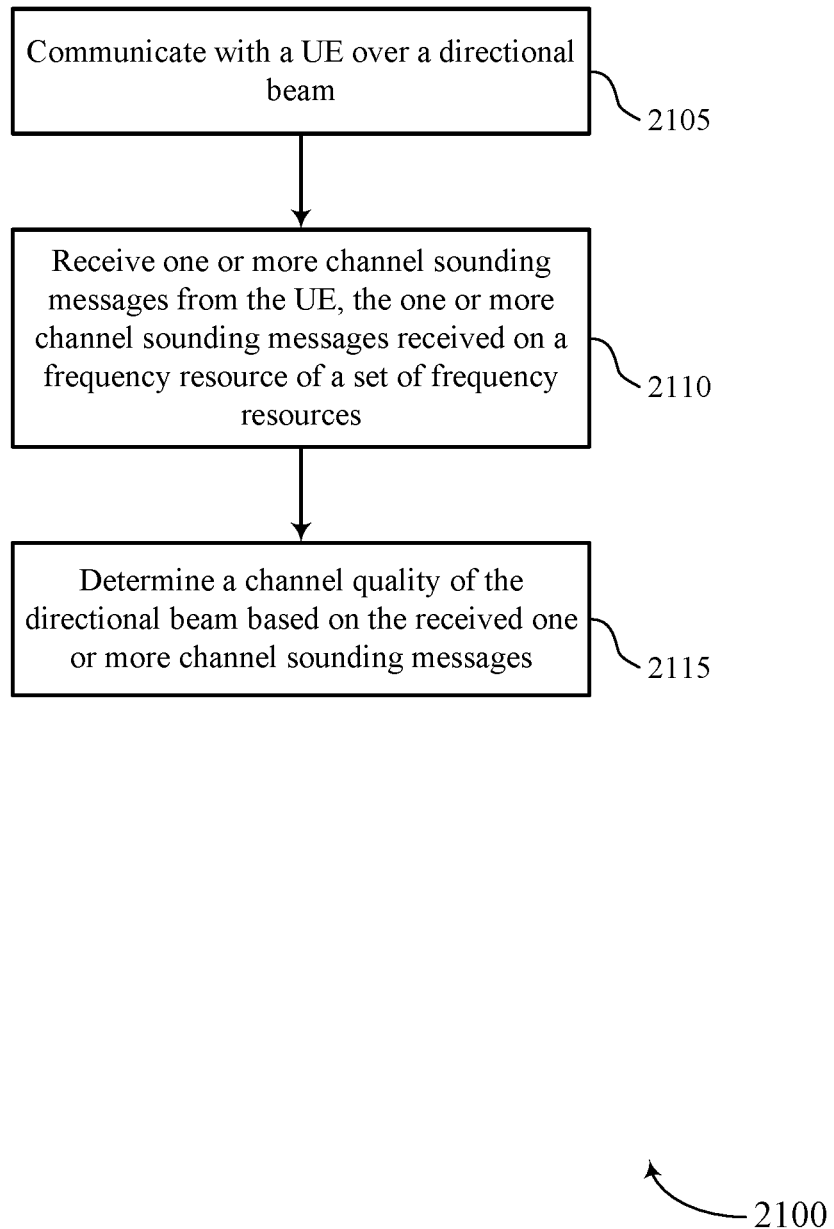

FIG. 21 shows a flowchart illustrating a method 2100 that supports connected mode beam management for narrowband systems in accordance with one or more aspects of the present disclosure. The operations of method 2100 may be implemented by a base station 105 or its components as described herein. Additionally or alternatively, the operations of method 2100 may be implemented by a satellite or other access device. For example, the operations of method 2100 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2105, the base station may communicate with a UE over a directional beam. The operations of 2105 may be performed according to the methods described herein. In some examples, aspects of the operations of 2105 may be performed by a network communication manager as described with reference to FIGS. 13 through 16.

At 2110, the base station may receive one or more channel sounding messages from the UE, the one or more channel sounding messages received on a frequency resource of a set of frequency resources. The operations of 2110 may be performed according to the methods described herein. In some examples, aspects of the operations of 2110 may be performed by a message module as described with reference to FIGS. 13 through 16.

At 2115, the base station may determine a beam or channel quality of the directional beam based on the received one or more channel sounding messages. The operations of 2115 may be performed according to the methods described herein. In some examples, aspects of the operations of 2115 may be performed by a channel quality module as described with reference to FIGS. 13 through 16.

Figure 22:
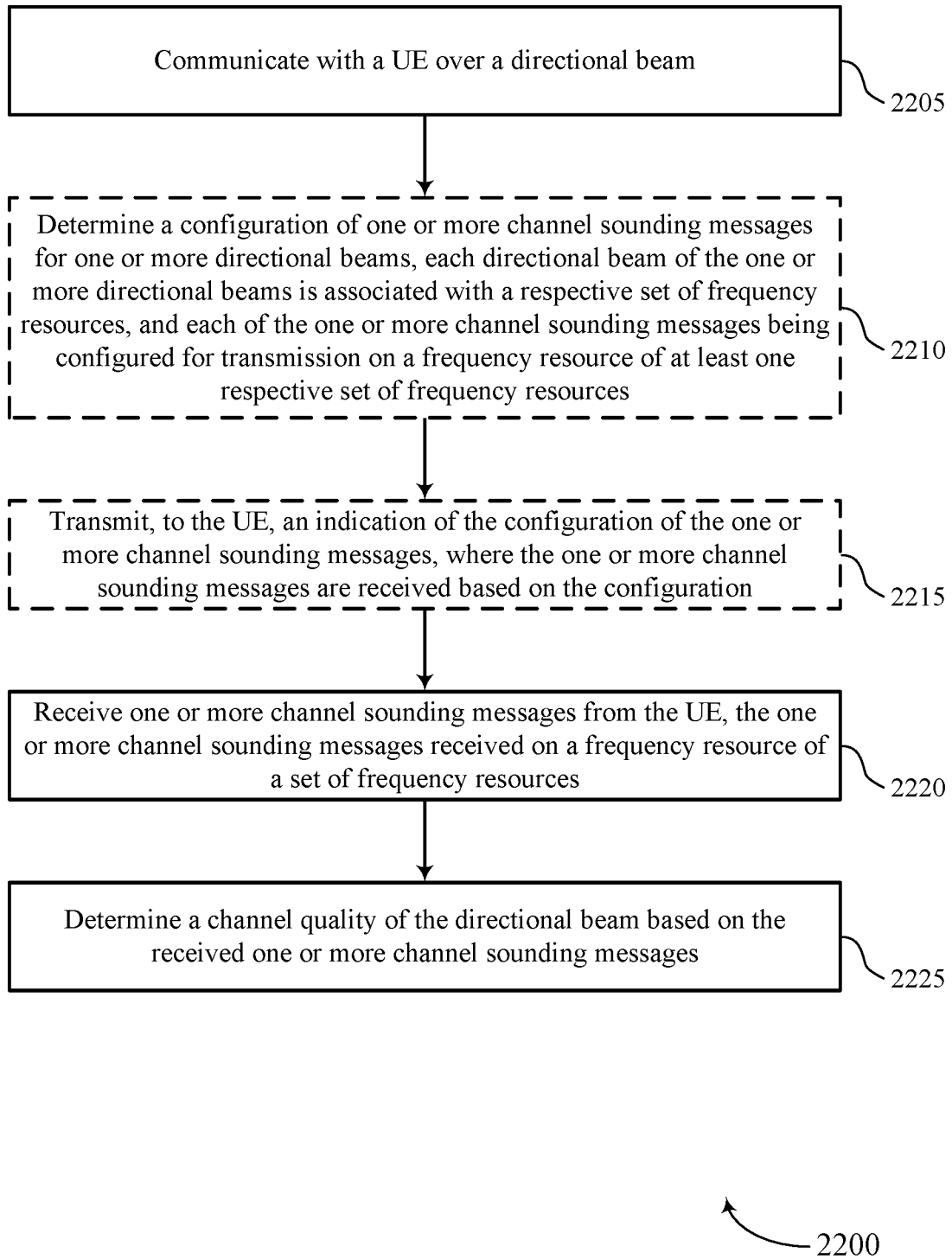

FIG. 22 shows a flowchart illustrating a method 2200 that supports connected mode beam management for narrowband systems in accordance with one or more aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2205, the base station may communicate with a UE over a directional beam. The operations of 2205 may be performed according to the methods described herein. In some examples, aspects of the operations of 2205 may be performed by a network communication manager as described with reference to FIGS. 13 through 16.

At 2210, the base station may determine a configuration of the one or more channel sounding messages for one or more directional beams, where each directional beam of the one or more directional beams is associated with a respective set of frequency resources, each of the one or more channel sounding messages being configured for transmission on a frequency resource of at least one respective set of frequency resources. The operations of 2210 may be performed according to the methods described herein. In some examples, aspects of the operations of 2210 may be performed by a configuration module as described with reference to FIGS. 13 through 16.

At 2215, the base station may transmit, to the UE, an indication of the configuration of the one or more channel sounding messages, where the one or more channel sounding messages are received based on the configuration. The operations of 2215 may be performed according to the methods described herein. In some examples, aspects of the operations of 2215 may be performed by a transmission module as described with reference to FIGS. 13 through 16.

At 2220, the base station may receive one or more channel sounding messages from the UE, the one or more channel sounding messages received on a frequency resource of a set of frequency resources. The operations of 2220 may be performed according to the methods described herein. In some examples, aspects of the operations of 2220 may be performed by a message module as described with reference to FIGS. 13 through 16.

At 2225, the base station may determine a beam or channel quality of the directional beam based on the received one or more channel sounding messages. The operations of 2225 may be performed according to the methods described herein. In some examples, aspects of the operations of 2225 may be performed by a channel quality module as described with reference to FIGS. 13 through 16.

Figure 23:
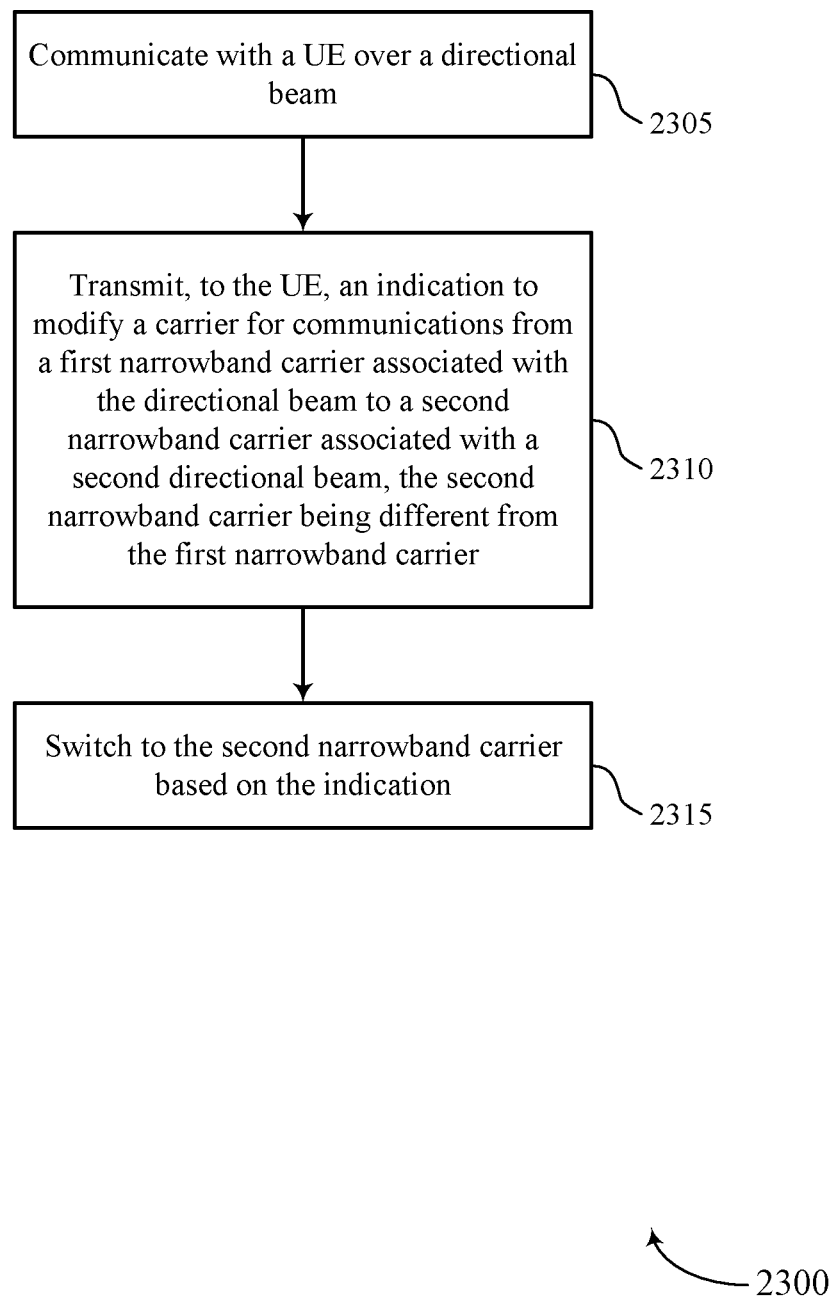

FIG. 23 shows a flowchart illustrating a method 2300 that supports connected mode beam management for narrowband systems in accordance with one or more aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2305, the base station may communicate with a UE over a directional beam. The operations of 2305 may be performed according to the methods described herein. In some examples, aspects of the operations of 2305 may be performed by a network communication manager as described with reference to FIGS. 13 through 16.

At 2310, the base station may transmit, to the UE, an indication to modify a carrier for communications from a first narrowband carrier associated with the directional beam to a second narrowband carrier associated with a second directional beam, the second narrowband carrier being different from the first narrowband carrier. The operations of 2310 may be performed according to the methods described herein. In some examples, aspects of the operations of 2310 may be performed by a carrier configuration module as described with reference to FIGS. 13 through 16.

At 2315, the base station may switch to the second narrowband carrier based on the indication. The operations of 2315 may be performed according to the methods described herein. In some examples, aspects of the operations of 2315 may be performed by a configuration module as described with reference to FIGS. 13 through 16.

Figure 24:
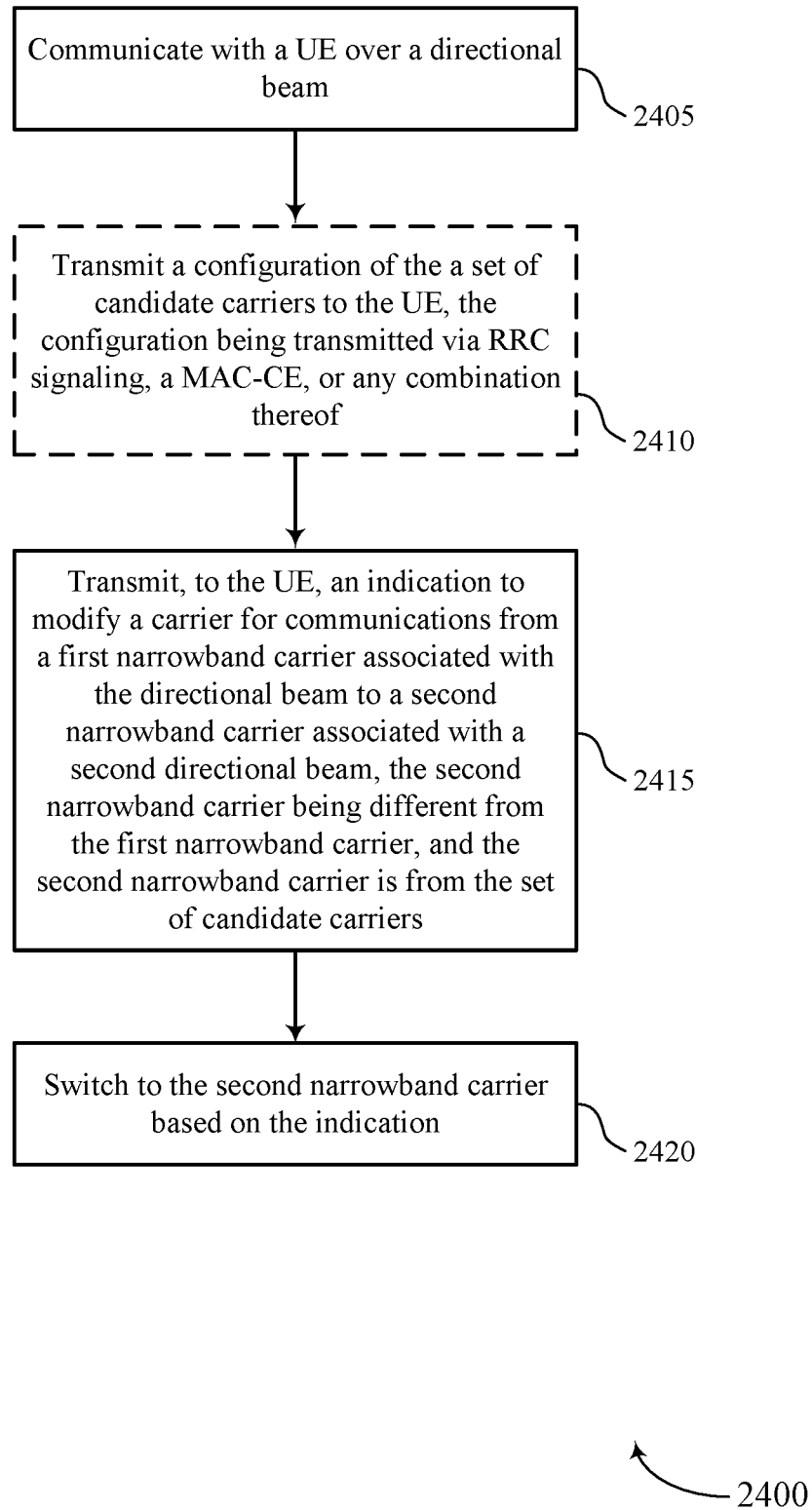

FIG. 24 shows a flowchart illustrating a method 2400 that supports connected mode beam management for narrowband systems in accordance with one or more aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2405, the base station may communicate with a UE over a directional beam. The operations of 2405 may be performed according to the methods described herein. In some examples, aspects of the operations of 2405 may be performed by a network communication manager as described with reference to FIGS. 13 through 16.

At 2410, the base station may transmit a configuration of the set of candidate carriers to the UE, where the configuration is transmitted via RRC signaling, a MAC-CE, or any combination thereof. The operations of 2410 may be performed according to the methods described herein. In some examples, aspects of the operations of 2410 may be performed by a carrier configuration module as described with reference to FIGS. 13 through 16.

At 2415, the base station may transmit, to the UE, an indication to modify a carrier for communications from a first narrowband carrier associated with the directional beam to a second narrowband carrier associated with a second directional beam, the second narrowband carrier being different from the first narrowband carrier, and the second narrowband carrier is from the set of candidate carriers. The operations of 2415 may be performed according to the methods described herein. In some examples, aspects of the operations of 2415 may be performed by a carrier configuration module as described with reference to FIGS. 13 through 16.

At 2420, the base station may switch to the second narrowband carrier based on the indication. The operations of 2420 may be performed according to the methods described herein. In some examples, aspects of the operations of 2420 may be performed by a configuration module as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: communicating with a network over a directional beam; receiving, from the network, a configuration of one or more channel sounding messages for one or more directional beams, wherein each directional beam of the one or more directional beams is associated with a set of frequency resources, each of the one or more channel sounding messages being configured for transmission on a frequency resource of the set of frequency resources; determining a trigger for transmitting the one or more channel sounding messages based at least in part on the configuration; and transmitting, to the network, the one or more channel sounding messages on respective frequency resources in accordance with the trigger and the configuration.

Aspect 2: The method of aspect 1, further comprising: identifying, based at least in part on the configuration, locations of the respective frequency resources for transmitting the one or more channel sounding messages, wherein the locations comprise a time resource, a frequency resource, at least one directional beam of the one or more directional beams, or any combination thereof.

Aspect 3: The method of aspect 2, further comprising: receiving, from the network, system information over the one or more directional beams, or the directional beam, or any combination thereof, the system information indicating the configuration.

Aspect 4: The method of any of aspects 2 through 3, wherein each frequency resource is different from a resource used for random access procedures with the network, and each frequency resource is different from an anchor resource of the set of frequency resources associated with each directional beam.

Aspect 5: The method of any of aspects 1 through 4, further comprising: determining a first configuration of a first channel sounding message on a first directional beam of the one or more directional beams; and determining a second configuration of a second channel sounding message on a second directional beam of the one or more directional beams, the one or more channel sounding messages being transmitted in accordance with the first configuration, or the second configuration, or any combination thereof.

Aspect 6: The method of aspect 5, the determining the second configuration comprising: determining the second configuration based at least in part on modifying at least a portion of the first configuration, the method further comprising: applying a frequency translation to the first configuration, the second configuration being determined based at least in part on the applied frequency translation.

Aspect 7: The method of any of aspects 5 through 6, wherein the first configuration is different from the second configuration.

Aspect 8: The method of any of aspects 5 through 7, wherein at least a portion of the first configuration and the second configuration is common across the first directional beam and the second directional beam.

Aspect 9: The method of any of aspects 1 through 8, wherein each of the one or more channel sounding messages comprise a random access preamble message, the method further comprising: determining, from the configuration, a set of random access occasions for transmitting the random access preamble message, the random access preamble message transmitted during at least one random access occasion of the set of random access occasions, wherein the set of random access occasions include random access occasions that are configured across different frequency resources of the one or more directional beams.

Aspect 10: The method of aspect 9, wherein the random access occasions are configured across the one or more directional beams in accordance with a pattern across time resources, or frequency resources, or both; the pattern comprises a set of random access resources in adjacent carriers, the set of random access resources being adjacent in time, each random access resource of the set of random access resources adjacent in time being separated by a time interval; and each random access preamble message comprises a narrowband random access preamble message.

Aspect 11: The method of any of aspects 9 through 10, wherein at least one of the one or more channel sounding messages comprises a first random access preamble that is different from a second random access preamble that is used for random access procedures with the network.

Aspect 12: The method of any of aspects 9 through 11, wherein a first random access preamble of the one or more channel sounding messages comprises a preamble that is shared across two or more UEs, a UE-specific preamble, a contention-based random access preamble, a contention-free random access preamble, or any combination thereof.

Aspect 13: The method of any of aspects 9 through 12, further comprising: refraining from monitoring for a response from the network based at least in part on transmitting the one or more channel sounding messages.

Aspect 14: The method of any of aspects 1 through 13, further comprising: monitoring for a communication over the directional beam after transmitting the one or more channel sounding messages; and communicating with the network over the directional beam based at least in part on the monitoring.

Aspect 15: The method of any of aspects 1 through 14, the determining the trigger comprising: receiving, from the network, downlink control information comprising the trigger for transmitting the one or more channel sounding messages, the method further comprising: identifying, within the downlink control information, a narrowband physical downlink control channel order, wherein the narrowband physical downlink control channel order comprises the trigger; and determining, based at least in part on the narrowband physical downlink control channel order, the one or more directional beams, one or more frequency resources, or any combination thereof, for transmitting one or more random access preamble messages as the one or more channel sounding messages.

Aspect 16: The method of aspect 15, the transmitting the one or more channel sounding messages comprising: transmitting one or more random access preamble messages at each of a plurality of transmission occasions based at least in part on the narrowband physical downlink control channel order.

Aspect 17: The method of any of aspects 1 through 16, the receiving the configuration comprising: receiving radio resource control signaling that configures the one or more channel sounding messages, the method further comprising: receiving one or more messages from the network that modify the configuration of the one or more channel sounding messages, wherein the one or more messages comprise a medium access control (MAC) control element, downlink control information, or any combination thereof, and wherein the one or more messages activate transmissions of the one or more channel sounding messages, deactivate the transmissions of the one or more channel sounding messages, or any combination thereof.

Aspect 18: The method of any of aspects 1 through 17, further comprising: determining that an event trigger has been satisfied, wherein the one or more channel sounding messages are transmitted based at least in part on the event trigger being satisfied; and identifying a set of resources for transmitting the one or more channel sounding messages based at least in part on the event trigger being satisfied, wherein the set of resources is shared by two or more UEs including the UE, or is a UE-specific resource, or is a contention-based resource, or is a contention-free resource, or any combination thereof.

Aspect 19: The method of any of aspects 1 through 18, further comprising: monitoring a first frequency resource of a first set of frequency resources associated with the directional beam; determining a beam failure for the directional beam based at least in part on the monitoring, wherein transmitting the one or more channel sounding messages is based on the determined beam failure, wherein the one or more channel sounding messages are part of a beam failure recovery procedure; and indicating the beam failure to the network based at least in part on a signal quality of the first frequency resource of the directional beam satisfying a threshold.

Aspect 20: The method of any of aspects 1 through 19, wherein each directional beam of the one or more directional beams corresponds to a different radio frequency.

Aspect 21: The method of any of aspects 1 through 20, further comprising: receiving a configuration of one or more measurement objects corresponding to different directional beams, wherein the one or more channel sounding messages are transmitted based at least in part on performing measurements of the one or more measurement objects.

Aspect 22: The method of any of aspects 1 through 21, wherein at least one of the one or more channel sounding messages comprises a narrowband sounding reference signal, and each frequency resource of the set of frequency resources comprises a narrowband carrier, or a bandwidth part, or any combination thereof.

Aspect 23: The method of any of aspects 1 through 22, further comprising: selecting, based at least in part on a beam management procedure, or a beam failure recovery procedure, or any combination thereof, a second directional beam different from the directional beam, wherein the selection is based at least in part on transmitting the one or more channel sounding messages on at least the second directional beam; and communicating with the network using the second directional beam.

Aspect 24: The method of any of aspects 1 through 23, further comprising: identifying a first cell associated with directional beam; performing a handover procedure to a second cell different from the first cell, the handover procedure corresponding to establishing a connection with a second directional beam associated with the second cell, wherein the handover procedure is based at least in part on transmitting the one or more channel sounding messages on at least the second directional beam; and communicating with the network using the second directional beam.

Aspect 25: The method of any of aspects 1 through 24, wherein the trigger comprises periodic transmission occasions, aperiodic transmission occasions, semi-persistent transmission occasions, dynamic transmission occasions, one or more UE-initiated transmission occasions, one or more event triggers, or any combination thereof; the directional beam, the frequency resource, the set of frequency resources, the one or more channel sounding messages, or any combination thereof, are used for narrowband internet of things communications; and the network comprises a non-terrestrial network.

Aspect 26: A method for wireless communication at a UE, comprising: communicating with a network over a directional beam; receiving, from the network, an indication to modify a carrier for communications from a first narrowband carrier associated with the directional beam to a second narrowband carrier associated with a second directional beam, the second narrowband carrier being different from the first narrowband carrier; and switching to the second narrowband carrier based at least in part on the indication.

Aspect 27: The method of aspect 26, wherein the second narrowband carrier is from a set of candidate carriers, the method further comprising: receiving a configuration of the set of candidate carriers from the network, wherein the configuration is received via radio resource control signaling, a medium access control (MAC) control element, or any combination thereof.

Aspect 28: The method of any of aspects 26 through 27, the receiving the indication comprising: receiving downlink control information, a MAC control element, or any combination thereof, that includes the indication to modify the carrier for communications, the method further comprising: transmitting, in response to the received downlink control information, or the MAC control element, or any combination thereof, an acknowledgment of the indication to modify the carrier for communications.

Aspect 29: A method for wireless communication, comprising: communicating with a UE over a directional beam; receiving one or more channel sounding messages from the UE, the one or more channel sounding messages received on a frequency resource of a set of frequency resources; and determining a channel quality of the directional beam based at least in part on the received one or more channel sounding messages.

Aspect 30: A method for wireless communication, comprising: communicating with a user equipment (UE) over a directional beam; transmitting, to the UE, an indication to modify a carrier for communications from a first narrowband carrier associated with the directional beam to a second narrowband carrier associated with a second directional beam, the second narrowband carrier being different from the first narrowband carrier; and switching to the second narrowband carrier based at least in part on the indication.

Aspect 31: A method for wireless communication at a UE, comprising: communicating with a network over a directional beam; receiving, from the network, a configuration of one or more channel sounding messages for one or more directional beams, wherein each directional beam of the one or more directional beams is associated with a set of narrowband carriers, each of the one or more channel sounding messages being configured for transmission on a narrowband carrier of the set of narrowband carriers; determining a trigger for transmitting the one or more channel sounding messages based at least in part on the configuration; and transmitting, to the network, the one or more channel sounding messages on respective narrowband carriers in accordance with the trigger and the configuration.

Aspect 32: The method of aspect 31, further comprising: identifying, based at least in part on the configuration, locations of the respective narrowband carriers for transmitting the one or more channel sounding messages, wherein the locations comprise a time resource, a frequency resource, at least one directional beam of the one or more directional beams, or any combination thereof.

Aspect 33: The method of aspect 32, further comprising: receiving, from the network, system information over the one or more directional beams, or the directional beam, or any combination thereof, the system information indicating configuration.

Aspect 34: The method of any of aspects 32 through 33, wherein each narrowband carrier is different from a carrier used for random access procedures with the network.

Aspect 35: The method of any of aspects 32 through 34, wherein each narrowband carrier is different from an anchor carrier of the set of narrowband carriers associated with each directional beam.

Aspect 36: The method of any of aspects 31 through 35, further comprising: determining a first configuration of a first channel sounding message on a first directional beam of the one or more directional beams; and determining a second configuration of a second channel sounding message on a second directional beam of the one or more directional beams, the one or more channel sounding messages being transmitted in accordance with the first configuration, or the second configuration, or any combination thereof.

Aspect 37: The method of aspect 36, the determining the second configuration comprises: determining the second configuration based at least in part on modifying at least a portion of the first configuration.

Aspect 38: The method of aspect 37, further comprising: applying a frequency translation to the first configuration, the second configuration being determined based at least in part on the applied frequency translation.

Aspect 39: The method of any of aspects 36 through 38, wherein the first configuration is different from the second configuration.

Aspect 40: The method of any of aspects 36 through 39, wherein at least a portion of the first configuration and the second configuration is common across the first directional beam and the second directional beam.

Aspect 41: The method of any of aspects 31 through 40, wherein each of the one or more channel sounding messages comprise a random access preamble message, the method further comprising: determining, from the configuration, a set of random access occasions for transmitting the random access preamble message, the random access preamble message transmitted during at least one random access occasion of the set of random access occasions, wherein the set of random access occasions include random access occasions that are configured across different narrowband carriers of the one or more directional beams.

Aspect 42: The method of aspect 41, wherein the random access occasions are configured across the one or more directional beams in accordance with a pattern across time resources, or frequency resources, or both.

Aspect 43: The method of aspect 42, wherein the pattern comprises a set of random access resources in adjacent carriers, the set of random access resources being adjacent in time.

Aspect 44: The method of aspect 43, wherein each random access resource of the set of random access resources adjacent in time are separated by a time interval.

Aspect 45: The method of any of aspects 41 through 44, wherein at least one of the one or more channel sounding messages comprises a first random access preamble that is different from a second random access preamble that is used for random access procedures with the network.

Aspect 46: The method of any of aspects 41 through 45, wherein a first random access preamble of the one or more channel sounding messages comprises a preamble that is shared across two or more UEs, a UE-specific preamble, a contention-based random access preamble, a contention-free random access preamble, or any combination thereof.

Aspect 47: The method of any of aspects 41 through 46, further comprising: refraining from monitoring for a response from the network based at least in part on transmitting the one or more channel sounding messages.

Aspect 48: The method of any of aspects 41 through 47, wherein each of the random access preamble message comprises a narrowband random access preamble message.

Aspect 49: The method of any of aspects 31 through 48, further comprising: monitoring for a communication over the directional beam after transmitting the one or more channel sounding messages; and communicating with the network over the directional beam based at least in part on the monitoring.

Aspect 50: The method of any of aspects 31 through 49, the determining the trigger comprising: receiving, from the network, downlink control information comprising the trigger for transmitting the one or more channel sounding messages.

Aspect 51: The method of aspect 50, further comprising: identifying, within the downlink control information, a narrowband physical downlink control channel order, wherein the narrowband physical downlink control channel order comprises the trigger.

Aspect 52: The method of aspect 51, further comprising: determining, based at least in part on the narrowband physical downlink control channel order, the one or more directional beams, one or more narrowband carriers, or any combination thereof, for transmitting one or more random access preamble messages as the one or more channel sounding messages.

Aspect 53: The method of any of aspects 51 through 52, the transmitting the one or more channel sounding messages comprising: transmitting one or more random access preamble messages at each of a plurality of transmission occasions based at least in part on the narrowband physical downlink control channel order.

Aspect 54: The method of any of aspects 31 through 53, the receiving the configuration comprising: receiving radio resource control signaling that configures the one or more channel sounding messages.

Aspect 55: The method of aspect 54, further comprising: receiving one or more messages from the network that modify the configuration of the one or more channel sounding messages, wherein the one or more messages comprise a medium access control (MAC) control element, downlink control information, or any combination thereof.

Aspect 56: The method of aspect 55, wherein the one or more messages activate transmissions of the one or more channel sounding messages, deactivate the transmissions of the one or more channel sounding messages, or any combination thereof.

Aspect 57: The method of any of aspects 31 through 56, further comprising: determining that an event trigger has been satisfied, wherein the one or more channel sounding messages are transmitted based at least in part on the event trigger being satisfied.

Aspect 58: The method of aspect 57, further comprising: identifying a set of resources for transmitting the one or more channel sounding messages based at least in part on the event trigger being satisfied, wherein the set of resources is shared by two or more UEs including the UE, or is a UE-specific resource, or is a contention-based resource, or is a contention-free resource, or any combination thereof.

Aspect 59: The method of any of aspects 31 through 58, further comprising: monitoring a first narrowband carrier of a first set of narrowband carriers associated with the directional beam; and determining a beam failure for the directional beam based at least in part on the monitoring, wherein transmitting the one or more channel sounding messages is based on the determined beam failure, wherein the one or more channel sounding messages are part of a beam failure recovery procedure.

Aspect 60: The method of aspect 59, further comprising: indicating the beam failure to the network based at least in part on a signal quality of the first narrowband carrier of the directional beam satisfying a threshold.

Aspect 61: The method of any of aspects 31 through 60, wherein each directional beam of the one or more directional beams corresponds to a different radio frequency.

Aspect 62: The method of any of aspects 31 through 61, further comprising: receiving a configuration of one or more measurement objects corresponding to different directional beams, wherein the one or more channel sounding messages are transmitted based at least in part on performing measurements of the one or more measurement objects.

Aspect 63: The method of any of aspects 31 through 62, wherein at least one of the one or more channel sounding messages comprises a narrowband sounding reference signal.

Aspect 64: The method of any of aspects 31 through 63, further comprising: selecting, based at least in part on a beam management procedure, or a beam failure recovery procedure, or any combination thereof, a second directional beam different from the directional beam, wherein the selection is based at least in part on transmitting the one or more channel sounding messages on at least the second directional beam; and communicating with the network using the second directional beam.

Aspect 65: The method of any of aspects 31 through 64, further comprising: identifying a first cell associated with directional beam; performing a handover procedure to a second cell different from the first cell, the handover procedure corresponding to establishing a connection with a second directional beam associated with the second cell, wherein the handover procedure is based at least in part on transmitting the one or more channel sounding messages on at least the second directional beam; and communicating with the network using the second directional beam.

Aspect 66: The method of any of aspects 31 through 65, wherein the trigger comprises periodic transmission occasions, aperiodic transmission occasions, semi-persistent transmission occasions, dynamic transmission occasions, one or more UE-initiated transmission occasions, one or more event triggers, or any combination thereof.

Aspect 67: The method of any of aspects 31 through 66, wherein the directional beam, the narrowband carrier, the set of narrowband carriers, the one or more channel sounding messages, or any combination thereof, are used for narrowband internet of things communications.

Aspect 68: The method of any of aspects 31 through 67, wherein the network comprises a non-terrestrial network.

Aspect 69: A method for wireless communication at a UE, comprising: communicating with a network over a directional beam; receiving, from the network, an indication to modify a carrier for communications from a first narrowband carrier associated with the directional beam to a second narrowband carrier associated with a second directional beam, the second narrowband carrier being different from the first narrowband carrier; and switching to the second narrowband carrier based at least in part on the indication.

Aspect 70: The method of aspect 69, wherein the second narrowband carrier is from a set of candidate carriers.

Aspect 71: The method of aspect 70, further comprising: receiving a configuration of the set of candidate carriers from the network, wherein the configuration is received via radio resource control signaling, a medium access control (MAC) control element, or any combination thereof.

Aspect 72: The method of any of aspects 69 through 71, the receiving the indication comprises: receiving downlink control information, a MAC control element, or any combination thereof, that includes the indication to modify the carrier for communications.

Aspect 73: The method of aspect 72, further comprising: transmitting, in response to the received downlink control information, or the MAC control element, or any combination thereof, an acknowledgment of the indication to modify the carrier for communications.

Aspect 74: A method for wireless communication, comprising: communicating with a UE over a directional beam; receiving one or more channel sounding messages from the UE, the one or more channel sounding messages received on a narrowband carrier of a set of narrowband carriers; and determining a channel quality of the directional beam based at least in part on the received one or more channel sounding messages.

Aspect 75: The method of aspect 74, further comprising: determining a configuration of the one or more channel sounding messages for one or more directional beams, wherein each directional beam of the one or more directional beams is associated with a respective set of narrowband carriers, each of the one or more channel sounding messages being configured for transmission on a narrowband carrier of at least one respective set of narrowband carriers; and transmitting, to the UE, an indication of the configuration of the one or more channel sounding messages, wherein the one or more channel sounding messages are received based at least in part on the configuration.

Aspect 76: The method of aspect 75, further comprising: identifying locations of the narrowband carriers for transmitting the one or more channel sounding messages, the locations comprising a time resource, a frequency resource, at least one directional beam of the one or more directional beams, or any combination thereof.

Aspect 77: The method of any of aspects 75 through 76, the transmitting the indication of the configuration comprising: transmitting, to the UE, system information over the one or more directional beams, or the directional beam, or any combination thereof, the system information indicating the locations of the narrowband carriers for transmitting the one or more channel sounding messages.

Aspect 78: The method of any of aspects 75 through 77, wherein each narrowband carrier is different from a carrier used for random access procedures.

Aspect 79: The method of any of aspects 75 through 78, wherein each narrowband carrier is different from an anchor carrier of the set of narrowband carriers associated with each directional beam.

Aspect 80: The method of any of aspects 75 through 79, the determining the configuration comprising: determining a first configuration of a first channel sounding message on a first directional beam of the one or more directional beams; and determining a second configuration of a second channel sounding message on a second directional beam of the one or more directional beams, the one or more channel sounding messages being received in accordance with the first configuration, or the second configuration, or any combination thereof.

Aspect 81: The method of aspect 80, wherein the second configuration is based at least in part on modifying at least a portion of the first configuration.

Aspect 82: The method of any of aspects 80 through 81, wherein the first configuration is different from the second configuration.

Aspect 83: The method of any of aspects 80 through 82, wherein at least a portion of the first configuration and the second configuration is common across the first directional beam and the second directional beam.

Aspect 84: The method of any of aspects 75 through 83, wherein each of the one or more channel sounding messages comprise a random access preamble message, the method further comprising: determining, from the configuration, a set of random access occasions for receiving the random access preamble message, the random access preamble message received during at least one random access occasion of the set of random access occasions, wherein the set of random access occasions include random access occasions that are configured across different narrowband carriers of the one or more directional beams, and wherein the configuration indicates the set of random access occasions.

Aspect 85: The method of aspect 84, wherein the random access occasions are configured across the one or more directional beams in accordance with a pattern across time resources, or frequency resources, or both.

Aspect 86: The method of aspect 85, wherein the pattern comprises a set of random access resources in adjacent carriers, the set of random access resources being adjacent in time.

Aspect 87: The method of aspect 86, wherein each random access resource of the set of random access resources adjacent in time are separated by a time interval.

Aspect 88: The method of any of aspects 84 through 87, wherein at least one of the one or more channel sounding messages comprises a first random access preamble that is different from a second random access preamble that is used for random access procedures.

Aspect 89: The method of aspect 88, wherein the first random access preamble comprises a preamble shared across two or more UEs including the UE, a UE-specific preamble, a contention-based random access preamble, a contention-free random access preamble, or any combination thereof.

Aspect 90: The method of any of aspects 84 through 89, wherein each of the random access preamble message comprises a narrowband random access preamble message.

Aspect 91: The method of any of aspects 75 through 90, the transmitting the configuration comprising: transmitting radio resource control signaling that configures the one or more channel sounding messages.

Aspect 92: The method of aspect 91, further comprising: transmitting, to the UE, one or more messages that modifies the configuration of the one or more channel sounding messages, wherein the one or more messages comprise a medium access control (MAC) control element, downlink control information, or any combination thereof.

Aspect 93: The method of aspect 92, wherein the one or more messages activate transmissions of the one or more channel sounding messages, deactivate the transmissions of the one or more channel sounding messages, or any combination thereof.

Aspect 94: The method of any of aspects 74 through 93, further comprising: transmitting, to the UE, downlink control information comprising a trigger for transmitting the one or more channel sounding messages.

Aspect 95: The method of aspect 94, further comprising: transmitting, within the downlink control information, a narrowband physical downlink control channel order, wherein the narrowband physical downlink control channel order comprises the trigger.

Aspect 96: The method of aspect 95, further comprising: transmitting, as part of the narrowband physical downlink control channel order, an indication of one or more directional beams, one or more narrowband carriers, or any combination thereof, for transmitting one or more random access preamble messages as the one or more channel sounding messages.

Aspect 97: The method of any of aspects 95 through 96, the receiving the one or more channel sounding messages comprising: receiving one or more random access preamble messages at each of a plurality of transmission occasions based at least in part on the narrowband physical downlink control channel order.

Aspect 98: The method of any of aspects 74 through 97, the receiving the one or more channel sounding messages comprising: receiving the one or more channel sounding messages as part of a beam failure recovery procedure.

Aspect 99: The method of aspect 98, further comprising: receiving an indicating of a beam failure from the UE based at least in part on a signal quality of the narrowband carrier of the directional beam satisfying a threshold.

Aspect 100: The method of any of aspects 74 through 99, wherein each directional beam of one or more directional beams including the directional beam corresponds to a different radio frequency.

Aspect 101: The method of any of aspects 74 through 100, wherein the one or more channel sounding messages are received based at least in part on an event trigger being satisfied.

Aspect 102: The method of aspect 101, further comprising: configuring a set of resources for the one or more channel sounding messages, wherein the set of resources is shared by two or more UEs including the UE, or is a UE-specific resource, or is a contention-based resource, or is a contention-free resource, or any combination thereof.

Aspect 103: The method of any of aspects 74 through 102, further comprising: transmitting a configuration of one or more measurement objects corresponding to different directional beams, wherein the one or more channel sounding messages are received based at least in part on measurements of the one or more measurement objects.

Aspect 104: The method of any of aspects 74 through 103, wherein at least one of the one or more channel sounding messages comprises a narrowband sounding reference signal.

Aspect 105: The method of any of aspects 74 through 104, further comprising: selecting, based at least in part on a beam management procedure, or a beam failure recovery procedure, or any combination thereof, a second directional beam different from the directional beam, wherein the selection is based at least in part on receiving the one or more channel sounding messages on at least the second directional beam; and communicating with the UE using the second directional beam.

Aspect 106: The method of any of aspects 74 through 105, further comprising: performing a handover procedure for handing over the UE to a second cell different from a first cell that is associated with the directional beam, the second cell associated with a second directional beam, wherein the handover procedure is based at least in part on the received channel sounding message.

Aspect 107: The method of any of aspects 74 through 106, wherein the one or more channel sounding messages are received based at least in part on periodic transmission occasions, aperiodic transmission occasions, dynamic transmission occasions, one or more UE-initiated transmission occasions, one or more event triggers, or any combination thereof.

Aspect 108: The method of any of aspects 74 through 107, wherein the directional beam, the narrowband carrier, the set of narrowband carriers, the channel sounding message, or any combination thereof, are used for narrowband internet of things communications.

Aspect 109: A method for wireless communication, comprising: communicating with a user equipment (UE) over a directional beam; transmitting, to the UE, an indication to modify a carrier for communications from a first narrowband carrier associated with the directional beam to a second narrowband carrier associated with a second directional beam, the second narrowband carrier being different from the first narrowband carrier; and switching to the second narrowband carrier based at least in part on the indication.

Aspect 110: The method of aspect 109, wherein the second narrowband carrier is from a set of candidate carriers.

Aspect 111: The method of aspect 110, further comprising: transmitting a configuration of the set of candidate carriers to the UE, wherein the configuration is transmitted via radio resource control signaling, a medium access control (MAC) control element, or any combination thereof.

Aspect 112: The method of any of aspects 109 through 111, the transmitting the indication comprises: transmitting downlink control information, a MAC control element, or any combination thereof, that includes the indication to modify the carrier for communications.

Aspect 113: The method of any of aspects 109 through 112, further comprising: receiving, in response to the received downlink control information, or the MAC control element, or any combination thereof, an acknowledgment of the indication to modify the carrier for communications.

Aspect 114: An apparatus for wireless communication at a UE, comprising a processor; memory coupled with the processor; and instructions stored in the memory and executable by the processor to cause the apparatus to perform a method of any of aspects 1 through 25.

Aspect 115: An apparatus for wireless communication at a UE, comprising at least one means for performing a method of any of aspects 1 through 25.

Aspect 116: A non-transitory computer-readable medium storing code for wireless communication at a UE, the code comprising instructions executable by a processor to perform a method of any of aspects 1 through 25.

Aspect 117: An apparatus for wireless communication at a UE, comprising a processor; memory coupled with the processor; and instructions stored in the memory and executable by the processor to cause the apparatus to perform a method of any of aspects 26 through 28.

Aspect 118: An apparatus for wireless communication at a UE, comprising at least one means for performing a method of any of aspects 26 through 28.

Aspect 119: A non-transitory computer-readable medium storing code for wireless communication at a UE, the code comprising instructions executable by a processor to perform a method of any of aspects 26 through 28.

Aspect 120: An apparatus for wireless communication, comprising a processor; memory coupled with the processor; and instructions stored in the memory and executable by the processor to cause the apparatus to perform a method of any of aspects 29 through 29.

Aspect 121: An apparatus for wireless communication, comprising at least one means for performing a method of any of aspects 29 through 29.

Aspect 122: A non-transitory computer-readable medium storing code for wireless communication, the code comprising instructions executable by a processor to perform a method of any of aspects 29 through 29.

Aspect 123: An apparatus for wireless communication, comprising a processor; memory coupled with the processor; and instructions stored in the memory and executable by the processor to cause the apparatus to perform a method of any of aspects 30 through 30.

Aspect 124: An apparatus for wireless communication, comprising at least one means for performing a method of any of aspects 30 through 30.

Aspect 125: A non-transitory computer-readable medium storing code for wireless communication, the code comprising instructions executable by a processor to perform a method of any of aspects 30 through 30.

Aspect 126: An apparatus for wireless communication at a UE, comprising a processor; memory coupled with the processor; and instructions stored in the memory and executable by the processor to cause the apparatus to perform a method of any of aspects 31 through 68.

Aspect 127: An apparatus for wireless communication at a UE, comprising at least one means for performing a method of any of aspects 31 through 68.

Aspect 128: A non-transitory computer-readable medium storing code for wireless communication at a UE, the code comprising instructions executable by a processor to perform a method of any of aspects 31 through 68.

Aspect 129: An apparatus for wireless communication at a UE, comprising a processor; memory coupled with the processor; and instructions stored in the memory and executable by the processor to cause the apparatus to perform a method of any of aspects 69 through 73.

Aspect 130: An apparatus for wireless communication at a UE, comprising at least one means for performing a method of any of aspects 69 through 73.

Aspect 131: A non-transitory computer-readable medium storing code for wireless communication at a UE, the code comprising instructions executable by a processor to perform a method of any of aspects 69 through 73.

Aspect 132: An apparatus for wireless communication, comprising a processor; memory coupled with the processor; and instructions stored in the memory and executable by the processor to cause the apparatus to perform a method of any of aspects 74 through 108.

Aspect 133: An apparatus for wireless communication, comprising at least one means for performing a method of any of aspects 74 through 108.

Aspect 134: A non-transitory computer-readable medium storing code for wireless communication, the code comprising instructions executable by a processor to perform a method of any of aspects 74 through 108.

Aspect 135: An apparatus for wireless communication, comprising a processor; memory coupled with the processor; and instructions stored in the memory and executable by the processor to cause the apparatus to perform a method of any of aspects 109 through 113.

Aspect 136: An apparatus for wireless communication, comprising at least one means for performing a method of any of aspects 109 through 113.

Aspect 137: A non-transitory computer-readable medium storing code for wireless communication, the code comprising instructions executable by a processor to perform a method of any of aspects 109 through 113.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
 a processor;
 memory coupled with the processor; and
 instructions stored in the memory and executable by the processor to cause the apparatus to:
  communicate with a network over a directional beam;
  receive, from the network, a configuration of one or more channel sounding messages for one or more directional beams associated with a satellite, wherein each directional beam of the one or more directional beams is associated with a set of frequency resources including an anchor resource, each of the one or more channel sounding messages being configured for transmission on a frequency resource, of the set of frequency resources, that is different from the anchor resource, for each directional beam, of the set of frequency resources associated with each directional beam;

determine a trigger for transmitting the one or more channel sounding messages based at least in part on the configuration; and transmit, to the network, the one or more channel sounding messages for sounding at least one directional beam of the one or more directional beams on respective frequency resources different from at least one corresponding anchor resource in accordance with the trigger and the configuration.

2. The apparatus of claim 1, wherein the instructions are further executable by the processor to cause the apparatus to:
identify, based at least in part on the configuration, locations of the respective frequency resources for transmitting the one or more channel sounding messages, wherein the locations comprise a time resource, the frequency resource, the at least one directional beam of the one or more directional beams, or any combination thereof.

3. The apparatus of claim 2, wherein the instructions executable by the processor to cause the apparatus to receive the configuration are executable by the processor to cause the apparatus to:
receive, from the network, system information over the one or more directional beams, or the directional beam, or any combination thereof, the system information indicating the configuration.

4. The apparatus of claim 2, wherein:
each frequency resource is different from a resource used for random access procedures with the network.

5. The apparatus of claim 1, wherein the instructions are further executable by the processor to cause the apparatus to:
determine a first configuration of a first channel sounding message on a first directional beam of the one or more directional beams; and
determine a second configuration of a second channel sounding message on a second directional beam of the one or more directional beams, wherein transmitting the one or more channel sounding messages is in accordance with the first configuration, or the second configuration, or any combination thereof.

6. The apparatus of claim 5, wherein the instructions executable by the processor to cause the apparatus to determine the second configuration are executable to cause the apparatus to:
determine the second configuration based at least in part on modifying at least a portion of the first configuration, wherein the instructions are further executable by the processor to cause the apparatus to:
apply a frequency translation to the first configuration; and
determine the second configuration based at least in part on the applied frequency translation.

7. The apparatus of claim 5, wherein the first configuration is different from the second configuration.

8. The apparatus of claim 5, wherein at least a portion of the first configuration and the second configuration is common across the first directional beam and the second directional beam.

9. The apparatus of claim 1, wherein each of the one or more channel sounding messages comprise a random access preamble message, and wherein the instructions are further executable by the processor to cause the apparatus to:
determine, from the configuration, a set of random access occasions for transmitting the random access preamble message; and
transmit the random access preamble message during at least one random access occasion of the set of random access occasions, wherein the set of random access occasions include random access occasions configured across different frequency resources of the one or more directional beams.

10. The apparatus of claim 9, wherein:
the random access occasions are configured across the one or more directional beams in accordance with a pattern across time resources, or frequency resources, or both;
the pattern comprises a set of random access resources in adjacent carriers, the set of random access resources being adjacent in time, each random access resource of the set of random access resources adjacent in time being separated by a time interval; and
each random access preamble message comprises a narrowband random access preamble message.

11. The apparatus of claim 9, wherein at least one of the one or more channel sounding messages comprises a first random access preamble that is different from a second random access preamble that is used for random access procedures with the network.

12. The apparatus of claim 9, wherein a first random access preamble of the one or more channel sounding messages comprises a preamble that is shared across two or more UEs, a UE-specific preamble, a contention-based random access preamble, a contention-free random access preamble, or any combination thereof.

13. The apparatus of claim 9, wherein the instructions are further executable by the processor to cause the apparatus to:
refrain from monitoring for a response from the network based at least in part on transmitting the one or more channel sounding messages.

14. The apparatus of claim 1, wherein the instructions are further executable by the processor to cause the apparatus to:
monitor for a communication over the directional beam based at least in part on transmitting the one or more channel sounding messages; and
communicate with the network over the directional beam based at least in part on the monitoring.

15. The apparatus of claim 1, wherein the instructions executable by the processor to cause the apparatus to determine the trigger are executable by the processor to cause the apparatus to:
receive, from the network, downlink control information comprising the trigger for transmitting the one or more channel sounding messages, wherein the instructions are further executable by the processor to cause the apparatus to:
identify, within the downlink control information, a narrowband physical downlink control channel order, wherein the narrowband physical downlink control channel order comprises the trigger; and
determine, based at least in part on the narrowband physical downlink control channel order, the one or more directional beams, one or more frequency resources, or any combination thereof, for transmitting one or more random access preamble messages as the one or more channel sounding messages.

16. The apparatus of claim 15, wherein the instructions executable by the processor to cause the apparatus to transmit the one or more channel sounding messages are executable by the processor to cause the apparatus to:
transmit at least one of the one or more random access preamble messages at each of a plurality of transmission occasions based at least in part on the narrowband physical downlink control channel order.

17. The apparatus of claim 1, wherein the instructions executable by the processor to cause the apparatus to receive the configuration are executable by the processor to cause the apparatus to:
receive radio resource control signaling that configures the one or more channel sounding messages, wherein the instructions are further executable by the processor to cause the apparatus to:
receive one or more messages from the network that modify the configuration of the one or more channel sounding messages, wherein the one or more messages comprise a medium access control (MAC) control element, downlink control information, or any combination thereof, and wherein the one or more messages activate transmissions of the one or more channel sounding messages, deactivate the transmissions of the one or more channel sounding messages, or any combination thereof.

18. The apparatus of claim 1, wherein the instructions are further executable by the processor to cause the apparatus to:
determine that an event trigger has been satisfied, wherein transmitting the one or more channel sounding messages is based at least in part on determining that the event trigger has been satisfied; and
identify a set of resources for transmitting the one or more channel sounding messages based at least in part on determining that the event trigger has been satisfied, wherein the set of resources is shared by two or more UEs including the UE, or is a UE-specific resource, or is a contention-based resource, or is a contention-free resource, or any combination thereof.

19. The apparatus of claim 1, wherein the instructions are further executable by the processor to cause the apparatus to:
monitor a first frequency resource of a first set of frequency resources associated with the directional beam;
determine a beam failure for the directional beam based at least in part on the monitoring, wherein transmitting the one or more channel sounding messages is based on the determined beam failure, and wherein the one or more channel sounding messages are part of a beam failure recovery procedure; and
indicate the beam failure to the network based at least in part on a signal quality of the first frequency resource of the directional beam satisfying a threshold.

20. The apparatus of claim 1, wherein each directional beam of the one or more directional beams corresponds to a different radio frequency.

21. The apparatus of claim 1, wherein the instructions are further executable by the processor to cause the apparatus to:
receive a configuration of one or more measurement objects corresponding to different directional beams, wherein transmitting the one or more channel sounding messages is based at least in part on performing measurements of the one or more measurement objects.

22. The apparatus of claim 1, wherein:
at least one of the one or more channel sounding messages comprises a narrowband sounding reference signal, and
each frequency resource of the set of frequency resources comprises a narrowband carrier, or a bandwidth part, or any combination thereof.

23. The apparatus of claim 1, wherein the instructions are further executable by the processor to cause the apparatus to:
select, based at least in part on a beam management procedure, or a beam failure recovery procedure, or any combination thereof, a second directional beam different from the directional beam, wherein the selection is based at least in part on transmitting the one or more channel sounding messages on at least the second directional beam; and
communicate with the network using the second directional beam.

24. The apparatus of claim 1, wherein the instructions are further executable by the processor to cause the apparatus to:
identify a first cell associated with the directional beam;
perform a handover procedure to a second cell different from the first cell, the handover procedure corresponding to establishing a connection with a second directional beam associated with the second cell, wherein the handover procedure is based at least in part on transmitting the one or more channel sounding messages on at least the second directional beam; and
communicate with the network using the second directional beam.

25. The apparatus of claim 1, wherein:
the trigger comprises periodic transmission occasions, aperiodic transmission occasions, semi-persistent transmission occasions, dynamic transmission occasions, one or more UE-initiated transmission occasions, one or more event triggers, or any combination thereof;
the directional beam, the frequency resource, the set of frequency resources, the one or more channel sounding messages, or any combination thereof, are used for narrowband internet of things communications; and
the network comprises a non-terrestrial network.

26. An apparatus for wireless communication at a user equipment (UE), comprising:
a processor;
memory coupled with the processor; and
instructions stored in the memory and executable by the processor to cause the apparatus to:
communicate with a network over a directional beam;
receive, from the network, an indication to modify a carrier for communications from a first narrowband carrier associated with the directional beam to a second narrowband carrier associated with a second directional beam associated with a satellite, the second narrowband carrier being different from the first narrowband carrier;
transmit an acknowledgment of the indication to modify the carrier for communications;
switch to the second narrowband carrier based at least in part on the indication; and
communicate with the network via the second narrowband carrier.

27. The apparatus of claim 26, wherein the second narrowband carrier is from a set of candidate carriers, and the instructions are further executable by the processor to cause the apparatus to:
receive a configuration of the set of candidate carriers from the network via radio resource control signaling, a medium access control (MAC) control element, or any combination thereof.

28. The apparatus of claim 26, wherein the instructions executable by the processor to cause the apparatus to receive the indication are executable by the processor to cause the apparatus to:
    receive downlink control information, a medium access control (MAC) control element, or any combination thereof, that includes the indication to modify the carrier for communications, wherein the acknowledgment of the indication is transmitted in response to the downlink control information, or the MAC control element, or any combination thereof.

29. An apparatus for wireless communication, comprising:
    a processor;
    memory coupled with the processor; and
    instructions stored in the memory and executable by the processor to cause the apparatus to:
        communicate with a user equipment (UE) over a directional beam;
        transmit, to the UE, a configuration of one or more channel sounding messages for one or more directional beams associated with a satellite, wherein each directional beam of the one or more directional beams is associated with a set of frequency resources including an anchor resource, each of the one or more channel sounding messages being configured for reception on a frequency resource, of the set of frequency resources, that is different from the anchor resource, for each directional beam, of the set of frequency resources associated with each directional beam;
        receive, from the UE, the one or more channel sounding messages for sounding at least one directional beam of the one or more directional beams, the one or more channel sounding messages received on respective frequency resources different from at least one corresponding anchor resource; and
        determine a channel quality of the directional beam based at least in part on the received one or more channel sounding messages.

30. An apparatus for wireless communication, comprising:
    a processor;
    memory coupled with the processor; and
    instructions stored in the memory and executable by the processor to cause the apparatus to:
        communicate with a user equipment (UE) over a directional beam;
        transmit, to the UE, an indication to modify a carrier for communications from a first narrowband carrier associated with the directional beam to a second narrowband carrier associated with a second directional beam associated with a satellite, the second narrowband carrier being different from the first narrowband carrier;
        receive an acknowledgment of the indication to modify the carrier for communications;
        switch to the second narrowband carrier based at least in part on the indication; and
        communicate with the UE via the second narrowband carrier.

\* \* \* \* \*